US006734808B1

(12) United States Patent
Michaelson et al.

(10) Patent No.: US 6,734,808 B1
(45) Date of Patent: *May 11, 2004

(54) METHOD, APPARATUS AND COMPUTER PROGRAM PRODUCTS FOR ALERTING SUBMERSIBLE VESSELS TO HAZARDOUS CONDITIONS

(75) Inventors: Dave Michaelson, Redmond, WA (US); Ratan Khatwa, Issaquah, WA (US); Jeanne C. Suchodolski, Issaquah, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/606,766

(22) Filed: Jun. 26, 2000

Related U.S. Application Data

(60) Provisional application No. 60/158,255, filed on Oct. 5, 1999.

(51) Int. Cl.7 .......................... G08B 23/00; H04B 7/185
(52) U.S. Cl. .................... 340/984; 342/357 B; 367/909
(58) Field of Search .................... 340/984; 342/357.13; 367/909, 99, 128; 701/208

(56) References Cited

U.S. PATENT DOCUMENTS

| | | | | |
|---|---|---|---|---|
| 3,715,718 A | | 2/1973 | Astengo ...................... | 340/970 |
| 3,872,284 A | * | 3/1975 | Seligman et al. ........... | 701/220 |
| 3,925,751 A | | 12/1975 | Bateman et al. ............ | 340/967 |
| 3,934,221 A | | 1/1976 | Bateman et al. ............ | 340/970 |
| 3,934,222 A | | 1/1976 | Bateman et al. ............ | 340/970 |
| 3,936,796 A | | 2/1976 | Bateman et al. ............ | 340/970 |
| 3,944,968 A | | 3/1976 | Bateman et al. ............ | 340/970 |
| 3,947,808 A | | 3/1976 | Bateman ...................... | 340/970 |
| 3,947,810 A | | 3/1976 | Bateman et al. ............ | 340/970 |
| 3,958,218 A | | 5/1976 | Bateman ...................... | 340/970 |

(List continued on next page.)

FOREIGN PATENT DOCUMENTS

| | | | |
|---|---|---|---|
| CA | 1033828 | 6/1978 | .................. 343/15 |
| DE | 4304561 A | 8/1994 | ........... B64D/45/04 |
| DE | 4327706 A1 | 2/1995 | ............. G08G/5/04 |
| DE | 4327890 | 3/1995 | ........... G01C/21/20 |
| DE | 4423233 | 1/1996 | ........... G01C/21/00 |
| DE | 19747234 | 4/1999 | ............ B36B/49/00 |
| EP | 0790487 A2 | 8/1987 | ........... G01C/23/00 |
| FR | 2689668 | 10/1993 | ............. G08G/5/04 |
| FR | 2721130 | 12/1995 | ............. G08G/5/04 |
| GB | 2 266 286 A | 10/1993 | ........... B64D/45/04 |
| WO | WO 85/03566 | 8/1985 | ............. G01C/5/00 |

OTHER PUBLICATIONS

Baldwin et al. "GPS–Based Terrain Avoidance Systems—A Solution for General Aviation Controlled Flight into Terrain," *Rannoch Corporation*, (date unknown).

Bateman, "How to Terrain–proof the World's Airline Fleet," *Sundstrand Data Control. Flight Safety Foundation*, 44th IASS, Singapore, 1991.

(List continued on next page.)

*Primary Examiner*—John Tweel
(74) *Attorney, Agent, or Firm*—Honeywell Int'l Inc.

(57) ABSTRACT

A navigational system for submersible vessels that provides warning of impending grounding occurrences. A data base of bottom contours and submerged obstructions is compared to various indicators of the submersible vessel's position and motion to provide alerts and to display bottom hazards ahead of the vessel.

133 Claims, 36 Drawing Sheets

U.S. PATENT DOCUMENTS

| | | | |
|---|---|---|---|
| 3,958,219 A | 5/1976 | Bateman | 340/970 |
| 4,030,065 A | 6/1977 | Bateman | 340/970 |
| 4,060,793 A | 11/1977 | Bateman | 340/970 |
| 4,063,073 A | 12/1977 | Strayer | 364/439 |
| 4,215,334 A | 7/1980 | Bateman | 340/970 |
| 4,224,669 A | 9/1980 | Brame | 364/433 |
| 4,319,218 A | 3/1982 | Bateman | 340/970 |
| 4,484,192 A | 11/1984 | Seitz et al. | 340/995 |
| 4,567,483 A | 1/1986 | Bateman et al. | 340/970 |
| 4,642,775 A | 2/1987 | Cline et al. | 364/443 |
| 4,646,244 A | 2/1987 | Bateman et al. | 364/461 |
| 4,675,823 A | 6/1987 | Noland | 364/460 |
| 4,835,537 A | 5/1989 | Manion | 340/961 |
| 4,894,655 A | 1/1990 | Joguet et al. | 340/988 |
| 4,903,212 A | 2/1990 | Yokouchi et al. | 364/449.95 |
| 4,912,645 A | 3/1990 | Kakihara et al. | 364/449.2 |
| 4,914,436 A | 4/1990 | Bateman et al. | 340/970 |
| 4,914,733 A | 4/1990 | Gralnick | 340/961 |
| 4,916,448 A | 4/1990 | Thor | 340/970 |
| 4,924,401 A | 5/1990 | Bice et al. | 364/424.015 |
| 4,947,164 A | 8/1990 | Bateman | 340/970 |
| 4,954,959 A | 9/1990 | Moroto et al. | 364/449.5 |
| 4,987,413 A | 1/1991 | Grove | 340/970 |
| 5,086,396 A | 2/1992 | Waruszewski, Jr. | 364/454 |
| 5,136,512 A | 8/1992 | Le Borne | 364/461 |
| 5,140,532 A | 8/1992 | Beckwith, Jr. et al. | 395/101 |
| 5,153,588 A | 10/1992 | Muller | 340/968 |
| 5,155,688 A | 10/1992 | Tanaka et al. | 364/454 |
| 5,157,615 A | 10/1992 | Brodegard | 364/461 |
| 5,196,847 A | 3/1993 | Bateman | 340/970 |
| 5,202,690 A | 4/1993 | Frederick | 342/26 |
| 5,220,322 A | 6/1993 | Bateman et al. | 370/970 |
| 5,252,978 A | 10/1993 | Priestley | 342/29 |
| 5,257,195 A | 10/1993 | Hirata | 364/449.95 |
| 5,265,025 A | 11/1993 | Hirata | 364/449.7 |
| 5,285,391 A | 2/1994 | Smith, Jr. et al. | 364/443 |
| 5,293,163 A | 3/1994 | Kakihara et al. | 340/995 |
| 5,293,318 A | 3/1994 | Fukushima | 364/449.95 |
| 5,337,242 A | 8/1994 | Yamamoto et al. | 364/449.2 |
| 5,400,300 A * | 3/1995 | Bick et al. | 367/99 |
| 5,414,631 A | 5/1995 | Denoize et al. | 364/461 |
| 5,442,556 A | 8/1995 | Boyes et al. | 364/461 |
| 5,486,821 A | 1/1996 | Stevens et al. | 340/970 |
| 5,488,563 A | 1/1996 | Chazelle et al. | 364/461 |
| 5,495,249 A | 2/1996 | Chazelle et al. | 342/36 |
| 5,519,392 A | 5/1996 | Oder et al. | 340/995 |
| 5,526,000 A | 6/1996 | Chazelle et al. | 342/407 |
| 5,581,259 A | 12/1996 | Schipper | 342/451 |
| 5,608,392 A | 3/1997 | Faivre et al. | 340/967 |
| 5,638,282 A | 6/1997 | Chazelle et al. | 364/461 |
| 5,661,486 A | 8/1997 | Faivre et al. | 342/33 |
| 5,677,842 A | 10/1997 | Denoize et al. | 364/461 |
| 5,798,712 A | 8/1998 | Coquin | 340/970 |
| 5,839,080 A * | 11/1998 | Muller et al. | 701/9 |
| 6,088,634 A * | 7/2000 | Muller et al. | 701/9 |
| 6,092,009 A * | 7/2000 | Glover | 701/14 |
| 6,122,570 A * | 9/2000 | Muller et al. | 701/9 |
| 6,138,060 A * | 10/2000 | Conner et al. | 701/9 |
| 6,219,592 B1 * | 4/2001 | Muller et al. | 701/9 |
| 6,292,721 B1 * | 9/2001 | Conner et al. | 701/9 |
| 6,469,664 B1 * | 10/2002 | Michaelson et al. | 342/357.13 |

OTHER PUBLICATIONS

Bennett and Cockburn, "Pilot Monitoring of Display Enhancements Generated From A Digital Data Base," *AGARD Conference Proceedings No. 456*, 1990.

Bennett, "The Use of Digital Map Data to Provide Enhanced Navigation and Displays for Poor Weather Penetration and Recovery," *GEC Marconi Avionics*, 1993.

Bice, "Development of an Automated Ground Collision Avoidance System Using A Digital Terrain Database," *Wright Patterson AFB*, 1989.

DiPadua et al., "Comparison of the General Dynamics Ground Clobber Algorithm with the GCAS and Laws Algorithms," *Crew Station Design Facility, Wright Patterson AFB*, 1988.

Fitzgerald and Brunner, "Use of High–Fidelity Simulation in the Development of an F/A–18 Active Ground Collision Avoidance System," *SAE International*, 1992.

Fitzsimmons, "First moves towards an "intelligent" GPWS," *Interavia/Aerospace World*, 1993.

Grey and Dale, "Advances in Techniques and Technologies for Air Vehicle Navigation and Guidance," *NATO Advisory Group for Aerospace Research and Development (AGARD)*, Guidance and Control Panel 48$^{th}$ Symposium, 1989.

Hewitt, "The Use of Terrain Databased for Avionic Systems," *The Institution of Electrical Engineers*, 1995.

Hopkins et al., "Quo Vadis?," *Flight International* 11–17:37–40, Mar., 1992.

"GCAS—Past Present and Future of Alert Systems for Abnormal Closure to Ground," *Abstract*, 1993, translation by Kei Kino. (Japanese Article with English Translation).

Kuchar and Hansman, Jr., "Part–Task Simulator Evaluations of Advanced Terrain Display," Preprints, SAE Aerotech Conference and Exposition, Anaheim, CA, 1993.

Lawrence, "Modern Inertial Technology," Springer–Verlag New York, Inc., 1993.

LeBorn, "A Generic Ground Collision Avoidance System for Tactical Aircraft," *Cubic Defense Systems*, San Diego, California. IEEE National Aerospace and Electronics Conference, 1988.

Moller and Sachs, "Synthetic Vision for Enhancing Poor Visibility Flight Operations," *IEEE AES Systems*:27–42, 1994.

Rueb, et al., "Evaluation of the C/EC/KC–135 Ground Collision Avoidance System (GCAS) (Study 2)," *Integrated Engineering and Tech. Management Directorate*, Wright–Patterson AFB, Final Report, 1993.

Shah, "Ground Collision Warning System Performance Criteria for High Maneuverability Aircraft," *Flight Stability and Control Branch* Wright Patterson AFB, 1988.

Stevens, "Terprom Helps Low–Altitude Flight,: Terrain Navigation System for Flying at Low Height," *Elektronica* 1986, (Dutch) w/English Transl.

"Safety Through Interactions and International Standards," *Proceedings of the Flight Safety Foundation`,46$^{th}$* Annual International Air Safety Seminar, Kuala Lumpuir, Malaysia, 1993.

Williams and Mitchell, "Effects of Integrated Flight Path and Terrain Displays on Controlled Flight into Terrain," Center for Human–Machine Systems Research, School of Industrial and Systems Engineering, Georgia Institute of Technology.

Young, "Warning System Concepts to Prevent Controlled Flight Into Terrain (CFIT)," *Defense Systems & Electronics Group*, Texas Instruments, Inc. IEEE, 1993.

"BAE Terrain Software Bound for USF–16," *Flight International*, Aug., 1993, Computer Printout.

"Technology and Air Attack," *Asian Defense Journal*, 1993, Computer Printout.

The F–16 Digital Terrain System, British Aerospace, The Institute of Electrical Engineers, 1995.

Fitzsimons, "Upgrade Classics—Navigating by Numbers," Defense System & Modernisation (DSM), Jun. 1, 1997, p. 11, v.10, No. 02, Computer Printout.

"Terrain Databases and Their Use In Navigation and Collision Avoidance," Institute of Electrical Engineers, Electronics Division Colloquim, Professional Group E15, Radar Sonar and Navigation Systems, *Digest No. 1995/066,* 1995, paper by Allerton.

Kuchar and Hansman, Jr., "Part–Task Simulation Study of Candidate Terrain Alerting Displays," Department of Aeronautics and Astronautics, Massachusetts Institute of Technology, Jun. 30, 1993.

Kuchar and Hansman, Jr., "Advanced Terrain Displays for Transport Category Aircraft," ASL, Department of Aeronautics & Astronautics, Massachusetts Institute of Technology, Aug. 23, 1991.

"The Future Flight Deck," The Flight Operations Group of the Royal Aeronautical Society and The Guild of Air Pilots and Air Navigators of London.

Hewitt et al., "A Ground and Obstacle Collision Avoidance Technique (GOCAT)," *IEEE,* May, 1991.

Moore, "We Have the Technology," *Flying Safety,* Jun., 1992.

Hughes, "Glass Cockpit Study Reveals Human Factors Problems," *Aviation Week & Space Technology,* Aug. 7, 1989.

Hoffman and Burnham, "Airborne Electronic Map systems," *IEEE,* 769–772, 1981.

Burnham and Kline, "Airborne Electronic Terrain Map System, Part 2–Applications," *IEEE,* 786–789, 1981.

Sander, "Algorithms for an Adaptive Dynamic Window in Electronic Map systems," Air Force Wright Aeronautical Laboratories.

Weber and Opttek, "Airborne Electronic Terrain Map System," *IEEE,* 773–778, 1981.

Small, "The Electronic Terrain Map—A New Avionics Integrator–," Avionics Laboratory, Wright–Patterson Air Force Base, Ohio, 356–359.

Tang and Mealy, "Application of Multiple Model Estimation Techniques to a Recursive Terrain Height Correlation System," *IEEE,* 757–764, 1981.

Woodward and Hoover, "Passive Terrain Following Using Stored Map and Global Positioning System," *IEEE,* 779–785, 1981.

"Air Force Evaluating Model of Electronic Map Technology," *Aviation Week & space Technology, 76,* Dec. 19, 1983.

Kuchar and Hansman, Jr., "An Exploratory Study of Plan–View Terrain Displays for Air Carrier Operations," *The International Journal of Aviation Psychology,* 3(1):39–54, 1993.

Paper re: Proceedings of the National Technical Meeting, The Institute of Navigation, Anaheim, California dated Jan. 20–23, 1987 (4 pages).

Paper re: A New Approach to CFIT Prevention: GCAS Ground Collision Avoidance System, Dassault Electronique, Rockwell Avionics, Author: Jean–Francis Manfroy and Lothar J. Taylor dated 11/95 (12 pages).

Proctor, "Avionics Unit Eyes Expanded Markets," *Aviation Week & Space Technology,* Aug. 15, 1994, p. 41.

Proctor, "Terrain Alert Graphics Tested on cockpit Displays," *Aviation Week & Space Technology, Aug. 8, 1994,* p. 51.

Kerrill, Tamara, "Satellite–Guided Airplane Flies Right Into the Future," *Chicago Sun–Times,* Oct. 28, 1994, p. 22.

Malm, Richard, "Engineers Can Tap Into Global Positioning System" *Engineering Times,* Apr., 1995, pp. 11–14.

GCAS Publication, provided by A/S Library Services, Source and date unknown, pp. 185–190.

Wilson, Squire and Seakins, University of Southhampton, UK "Enhanced Preliminary Design Ship Manoeuvring Simulator Techniques," 40–51.

Fujino, Kagemoto, Ishii, and Kato, "Prediction of Stopping Manoeuvres of a Ship in Shallow Water," *Manoeuvring and Control of Marine Craft,* 101–116.

McCallum, "Practical Ship Manoeuvring Models for Real Ship Manoeuvring Problems," *Manoeuvring and Control of Marine Craft,* 52–72.

Francis, Dove and Pourzanjani, "Development of a Four Degrees of Freedom Linear Ship Manoeuvring Mathematical Model," *Manoeuvring and Control of Marine Craft,* 133–144.

Bate and Sutton, "Investigation of Performance Characteristics of High Speed Planing Craft," *Manoeuvring and Control of Marine Craft,* 203–213.

Whalen and Kahn, "A Digital Simulation Program For Advanced Naval Vehicle Dynamics," provided by LindaHall Library, Source and date unknown, 515–519.

Chudley, Dove and Tapp, "A Review of Mathematical Models Used in Ship Manoeuvres," *Computer Methods In Marine and Offshore Engineering,* 243–258.

Rawson and Tupper, "Chapter 13—Manoeuvrability," *Basic Ship Theory,* vol. 2, fourth edition, 533–557.

Price and Bishop, *Probabilistic Theory of Ship Dynamics,* Chapman and Hall, 221–262.

General Principals of Ship Control, chapter 9, pp 213–232.

Davis, "Analysis And Control Of Ship Motion In A Random Seaway," Massachusetts Institute of Technology, Jun. 1961, 10–17.

"SIMAN—A Program for Estimating A ships Manoeuvring and Operational Capabilities," www.marintek.sintef.no/marintek_eks/software/SIMAN/siman.htm.

Paper, Underkeel Clearance And Reduced Visibility, chapter XIV, 4 pages, http:linksia.com demos marex hsunderk.htm.

U.S. Department of Transportation, United States Coast Guard, "Implementation of Operational Measures For Existing Tank Vessels Without Double Hulls Until 2015," *Navigation and Vessel Inspection Circular No. 2–97,* 5 pages, www.uscg.mil/hq/g–m/nvic/2_97/n2–97.htm.

"Minimum under–keel Clearance", 33 CFR 157.455, Chapter I, Part 157, Subpart G, 3 pages.

"IMO Bibliography of Maritime Literature," printed May 15, 2000, 27 pages, www.imoorg/imo/Library/literature/sep99lit.htm.

Various Notes regarding Shipwrecks—dates varied, source unknown.

* cited by examiner

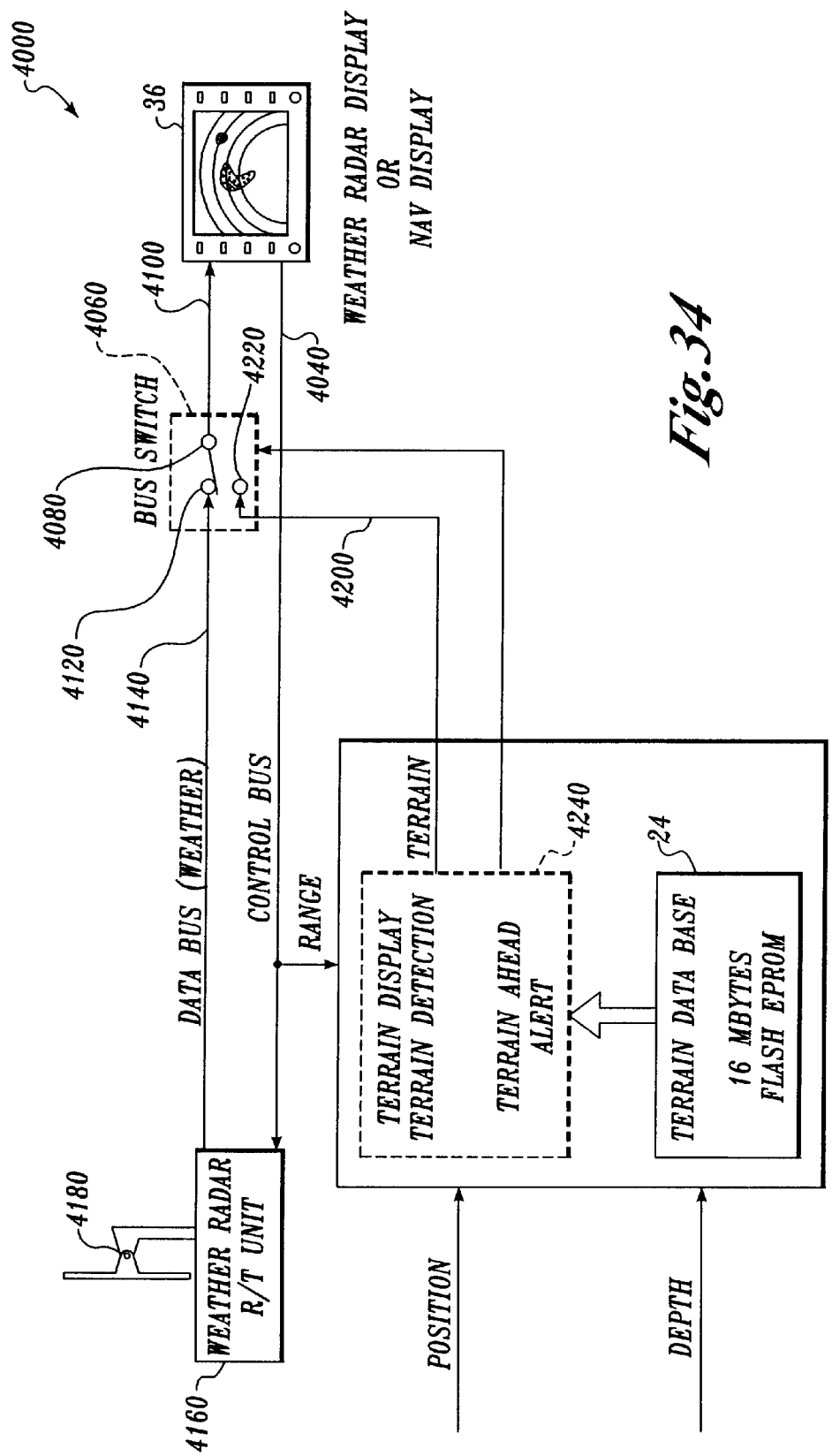

LEAST DENSE PATTERN
4 OF 64 = 1/16
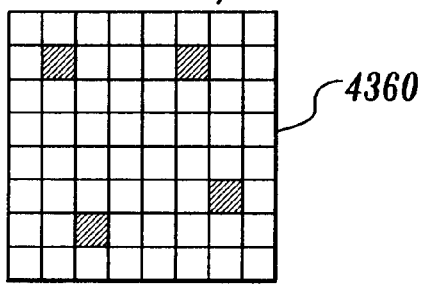
MEDIUM DENSE PATTERN
16 OF 64 = 1/4
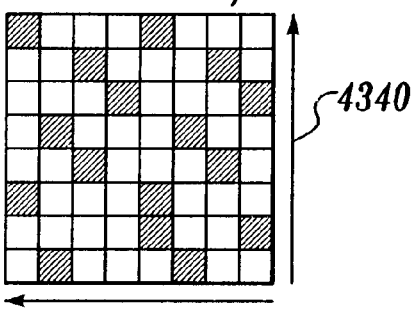
DENSEST PATTERN
32 OF 64 = 1/2
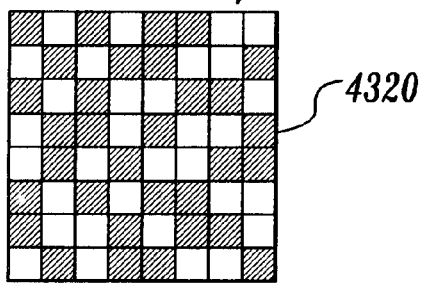
*Fig. 45*

METHOD, APPARATUS AND COMPUTER PROGRAM PRODUCTS FOR ALERTING SUBMERSIBLE VESSELS TO HAZARDOUS CONDITIONS

This application claims priority from copending application Ser. No. 60/158,255 filed Oct. 5, 1999 entitled "Ocean Bottom Proximity Warning Sensor", the complete disclosure of which is incorporated herein by reference.

BACKGROUND OF THE INVENTION

This invention relates to the prevention of grounding accidents for marine vessels, and in particular submersible vessels such as, for example, submarines; when operating below the surface. Grounding accidents are a major risk for submarines and other submersibles which must operate in confined underwater channels. Furthermore, in submersible accidents the potential for hull loss and loss of life increases dramatically over those associated with grounding of surface vessels.

Despite the significant risk there exist limited systems for the prevention of grounding accidents. Most submersibles are equipped with sonar to monitor the actual depth of the water beneath the hull. However, this device is a reactive system that provides only a current status and does not protect against anticipated conditions present along the projected track of the boat. This device also requires active monitoring by ship's crew to detect a hazardous condition. In military operations, use of the sonar may inadvertently betray the boat's location to enemy vessels.

Submarines may also be equipped with moving map displays that show the vessel's progress relative to a stored nautical chart. These systems also require the crew to actively monitor the vessel's progress against the chart and to proactively identify hazardous conditions.

In the aviation industry various systems have been developed that provide warnings and advisory indications to the pilot of aircraft approaching hazardous terrain. Among such systems are systems generally known as ground proximity warning systems (GPWS) which monitor the flight conditions of an aircraft and provide a warning if flight conditions are such that inadvertent contact with terrain is imminent. Among the flight conditions normally monitored by such systems are radio altitude and rate, barometric altitude and rate, air speed, flap and gear positions. These parameters are monitored and an advisory signal and/or warning signal is generated when the relationship between the parameters is such that terrain impact is likely to occur. Typical examples of such systems are disclosed in U.S. Pat. Nos. 3,715,718; 3,936,796; 3,958,218; 3,944,968; 3,947,808; 3,947,810; 3,934,221; 3,958,219; 3,925,751; 3,934,222; 4,060,793; 4,030,065; 4,215,334; and 4,319,218, all assigned to the same assignee as the assignee of the present invention and hereby incorporated by reference. U.S. Pat. Nos. 5,488,563 and 5,839,080 to Mueller et al. each disclose a controlled flight into terrain alerting system that utilizes a terrain database in conjunction with aircraft dynamics to alert pilots of dangerous proximity to terrain.

However, such systems are designed for aircraft wherein the escape maneuver chiefly consists of adding full power and pitching the aircraft up to initiate a climb. This type of escape has limited utility for a submarine whose chief purpose is to stay concealed by remaining submerged. U.S. Pat. No. 5,488,563 to Chazelle describes a ground proximity warning system for aircraft that suggests a turning maneuver to escape terrain. However, Chazelle does not disclose or suggest how such a system could be applied to ships, submarines or boats.

U.S. Pat. No. 4,646,244 to Bateman discloses a terrain alerting methodology which may be applied to submarines. However, this reference does not discuss terrain avoidance procedures and in particular terrain avoidance procedures for submarines.

SUMMARY OF THE INVENTION

The present invention includes recognition of the need to provide marine vessels with an alert of conditions that may lead to an inadvertent grounding. The alerts provided by the present invention may be either reactive and/or predictive.

According to one aspect of the present invention, the ship's sonar is utilized to provide an indication of impending impact with bottom obstructions based upon rate of change of depth beneath the keel.

According to another aspect of the invention, an ocean bottom terrain data base is provided. The ship's position and anticipated track and/or instantaneous heading vector are compared to the ocean bottom terrain data and an alert is provided when a hazardous condition is detected.

According to another aspect of the invention, ocean bottom hazards are displayed on a visual display representative of a plan view of the ocean or waterway bottom terrain. Preferably the terrain is displayed in various colors and/or dot pattern densities depending upon the degree of grounding hazard to the vessel. In a preferred embodiment of the invention, the terrain that does not present a hazard to the vessel is displayed in a first color, terrain that is a potential hazard to the vessel is displayed as second color and terrain which represents an immediate and actual danger to the vessel is colored a third color.

More specifically, the bottom proximity awareness system comprises a navigational system configured to determine latitude, longitude, depth, points of intended movement, and speed of a vessel employing the system. The navigational system generates signals in response to the listed parameters. The system further comprises: a terrain database comprising depth data for underwater terrain and obstacle information as well as for port facilities; a processor configured to identify from the terrain database depth data within a range of the vessel; warning envelope generator; and a warning device. Further advantages and features of the present invention will be described in detail below.

BRIEF DESCRIPTION OF THE DRAWINGS

FIG. 34 is a block diagram of a display system according to one embodiment of the present invention;

FIG. 45 is a diagram of the different fractal patterns used to provide the variable density display of non-hazardous display indications;

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

1.0 OVERVIEW

Figure 1:
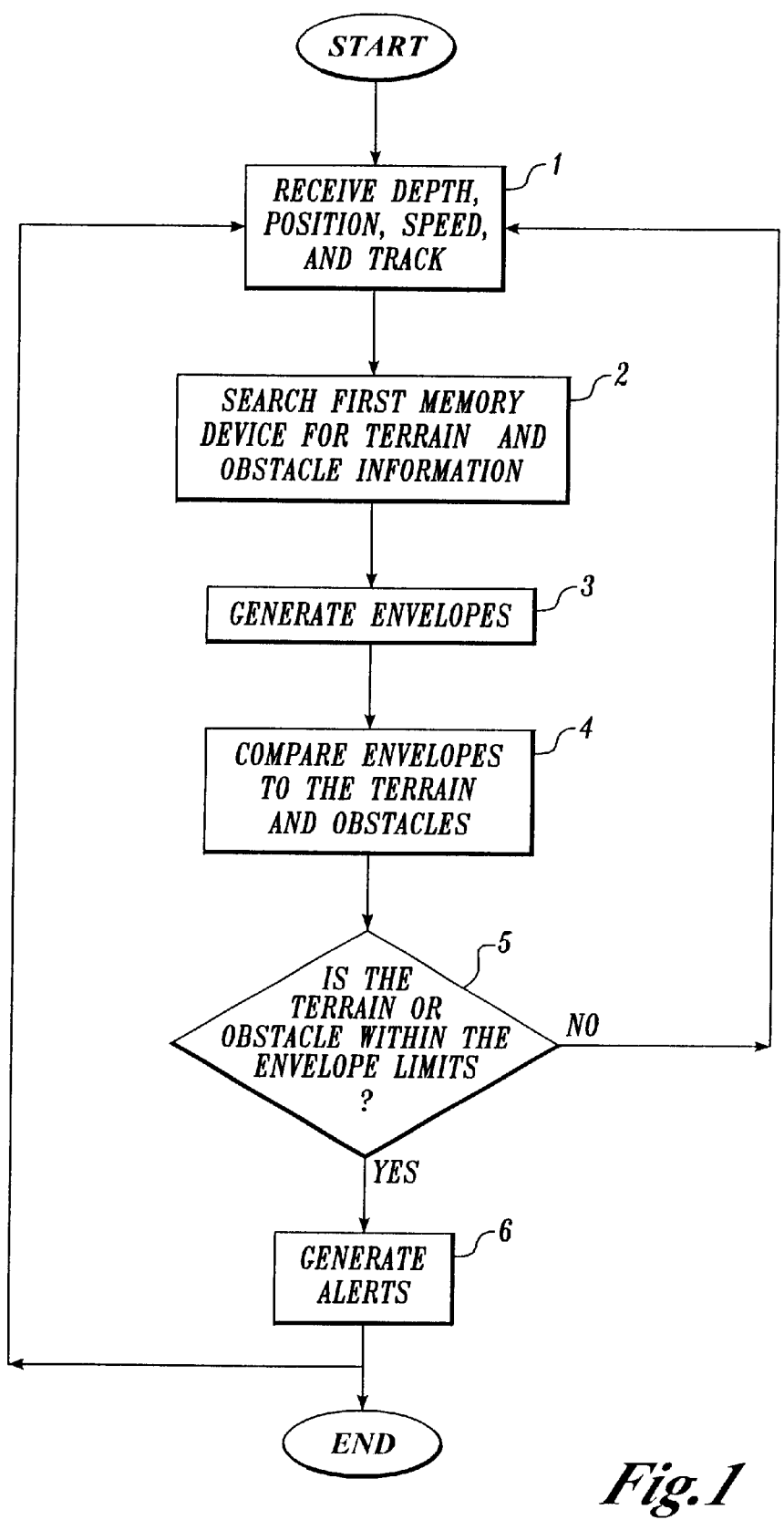
FIG. 1 is a top level flow chart illustrating operation of a warning system in accordance with a preferred embodiment of the invention.

FIG. 1 contains a flow diagram illustrating the conceptual operation and theory of the present invention. In FIG. 1, symbols representative of the depth and speed of the vessel, the track of the vessel, and the position of the vessel, are received in step 1. In step 2, search logic, based on the position of the vessel retrieves terrain and obstacle data relating to terrain and obstacles that are near the vessel current position. In step 3, based on the position, track, and speed of the marine vessel and the position and depth of terrain and obstacles proximate to the marine vessel, caution and warning envelopes are generated either about the vessel or about the surrounding terrain and obstacles. Optionally, and not shown in FIG. 1, the alert may be generated by comparing the closure rate of terrain with a predetermined closure rate limit as described more fully below. The envelopes represent a proximity limitation between the surrounding terrain and obstacles and the marine vessel, such that if the region between the marine vessel and the terrain is less than the envelopes, the marine vessel is in danger of colliding with the terrain.

Steps 4, 5 and 6, compare the position of the marine vessel and the position of the terrain and obstacles with the envelopes. If the marine vessel and the terrain are in closer proximity to each other than the area defined by the envelope, either both or one of an aural or a visual indication to the crew is provided that the vessel is in danger of colliding with the terrain. Optionally, step 6 may further include avoidance maneuver guidance. In addition, based on the generated envelopes and the output of the comparison step, appropriate displays may be provided to the crew illustrating the proximity of the marine vessel to the surrounding terrain and obstacles and alerting of any potential dangers. As such, the apparatus, methods, and computer program products of the present invention provide the user of a marine vessel information concerning the proximity of surrounding terrain such that the user may operate the marine vessel with reduced probability of collision or grounding.

Figure 2:
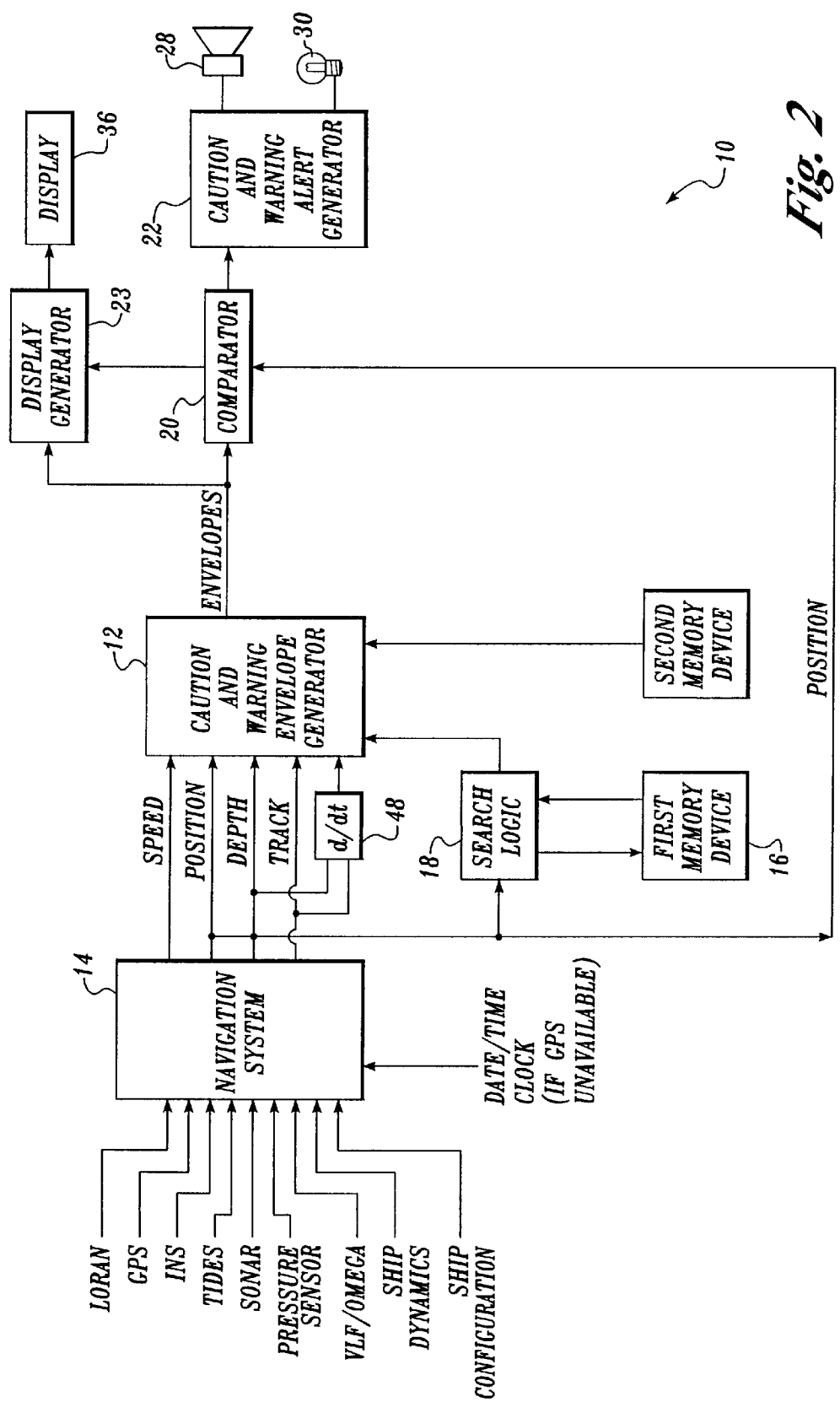
FIG. 2 is a block diagram of a warning system according to a preferred embodiment of the invention.

FIG. 2 contains a block diagram of an apparatus for providing terrain proximity alerts to a marine vessel according to one embodiment of the present invention. The apparatus of this embodiment of the present invention includes an alert generator 10 having a caution and warning envelope generator 12 for generating caution and warning envelopes. The apparatus of the present invention also includes a navigation system 14. The navigation system provides the speed/velocity of the marine vessel, the predicted track of the marine vessel, and the position of the marine vessel, (e.g., latitude and longitude) as well as corrections for tides, currents, ship dynamics and keel depth. Apparatus 10 also includes a first memory device 16 containing coordinate positions of terrain and obstacles, as well as the elevation or depth of the terrain for all or a portion of the global positions of the earth. Additionally, the apparatus of the present invention further includes search logic 18 for searching the first memory device and retrieving terrain data for terrain that is in proximity to the marine vessel. An optional, second memory device, 19, may be used to store ship unique parameters, such as, for example keel information, ship dynamics, mast heights, power configurations, etc.

A comparator 20 is coupled to the output of navigation system 14 and the caution and warning envelope generator 12. Comparator 20 receives the caution and warning envelopes generated from the caution and warning envelope generator and the coordinates of the position of the marine vessel from the navigation system. Based on the position of the marine vessel and the envelopes generated by the caution and warning envelope generator, the comparator determines whether the space between the marine vessel and the terrain proximate to the marine vessel is less than the boundaries defined by at least one of the caution and warning envelopes generated by the caution and warning envelope generator.

To notify the user of the proximity of terrain and obstacles to the marine vessel, the apparatus of the present invention further includes a caution and warning alert generator 22 connected to the comparator 20 for indicating to the user either aurally by a speaker 28 and/or visually by a lamp 30 of approaching terrain. Additionally, the apparatus of the present invention may also include a display generator 23 connected to the output of caution and warning envelope generator 12. Display generator 23 generates attitude and map displays that are applied to a display 36. Display generator 23 controls display 36 to display either or both a side view image showing the terrain and obstacles that lie in the path forward of the track of the marine vessel and a top view of the terrain below the marine vessel.

Signals from comparator 20 may also be applied to display generator 23. These signals permit display generator 23 to indicate whether the distance between the marine vessel and terrain is less than the boundaries defined by the caution and warning envelopes. The terrain threat severity is typically illustrated in the displays by changing the color and/or dot pattern density of the terrain displayed by the display to the user. The elements features and operation of the present invention described briefly above, will now be described in detail below.

In addition to providing apparatus and methods, the present invention also provides computer program products for providing a terrain proximity warning system for use in marine vessels. The computer program products have a computer readable storage medium having computer readable program code means embodied in the medium. In FIG. 2, the computer readable storage medium may be part of the memory device 16, and the alert generator 10 of the present invention may implement the computer readable program code means to provide a terrain proximity warning system for use in marine vessels as described in the various embodiments above.

The computer-readable program code means includes first computer instruction means for comparing a current coordinate position of the vessel to a prestored coordinate position of terrain proximate to the vessel and second computer instruction means for providing an alert when the vessel is in a potentially hazardous proximity to the terrain as defined by a predetermined criterion to be described in detail below.

In some embodiments, the computer-readable program code means further includes computer instruction means for storing a database containing depth data for different global coordinates of the earth. In this embodiment, the first computer instruction means determines the current coordinate position of the vessel and searches the memory device for the prestored coordinate position of terrain proximate to the vessel. The computer-readable program code means may further include a computer instruction means for generating an envelope relative to at least one of the vessel and the proximate terrain. The first computer instruction means determines if the other of the vessel and the terrain penetrates the envelope, and the second computer instruction means provides an alert if the envelope is penetrated.

FIGS. 1 and 2 are flowchart block diagram and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations of FIGS. 1 and 2, and combinations of blocks or steps in the block diagram, flowchart or control flow illustrations, can be implemented by special purpose hardware-based computer systems which perform the specified functions or steps, or combinations of special purpose hardware and computer instructions.

2.0 NAVIGATION SYSTEM AND SHIP DYNAMICS

The invention receives various inputs and together with stored models of the vessel's characteristics and performance, outputs data useful for computing the proximity alert envelopes. In the embodiment of FIG. 2, navigation system 14 may serve this purpose. The ship's current position may be obtained by reference to on board navigation systems such as a global positioning system (GPS), inertial navigation system (INS), LORAN, and/or VLF/OMEGA. Optionally, a navigation fix can be manually entered into the ship's navigation system or autopilot by the crew and this information supplied to navigation system 14. Preferably, navigation system 14 retains the vessel's current position as a set of latitude/longitude coordinates.

While GPS is typically the most advantageous to use as it provides the most accurate data, it must be understood that any particular navigation system may be used. A combination of systems may also be implemented. For example, when the submarine is at the surface of the water, the submarine may operate using a GPS system. However, when the submarine is submerged, an INS system or other type of navigation system may be implemented. Kalman filtering may also be employed to obtain a blended navigation solution based on the various navigation inputs.

Navigation system 14 may also use the time derivatives of position information to obtain information on ship speed and course and present heading, as well as set and drift due to local currents. Such calculations are well known to those of ordinary skill in the art. Optionally, navigation system 14 may receive these inputs directly from other onboard systems, for example, the autopilot, GPS and/or INS, that calculate these values.

The position data and the data described in the previous paragraph are used to develop an estimate of the vessel's anticipated track and/or the vessel's instantaneous heading and velocity vectors. This data is in turn utilized for the computation of alerts in the manner(s) to be described in more detail below.

Navigation system 14 also stores data or retrieves input from other shipboard systems as needed to compute the maximum hull depth. In the case of a submerged submarine, this parameter can be computed or obtained directly from on board pressure instrumentation such as a fathometer designed to measure depth below the surface. Such data may therefore include the nominal keel depth, current weight of vessel, consumables and cargo, and moment of inertia data as well as tide tables. The tide tables may be used in conjunction with clock data obtained from the ship's clock or GPS system to compute changes from mean sea level. These changes may be applied either as a correction to the maximum hull depth of the vessel or applied as a correction to the depth of underwater terrain features. In a preferred embodiment of the invention, the tide correction is applied to the hull depth to avoid the numerous calculations necessary to apply this correction to all terrain features.

The invention may also contain data useful for computing vessel motion and performance characteristics. Typical analysis of vessel motion includes analysis of both "calm water" effects as well the vessel sea keeping characteristics. The "calm water" effects are those that are attributable to forces arising from operation of the vessel's control surfaces and propulsion systems. Sea keeping characteristics analyze the vessel motion due to wave action in the frequency domain. Since the present invention addresses hazards related to submerged vessels, a preferred embodiment of the invention omits analysis of vessel motion due to wave action which is predominantly a surface phenomenon. Omitting calculation of these effects has the added benefit of speeding the processing time and reducing the computational work loads associated with the present invention. Nonetheless, the invention can be implemented in a form that includes such a description of vessel behaviors, for example, in the form taught by Price and Bishop in *Probabilistic Theory of Ship Dynamics* (Wiley and Sons, NY).

A preferred embodiment of the invention thus includes a modular six degree of freedom model of vessel behavior. Optionally, a reduced set of equations with fewer degrees of freedom can be used. A reduced set of equations saves computation time and may be suffiecient when only translation and pitch motions nee be calculated. For completeness, the complete model may be generically described as given below.

$$m \begin{bmatrix} u \\ v \\ r \end{bmatrix} = f \left\{ \begin{bmatrix} \text{hydrodynamic} \\ \text{terms} \end{bmatrix} + \begin{bmatrix} \text{propulsion} \\ \text{terms} \end{bmatrix} + \begin{bmatrix} \text{inertial} \\ \text{terms} \end{bmatrix} + \begin{bmatrix} \text{wave action and} \\ \text{environmental terms} \end{bmatrix} \right\}$$

where: m is the vessel mass matrix

U is the vessel speed vector

Figure 3:
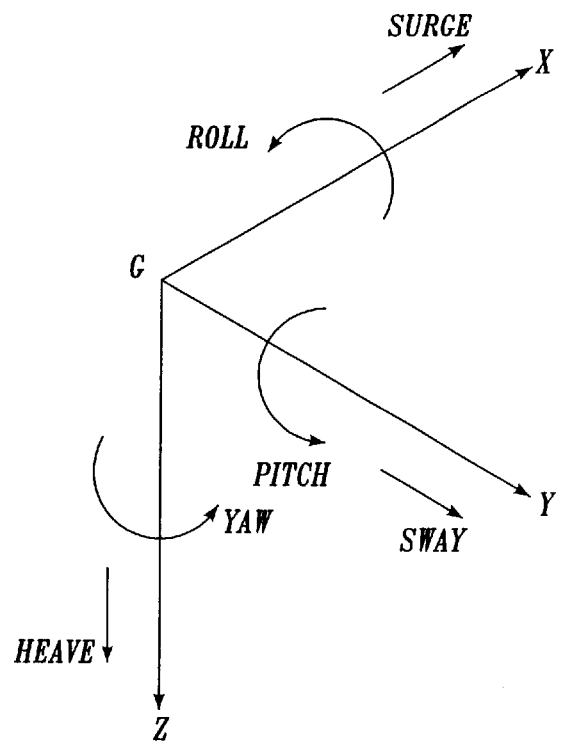
FIG. 3 illustrates a set of coordinates axes and forces useful for understanding ship motions as described in the present application.

X, Y, Z and the surge, heave and sway forces as shown in FIG. 3 and u, v, I are the angular rates about the axes of FIG. 3

Although there are several mathematical models suitable for use with the present invention, the modular approach permits modeling of effects due to propulsion and steering as well as vessel configuration to be easily incorporated. Wilson et al. in *Modeling and Control of Marine Craft* (Elsevier Applied Science, Pourzanjani and Roberts eds.), incorporated herein by reference for all purposes, describe one set of models suitable for use with the present invention. Specifically, these equations describe the forces X, Y, Z and corresponding moments K, M, N about the orthogonal axes x, y, z. In the analysis to follow, these equations are written with a coordinate system centered on the vessel center of gravity, however, it is to be understood that the invention is not so limited and as known to those of skill in the art, similar equations may be written about any axis, for example the stability, or equilibrium axes. The generalized equations of motion can thus be written as:

$$X = m(urrv) \quad \text{surge equation}$$
$$Y = m(v + ru) \quad \text{sway equation}$$
$$N = I_{zz}\dot{r} \quad \text{yaw equation}$$

Where & is the angular rate of yaw with respect to time, and u, v are the velocity components of the vessel track.

Note that since a submerged vessel can move vertically due to lift, heave forces are not due to solely wave effects or other sea keeping phenomenon and should therefore be included in the description of vessel motion. This attribute of the submerged vessel distinguishes the submerged vessel from the surface vessel. The additional resulting heave and pitch equations thus have the form:

$$Z = m(r - uv) \quad \text{heave equation}$$
$$M = I_{yy}\dot{v} \quad \text{pitch equation}$$

Direct measurement of the forces X, Y, Z proves difficult in practice and therefore it is customary to expand these equations as sets of differential equations written in terms of measurable quantities. These sets of equations are sometimes known as the state space equations for the vessel. By way of example, the surge, sway and yaw equations can be expanded to have the form:

$$m(\bar{u}rv - x_G r^2) = X_u \dot{u} - Y_v vr - \frac{u}{|u|} Y_{dotr} r^2 + X_{vr} vr$$

-continued $$m(\dot{v} + ru + x_G) =$$
$$Y_{dotv}\dot{v} + Y_r \dot{r} Y_v v + \frac{u}{|u|} Y_r r + Y_{v|v|} v|v| + Y_{v|r|} v|r| + \frac{u}{|u|} Y_{r|r|} r|r|$$

$$I_{zz}\dot{r} + mx_G(\dot{v} + ur) = N_v \dot{v} + N_r \dot{r} N_r r + \frac{u}{|u|} N_v v + N_{r|r|} r|r|$$

In the preceding equations all terms with subscripts mean partial differentiation with respect to that variable. Some terms in these equations have absolute values. The absolute value operator ensures that the force contribution acts in the correct direction when the vessel is turning. Derivatives are typically in non-dimensional form, relating performance to design parameters such as block coefficient, draft and beam. The nondimensional matrix of coefficients can be determined empirically or analytically during ship design and sea trials. Alternatively, in the absence of vessel specific data, and as is known to those of skill in the art, the various non-dimensional coefficients have been determined for various classes of vessels and can be applied with minimal error to the vessel of interest. Propulsion and thrust effects may also be considered in terms of dimensionless coefficients in the manner taught by Wilson et al. in Pourzanjani and Roberts.

The set of performance equations can thus be solved numerically by the present invention to describe vessel motion and performance and to predict an anticipated track or path if desired. In one preferred embodiment of the invention, navigation system 14 is utilized for performance of these calculations.

The vessel unique data required to obtain the matrix of state space coefficients may be directly input into system 10 at the time of installation aboard the ship memory 19. Optionally a PCMCIA card may be used to store these values thereby allowing a single line replaceable unit to be installed in any vessel simply by changing to the card associated with that vessel. Optionally, system 10 may be loaded with a set of data for various classes and/or designs of vessels with this data stored in a look up table memory within system 10 and accessible by navigation system 14. When system 10 is installed aboard as a line replaceable unit or other hardware device, the category of vessel can then be selected by a programming pin.

Any of the methods described above for predicting the ship motion may also be used to predict ship performance, for example, in a turning maneuver and or stopping distances under various speed, rudder, and screw configurations. The turning performance and stopping distance data can further be utilized to calculate an avoidance maneuver as will also be described below.

Optionally, each ship typically has a set of advance and transfer tables that describe the forward and lateral distances traveled by the ship in a 90° turn at various speeds. These values are usually determined during sea trials of the vessel by performing turning circles at various speeds. The advance and transfer values for each vessel may be loaded into system at time of installation for later access by navigation system 14.

3.0 COASTAL, WATERWAY AND PORT DATA BASES

The system 10 memory stores information concerning the position and depth of terrain and obstacles for different locations on earth. This information is usually stored in the first memory device as a latitude and longitude with an associated depth or clearance height referenced to mean sea level.

Data from which to create terrain and underwater databases may be obtained from a variety of sources including NOAA Bathametrics data and/or from digitizing nautical charts.

In one embodiment, in order to save storage space, the terrain and obstacles may be represented by geometric shapes, such as cones, that are superimposed over the terrain and obstacles. These geometric shapes have a height that corresponds approximately to the height of the terrain or obstacle. As such, each terrain feature or obstacle in the memory device may be defined by a position, height, and width. For example, a mountain or mountain range may be represented by a cone or series of cones illustrating the peak of the mountain or the base of the cone represents the base of the mountain this method of data storage is described in greater detail in U.S. Pat. No. 4,646,244 to Bateman et al, entitled: Terrain Advisory System" incorporated herein by reference. As illustrated in the Bateman '244 patent, this method of data storage allows for compaction of the data such that smaller storage devices may be utilized.

Figure 4:
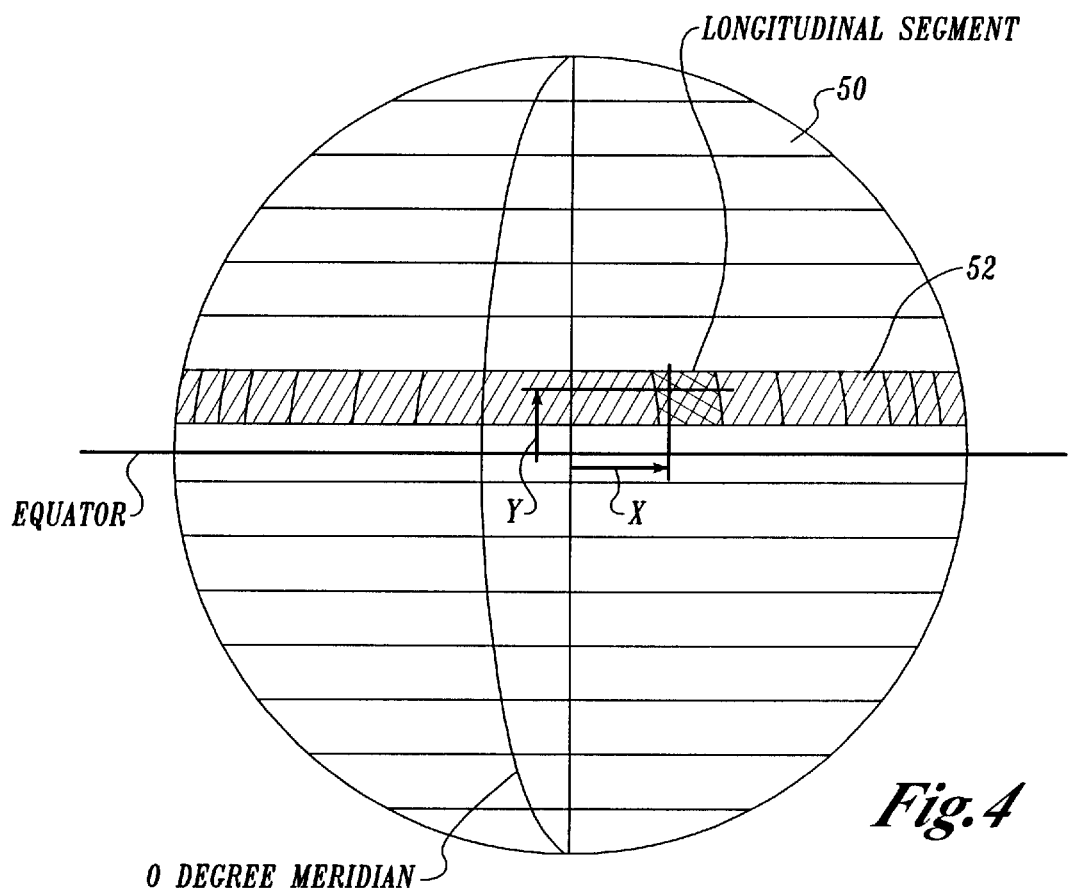
FIG. 4 illustrates the organization of terrain data into latitude and longitude segments in accordance with a preferred embodiment of the invention.
Figure 5:
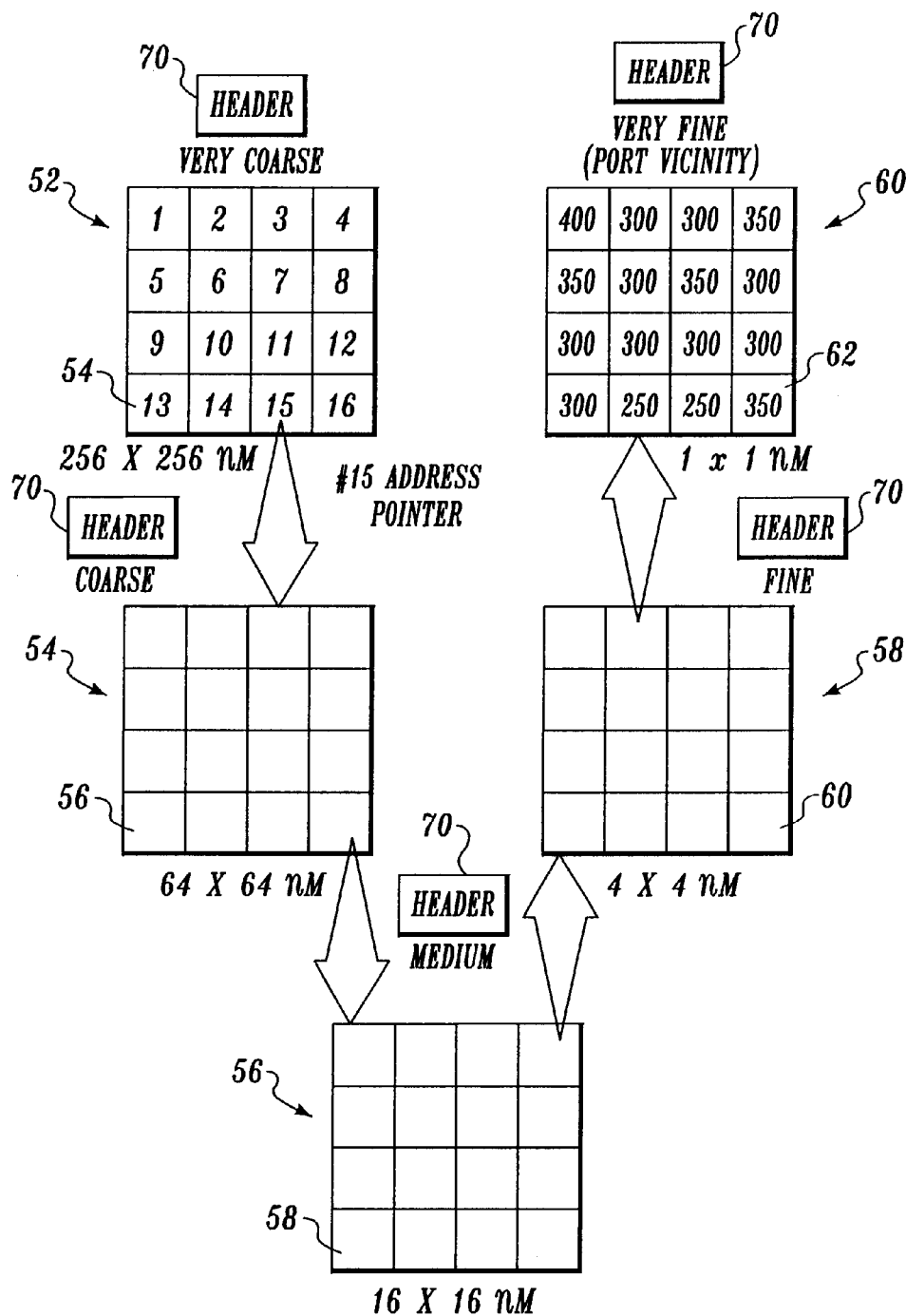
FIG. 5 is a graphical representation of the various memory map and resolution sequencing in accordance with the present invention.

In a preferred embodiment of the invention, however, a terrain database 24 containing port data and coastal/waterway data is separated into two different data bases 24' and 24", respectively, not shown, the structure of which is illustrated in FIGS. 4–6. Such a configuration allows either of the data bases 24' or 24" to be updated without the need to update the other.

Port data base 24' contains various types of information relating to ports, such as channel approaches, buoys, docks, underwater features and obstructions, Tides and designation data. Data base 24" is preferably structured to provide varying resolutions of terrain data as a function of the topography of the terrain, as well as water depth. For example, a relatively high resolution can be provided close to port and to shore while in deeper water, a coarser resolution is sufficient.

Data bases 24' and 24" may be formed from semiconductor storage devices well known to those of skill in the art such as, for example: flash erasable programmable read only memory (ROM) devices, such as a gash EEPROM; or mini hard disk drives, and/or PCMCIA cards which could take advantage of known data compression techniques to reduce the amount of storage space required and also promote easy data retrieval by search algorithm 29.

FIGS. 4 through 6 illustrate the organization of data bases 24' and 24". In FIG. 4 the world is divided into a plurality of latitude bands 50, for example each about 4° wide around the equator such that each longitudinal segment 52 is about 256×256 nautical miles. In order to maintain a relatively constant segment size, the number of longitudinal segments 52 per latitude band 50 are reduced closer to the poles.

Since the number of latitude bands 50 and the number of longitudinal segments 52 per latitude band 50 is fixed, determination of the particular segment corresponding to the current vessel position is readily determined. For example, the vessel current latitude X is used to determine the latitude band number. Next, the number of longitudinal segments 52 associated with that band 50 is determined either by way of a LOOK-UP table or by calculation. Once the number of longitudinal segments 52 in the particular latitude band 50 of interest is determined, the current longitudinal position Y of the vessel can be used to readily determine the longitudinal segment number.

The minimum data associated with each longitudinal segment 52 corresponds to the point closest to the surface as defined by the mean sea level within that segment. As mentioned above, each of the segments 52 is approximately 256×256 nautical miles. As shown in FIG. 5, longitudinal segments 52 are broken down into various subsquares to provide varying levels of resolution. For example, each segment 52 may be broken down into a plurality of subsquares 54, each subsquare 54 being 64×64 nautical miles to provide a very coarse resolution. The subsquares 54, can, in turn, be further subdivided into a number of subsquares 56, for example, each 16×16 nautical miles, to provide a coarse resolution. These subsquares 56, in turn, can be subdivided into a plurality of subsquares 58, for example each 4×4 nautical miles, to provide a medium resolution. The subsquare 58 can also be broken down into a plurality of subsquares 60, for example 1×1 nautical miles, to provide a fine resolution. In the vicinity around ports, it may even be desirable to break down the subsquares 60 down into smaller subsquares 62 to provide even finer resolution, for example ¼×¼ nautical miles. These segments may be further subdivided as needed to provide the desired resolution.

Figure 6A:
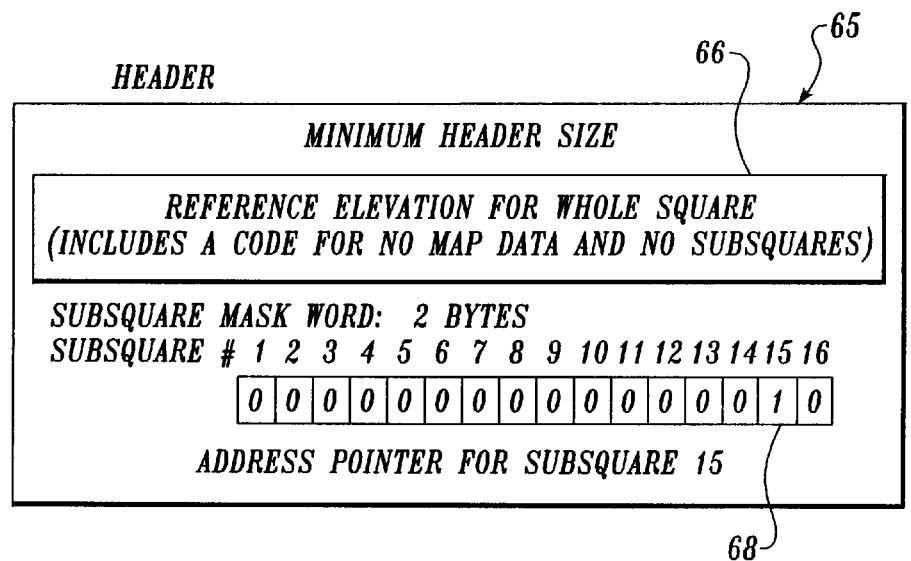
FIG. 6A is an exemplary representation of the digital header and subsquare mask word for identifying geographical areas in accordance with the present invention.

As shown in FIG. 6A, the data associated with each longitudinal segment 52 comprises a header 65 which includes a multiple data byte 66 which includes the reference depth which corresponds to the point of least depth for all the subsquares within the segment, which assumes that the highest point in a square is representative of the entire square elevation. Multiple data byte 66 may also include a flag to indicate when no further subdividing is required for certain geographical areas, for example, deep water areas. To facilitate updating the data base on a piecewise basis, multiple data byte 66 may also contain a flag bit or code indicating that data corresponding to further subdivisions does not exist for a particular segment 52 containing a code indicating that no map data exists in the segment.

For areas having significant underwater terrain and areas in the vicinity of a port, the longitudinal segments 52 are subdivided as discussed above. In such a situation, the stored data would include a 2-byte mask word 68, which points to the subsquares having different depth data. For example, as shown in FIG. 6A, the 2-byte mask word 68 is illustrated with a pointer in the box 15 within the subsquare 54 within the longitudinal segment 52, which represents a different depth which points to the next finer layer of resolution as discussed above. The subsquares each include a header 70 including a mask as described above to enable a pointer for each subsquare having a different depth to point to the next finer layer until the finest resolution level desired is reached as shown.

The data base structure provides for flexibility as to resolution required and can be constructed on a piecewise basis at different times. As such, the structure contains the entire framework necessary to add new data or modify existing data without changing any of the software. The size of the data base is proportional to the resolution and the size of the area to be covered.

Figure 6B:
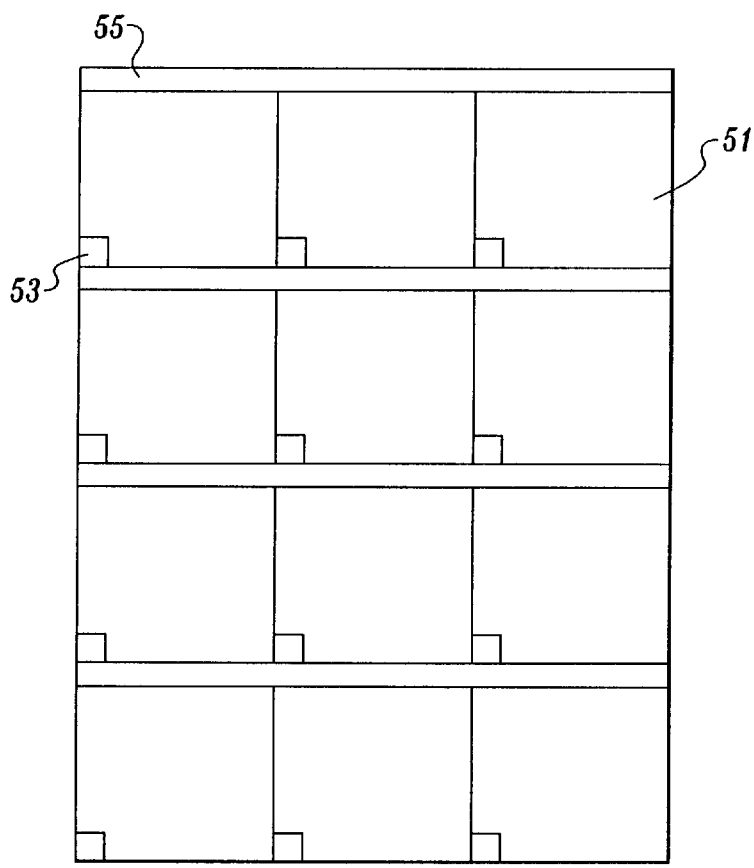
FIG. 6B is a terrain map alternative to FIG. 5.

Alternatively, the world may be divided into a plurality of, for example, 1°×1° map files or cells 51 as shown in FIG. 6B. The various map files 51 may be formed with variable resolution. More particularly, each of the map files may be subdivided into a plurality of subcells 53 with the most significant terrain depth in each subcell indicated, with the resolution of all of the subcells within a particular map file being of the same resolution.

The size of the subcells 53 is varied to provide varying degrees of resolution. For example, for relatively high resolution, the size of the subcells 53 may be selected as either 15×15 arc seconds or 30×30 arc seconds. The size of the subcells 53 may also be varied as a function of the terrain in particular coastal or waterway areas. The size of the subcells 53 may also be varied as a function of the distance to the nearest port or shoreline.

Figure 7:
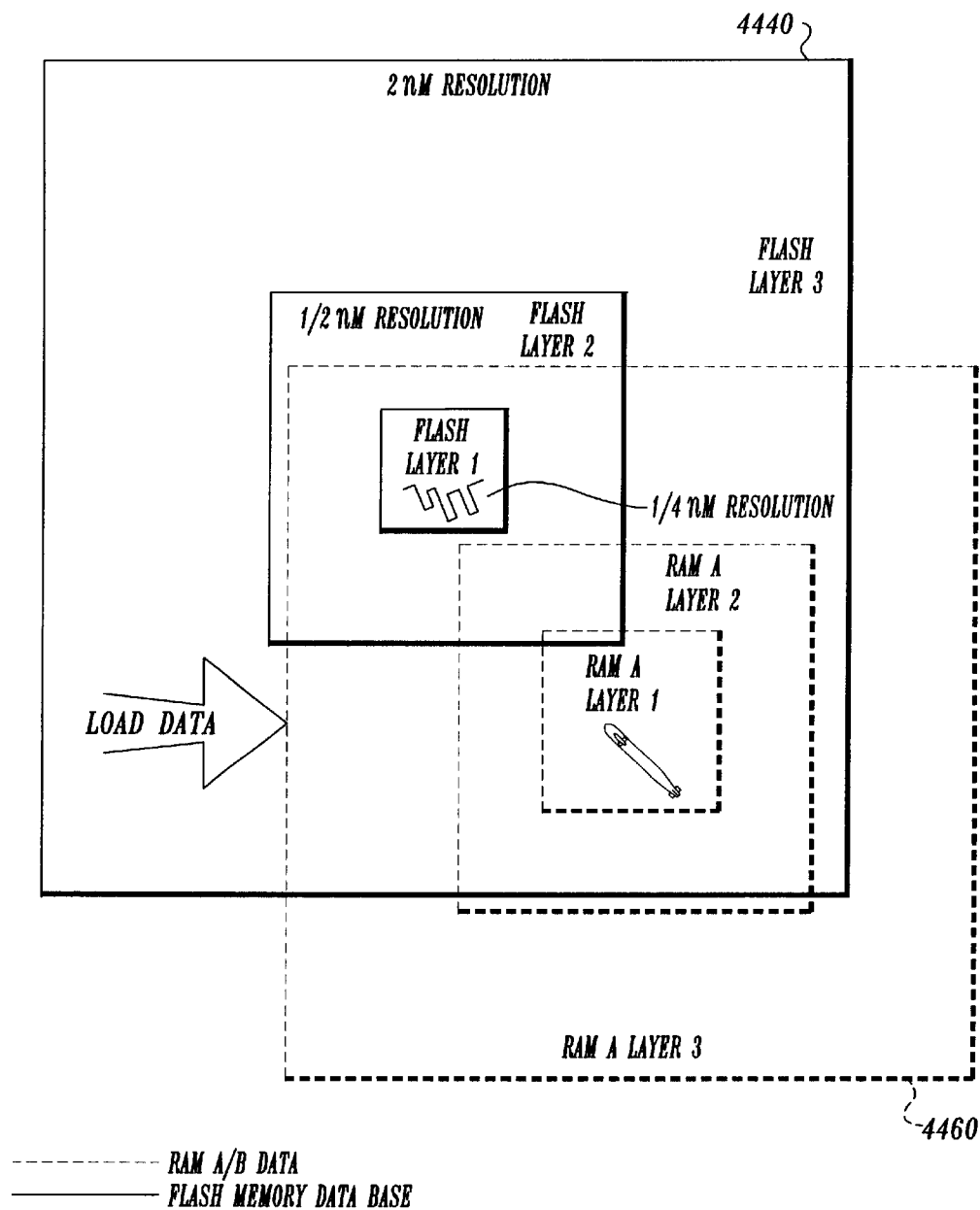
FIG. 7 is a block diagram illustrating the configuration of a flash ROM for a terrain data base and a RAM used with a preferred embodiment of the present invention.

As discussed below and as illustrated in FIG. 7, the data base may be compressed by a compression algorithm and stored in a flash read only memory (ROM). Various compression algorithms already known to those of skill in the art are suitable for this application. The compression algorithm does not form a part of the present invention.

Figure 8:
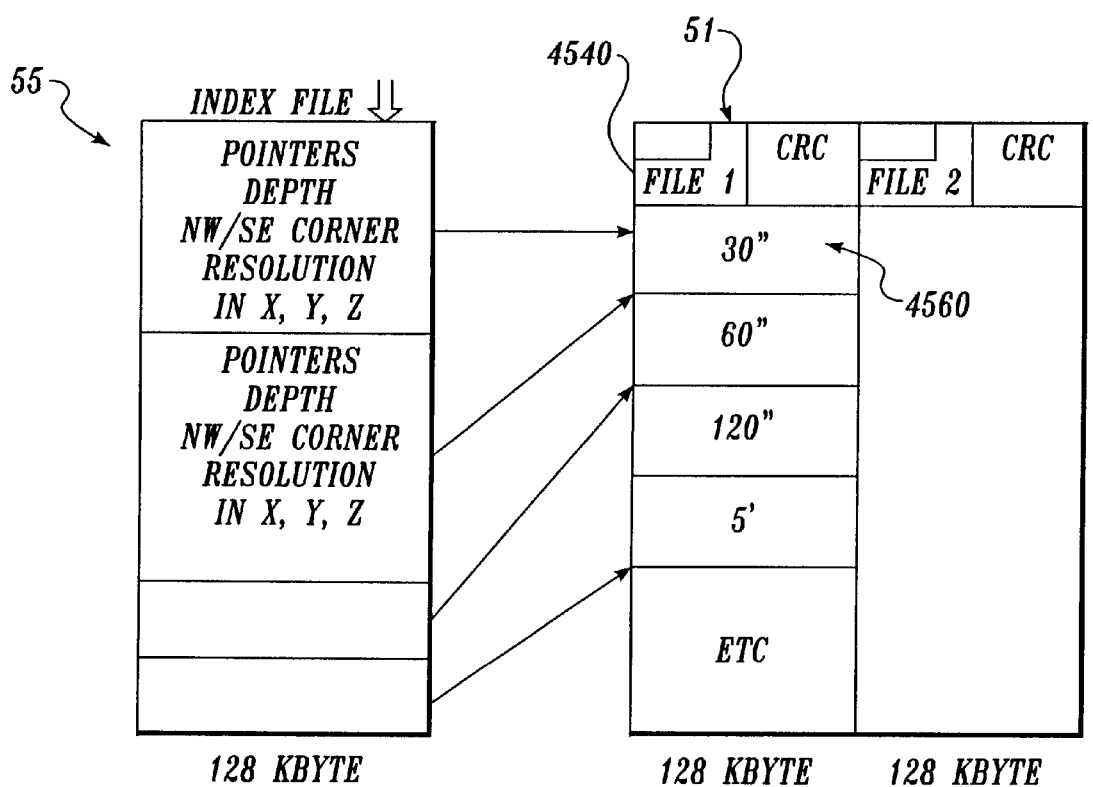
FIG. 8 is a diagram of the file format of the files in the terrain data base in accordance with a preferred embodiment of the present invention.

In order to simplify computation, each of the map files includes a header 55, which includes, inter alia, the resolution of the particular map file 51 as well as the location of one or more corners, for example, the northwest and southwest corners. The headers 55 as well as the map files 51 are illustrated in more detail in FIG. 8.

4.0 ALERTING ENVELOPE LOGIC/ AVOIDANCE LOGIC

Information about the ship position and dynamics as described in the preceding section are compared to the terrain and obstacle information according to an alert logic designed to alert the crew to potential collision hazards. The alert logic can take one of several forms as described in greater detail in the following sections. Use of the various alert logic schemes is not necessarily mutually exclusive, and can coexist. In alternative embodiments of the invention, the present invention may further include an avoidance guidance logic that advises the crew what actions to take once a potential collision hazard has been detected by the alert logic. The avoidance logic is also described in greater detail below.

4.1 REACTIVE ALERT LOGIC

A first embodiment of the invention utilizes a sonar device to sense the depth of underwater obstructions beneath the vessel. The invention evaluates the time rate of change of the depth soundings and does not require input from the terrain database. When the time rate of change exceeds a predetermined value, an alert is provided to the crew. The alert may be aural, visual or both.

Such a device is mostly applicable to submarines and is less applicable to surface vessels since the time rate of change of the terrain below a surface going vessel may be far in excess of the surface vessel's ability to conduct a turn for avoidance. Furthermore, terrain such as shallow sand bars and other uncharted obstacles may appear suddenly supplying little time for avoidance. In contrast, a submarine is more likely to be navigating in underwater regions having canyons and trenches and in underwater terrain generally more analogous to mountainous terrain. In addition, the submarine can make an ascending maneuver to avoid the terrain and is not limited to simply conducting a left or right turn for avoidance.

Figure 9A:
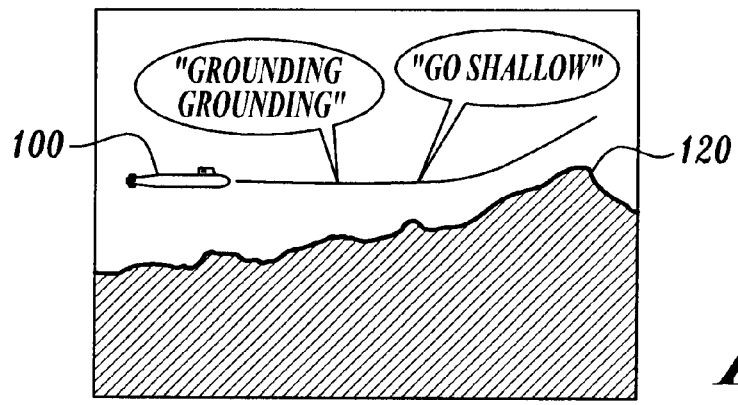
FIG. 9A depicts a submersible vessel in a hazardous condition due to an excessive closure rate with terrain.
Figure 9B:
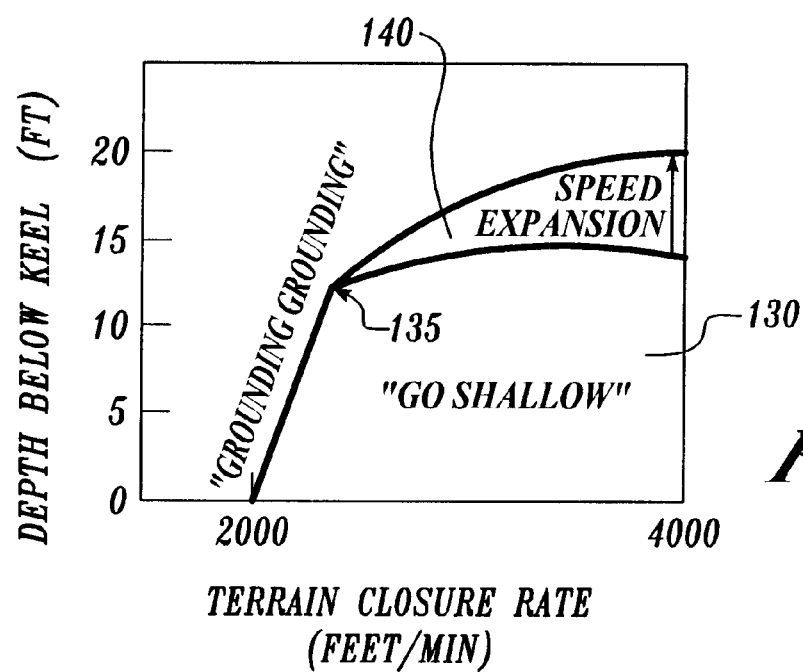
FIG. 9B illustrates an excessive closure rate with terrain reactive alerting envelope according to a preferred embodiment of the present invention.

FIGS. 9A and 9B depict an excessive terrain closure alerting situation. FIG. 9A depicts a submarine 100 conducting an avoidance maneuver in accordance with the teachings of the present invention. In FIG. 9A the submarine approaches the underwater ridge 120. As submarine 100 nears the ridge, its closure rate with the terrain beneath it increases and a "caution" warning is given by repeating the word "grounding" twice. As submarine 100 continues toward ridge 120, the closure rate increases as ridge 120 steepens and a "warning" is sounded requiring immediate evasive action. In a preferred embodiment the warning is annunciated by the command "go shallow". In the example of FIG. 9A, submarine 100 releases ballast and decreases its depth below the ocean surface, thereby clearing the terrain obstruction.

FIG. 9B shows a graph of a warning envelope useful for alerting a submerged vessel of close proximity to terrain as described in connection with FIG. 9A. In region 130 of FIG. 9B the submarine is in such close proximity to terrain that a warning is given and an "emergency blow" is required to clear the underwater terrain. In this region the "GO SHALLOW" audible warning is repeated continuously until the warning envelope is exited. In region 135 of FIG. 9B enough time exists between the warning and the expected time of impact with the terrain that the submarine can change its depth in time to clear the terrain. In this instance a caution alert is provided in the form of a "GROUNDING, GROUNDING" audible alert. Region 140 is an optional speed expansion envelope that may be employed to reduce nuisance warnings when the submarine is operating at high speed.

Applicants acknowledge that the performance of naval submarines may be classified and the curves shown in FIGS. 9A and 9B are based on nominal values. One of skill in the art would understand, based on the curves in FIGS. 9A and 9B, how to design a warning envelope based upon the actual submarine performance values.

Figure 10A:
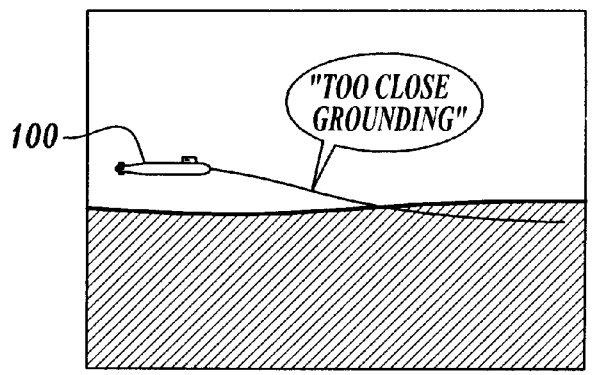
FIG. 10A illustrates a submersible vessel in a hazardous condition due to insufficient terrain clearance.
Figure 10B:
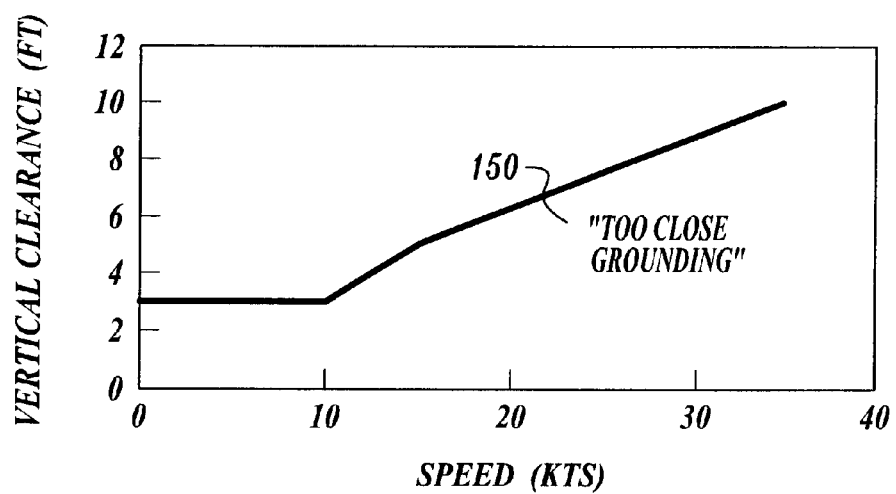
FIG. 10B illustrates an insufficient terrain clearance reactive alerting envelope according to a preferred embodiment of the present invention.

FIG. 10 shows a warning envelope based on insufficient terrain clearance when the vessel is in shallow waters such as in a river channel or approaching a port or harbor. In the curves of FIG. 10 an audible "TOO CLOSE GROUNDING" warning is given when the vessel enters region 150 of the graph. A warning light or other visual warning indication may; also be provided.

4.2 PREDICTIVE ALERTING

Figure 11:
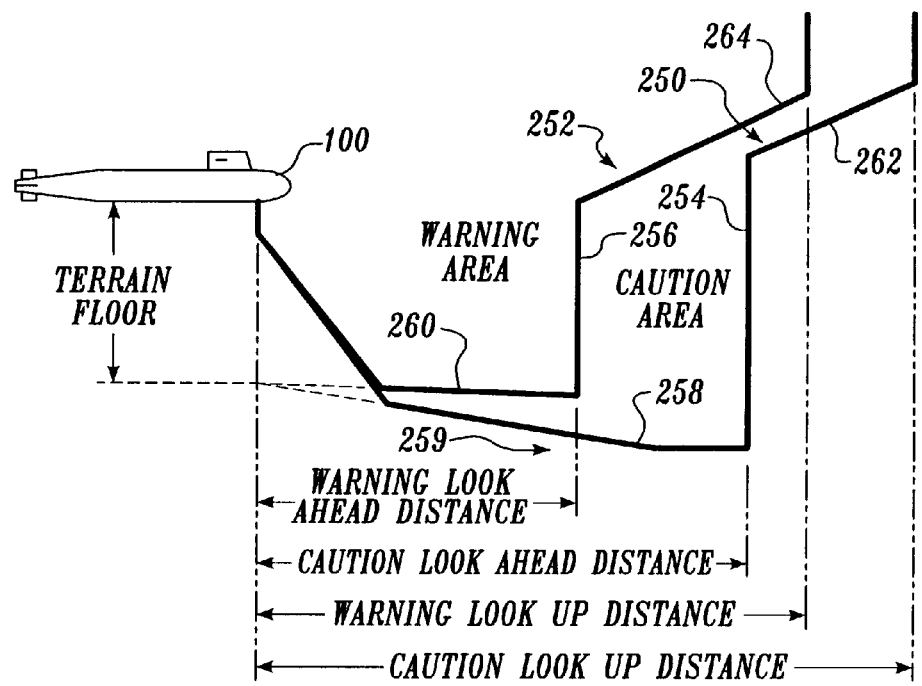
FIG. 11 illustrates a look ahead/look down alert envelope according to a preferred embodiment of the invention.

In the previous section, the alerting scheme is reactive and detects encroaching terrain. Predictive alerts are possible when the position of the vessel is known relative to the terrain. The following sections detail various predictive alerting schemes which can be utilized with the present invention 4.2.1 Look Ahead/Look Down/Look Up Alerts FIG. 11 illustrates caution and warning envelopes obtained using a look-ahead/look-down/look-up envelope. Specifically, the apparatus, methods, and computer program products of the present invention according to this embodiment generate both a caution and a warning envelope, 250 and 252, respectively. The caution warning envelope 250 is typically generated to provide initial caution alerts to the user of the marine vessel concerning terrain that is proximate to the marine vessel, while the warning envelope 252 is typically generated to provide a more critical indication to the user that the marine vessel is in immediate danger of colliding with the terrain and obstacles and evasive action in required.

The envelopes generated according to this embodiment of the invention eliminate or reduce the number of nuisance alarms likely to occur. For instance, as illustrated in FIG. 11, the caution and warning envelopes typically have a predefined look ahead distances, 254 and 256, that define the distance ahead of the path of the marine vessel in which terrain is analyzed and caution and warning alerts are generated. Furthermore, the caution and warning envelopes also include lower boundaries or terrain clearance floor boundaries, respectively that define the depth below the marine vessel for which caution and warning alerts are generated. Additionally, when used for submarines, the caution and warning envelopes may also include caution and warning look up boundaries, 262 and 264, to provide alerts to hazardous terrain located ahead of and above the present position of the submarine. Further detail on the construction of these boundaries is provided below.

As illustrated in FIG. 11, the caution and warning envelopes each have an associated look ahead distance boundary, 254 and 256, respectively, past which caution and warning alerts are not generated. The determination of these look ahead distance boundaries is typically based on the operational characteristics of the marine vessel. Specifically, the look ahead distance values for the caution and warning envelopes are typically selected such that the user of the marine vessel will have sufficient time to note the alert and perform an evasive maneuver. The look ahead distance values are also typically restricted in length to avoid generation of nuisance alarms.

For example, the look ahead distance value (LAD) for the caution envelope may be defined as two times the time needed for the vessel to perform a turn at present speed plus an added reaction time (nominally 10 seconds) for the user to note the alert and initiate the turn, each multiplied by the speed of the vessel.

$$LAD = \overline{U}[(2 \times \text{turn time}) + \text{react time}] + C$$

where C is a fixed distance constant, e.g. C=0

Additionally, however, because a marine vessel can Typically stop during operation, the look ahead distance values may also be based on a time for the marine vessel to stop prior to colliding with the terrain. The stopping time and turning characteristics of the vessel for use in the calculation of the look ahead distance can be obtained in the manner described in section 2.0. The LAD may also be provided with a configurable upper and lower limit. For example, for large vessels the limit may be set, for example, at 0.5 nautical miles (nm) for low speeds (<2 kts) and 4 nm at cruising speed.

As detailed above, the caution and warning envelopes of the present invention may thus include look ahead distance values based on either the time required to turn the marine vessel or the time required to stop the marine vessel. In some embodiments, however, it may be advantageous to generate separate look ahead distance values, one based on the time to turn the marine vessel and one based on the time to stop the marine vessel. Specifically, depending on the operational parameters of the marine vessel it may take less time or distance to stop the marine vessel than to turn the marine vessel to miss the terrain. For example, if the marine vessel is traveling at a slow speed, turning effectiveness is reduced and it may be faster to stop the marine vessel. As such, in this embodiment, the caution and warning generator generates look ahead distance values based on both the time to turn the marine vessel and to stop the marine vessel and then selects the smaller respective look ahead distance values for both the caution and warning envelopes.

As also shown in FIG. 11, the caution and warning envelopes also include respective terrain clearance floors, 258 and 260 referenced from the hull maximum depth as obtained according to section 2.0. The terrain clearance floors relate to a distance ΔH below the marine vessel for which caution and warning alerts concerning underlying terrain are generated.

For marine vessels, the terrain clearance floor may may be defined with reference to the shoreline or a closest shallow geographic point. Specifically, when the marine vessel is a considerable distance from the shoreline or a shallow geographic point, The depth of the terrain clearance floor below the marine vessel may be deeper, as there is typically less terrain closer to the bottom of the marine vessel that would create nuisance alarms. However, as the marine vessel approaches a known port or moorage contained in the system 10 data base, if the depth ΔH of the terrain clearance floor is not decreased, the approaching terrain near the shoreline or shallow point will create nuisance alarms. As such, the depth of the terrain clearance floor envelopes may be dynamically varied with respect to the marine vessel's proximity to the port such that adequate protection is provided in open waters and channels where collision with terrain is less expected, while nuisance alarms are reduced in moorages and ports where the ocean bottom is rising to meet the land, but where the vessel must nonetheless make way. For example, the terrain clearance floor may be in terms of 5 to 10 feet of clearance when the marine vessel is offshore and decreases from 5 to 2 feet as the marine vessel nears port.

Figure 12:
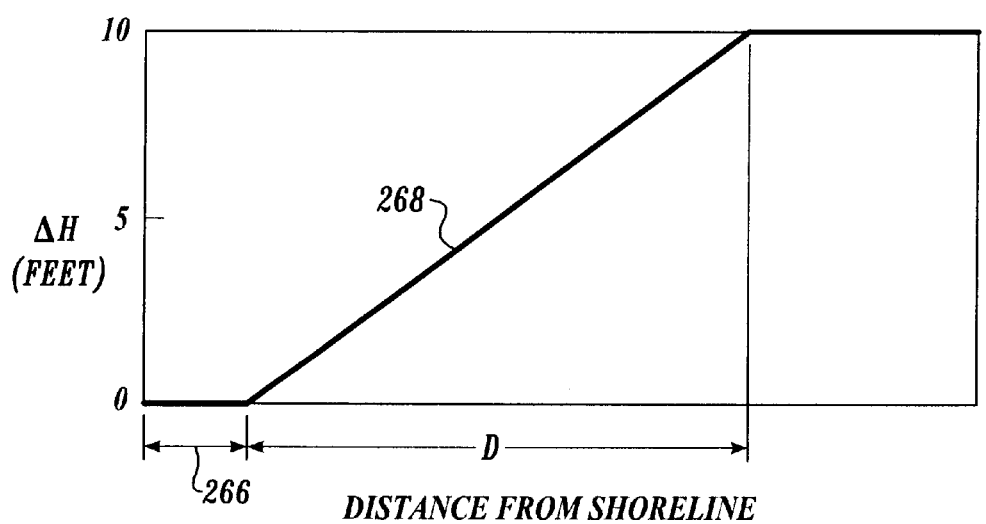
FIG. 12 illustrates a terrain clearance floor as a function of distance from moorage according to a preferred embodiment of the invention.

FIG. 12 illustrates graphically an example of the terrain clearance floor for a caution warning envelope for different distances from port. The horizontal axis of the graph represents the distance from moorage, while the vertical axis represents depth ΔH of the terrain clearance floor. As illustrated, there is typically an initial offset distance 266 between the beginning of the envelope and the moorage. This offset is an added distance that accounts for inaccuracies in the position data associated with the stored position for the moorage and the position data indicated by the navigation system as the current position of the marine vessel. Further, the graph for the terrain clearance floor of this embodiment, includes a first segment 268, that extends from the offset distance 266 out to a distance D. Beyond the distance D, the terrain clearance floor has a constant depth ΔH of 10 feet.

A submarine, much like an aircraft, can move both horizontally and vertically with respect to terrain, while a surface ship can only move horizontally. For this reason, in some embodiments, it is advantageous to alter the caution and warning envelopes associated with a submarine, such that the envelopes more accurately reflect the orientation of the marine vessel with respect to surrounding terrain.

Figure 13:
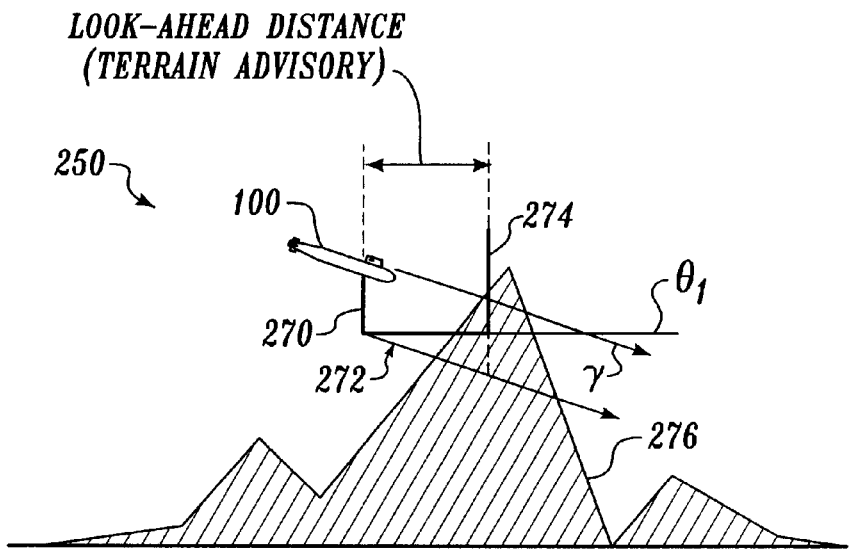
FIG. 13 is a graphical illustration of a look ahead boundary caution envelope for a condition when the submersible marine vessel is diving according to a preferred embodiment of the invention.
Figure 14:
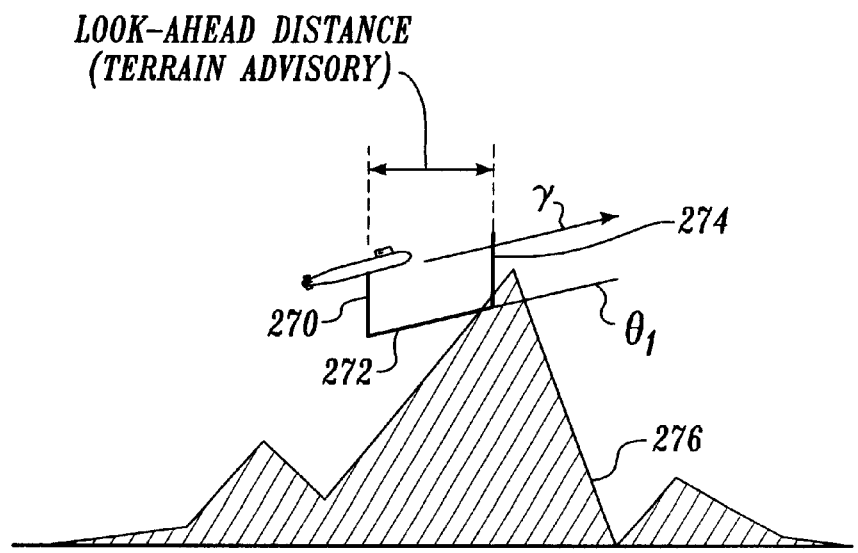
FIG. 14 is similar to FIG. 13 but for a condition when the submersible is ascending.

Specifically, FIGS. 13 and 14 illustrate graphically alteration of the caution envelope to account for vertical movement of the marine vessel. In particular, FIG. 13 illustrates a condition where the marine vessel is diving in a vertical direction by an angle γ, while FIG. 14 illustrates a condition where the marine vessel is ascending in a vertical direction by an angle γ.

In FIG. 13, caution envelope 250 of FIG. 11 is illustrated. As discussed previously, the caution envelope is defined by a terrain clearance floor depth 270 and an extension 272 to a look ahead distance 274. As illustrated in FIG. 13, the marine vessel is diving by a dive angle γ. To determine the orientation of the caution envelope to reflect the dive angle of the marine vessel, the dive angle γ is compared to a configurable datum angle $\theta_1$. In this example, $\theta_1$ is equal to 0°. For the condition illustrated in FIG. 13, the dive angle γ is less than $\theta_1$. In this instance, the extension 272 of the caution envelope 250 extends downwardly to the look ahead distance 274 at the angle γ. If the marine vessel is ascending and has an ascending angle γ that is greater than $\theta_1$ as illustrated in FIG. 14, the extension 272 of the caution envelope 250 extends upwardly to the look ahead distance 274 at the angle γ.

As shown in FIGS. 13 and 14, if the marine vessel is ascending, only terrain 276 that penetrates the upward-sloping caution envelope will cause a caution alert. As such, due to the upward movement of the marine vessel, terrain located at the current depth of the marine vessel that does not penetrate the envelope will not generate a caution alert, thereby minimizing nuisance warnings.

Figure 15:
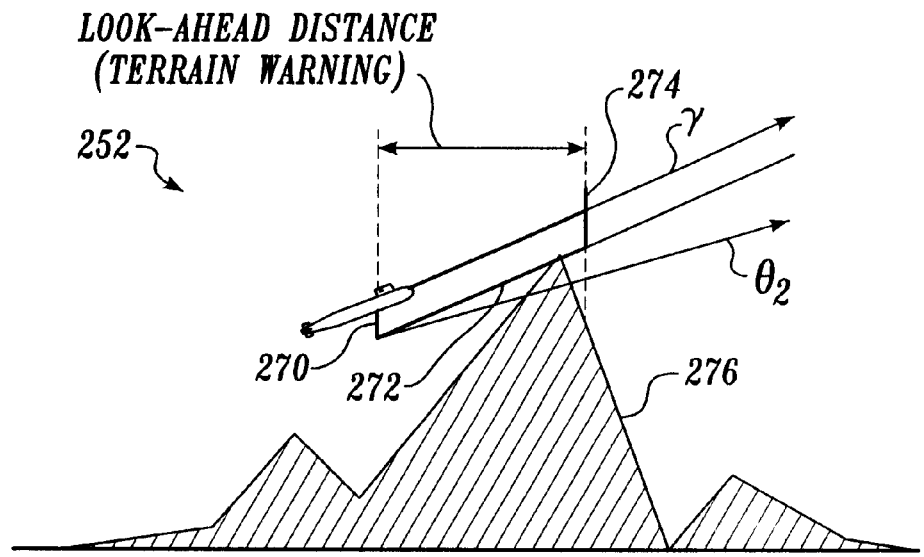
FIG. 15 is a graphical illustration of a LOOK-AHEAD warning envelope for a condition when the submersible marine vessel is diving according to a preferred embodiment of the invention.
Figure 16:
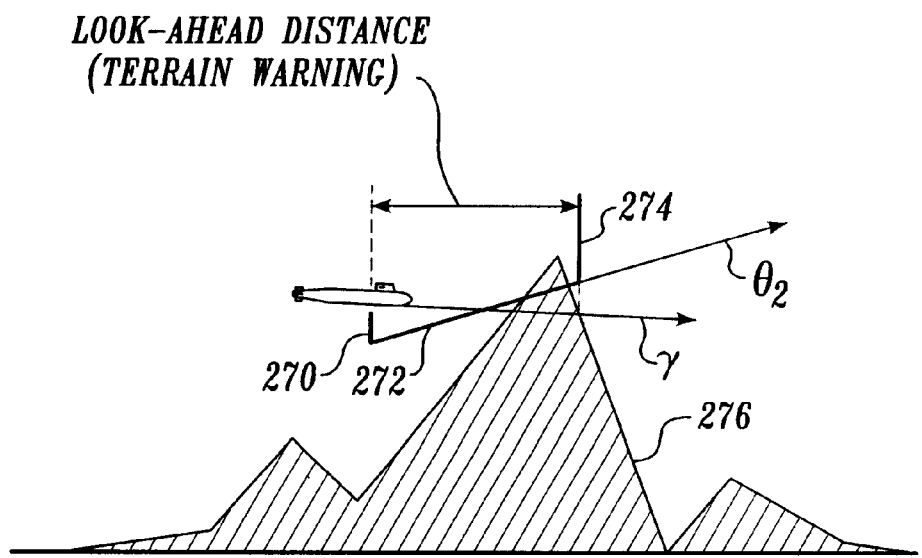
FIG. 16 is similar to FIG. 15 but for a condition when the vessel is ascending.

FIGS. 15 and 16 illustrate graphically alteration of the warning envelope to account for vertical movement of the marine vessel. Specifically, FIG. 16 illustrates a condition where the marine vessel is diving in a vertical direction by an angle γ, while FIG. 15 illustrates a condition where the marine vessel is ascending in a vertical direction by an angle γ. As discussed previously, penetration of the warning envelope by terrain or obstacles indicates to the user of the marine vessel that an immediate evasive action is required to avoid contact with the terrain or obstacles. Furthermore, in this embodiment, the terrain clearance floor depth 270 for the warning envelope is ½ the terrain clearance floor.

As illustrated in FIG. 16, the marine vessel is diving at an angle γ. To determine the orientation of the caution envelope to reflect the dive angle of the marine vessel, the dive angle γ is compared to a configurable datum angle $\theta_2$. Datum angle $\theta_2$ may be selected as the angle of the average climb for a marine vessel. Datum angle $\theta_2$ may be selected based on the type of marine vessel, configuration, and other performance parameters.

For the condition illustrated in FIG. 16, the dive angle γ is less than the configurable datum angle $\theta_2$. In this instance, the extension 272 of the caution envelope 250 extends downwardly to the look ahead distance 274 at the angle γ. If the marine vessel is ascending and has an ascending angle γ that is greater than $\theta_2$ as illustrated in FIG. 15, the extension 272 of the caution envelope 250 extends upwardly to the look ahead distance 274 at the angle γ.

As shown in FIGS. 15 and 16, if the marine vessel is ascending, only terrain 276 and obstacles that penetrate the upward-sloping caution envelope will cause a caution alert. As such, due to the upward movement of the marine vessel, terrain or obstacles located at the current depth of the marine vessel that do not penetrate the envelope will not generate a warning alert.

Figure 17:
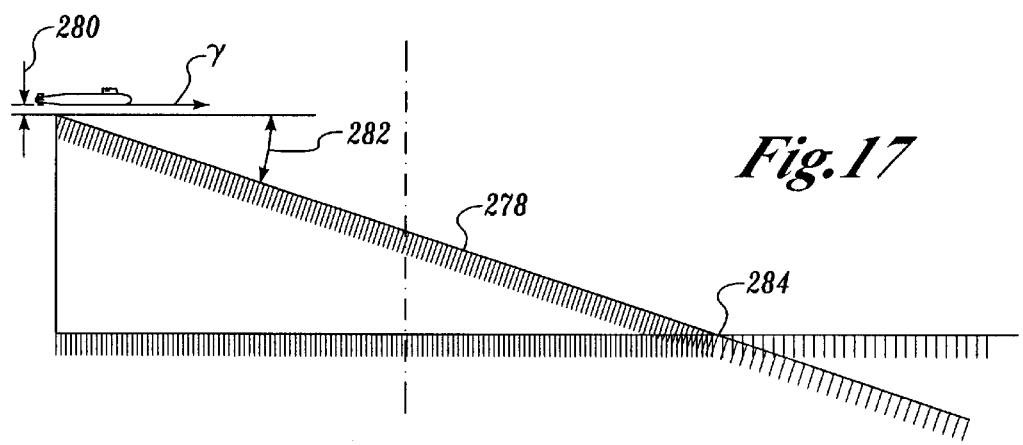
FIG. 17 is a graphical illustration of an alert envelope having a cut off boundary according to an embodiment of the present invention.

In some embodiments of the present invention, the caution and warning envelopes may further include cut-off boundaries to avoid spurious warnings when the marine vessel passes terrain or obstacles at a relatively close distance. Without the cut-off boundaries, alerts would be generated although the terrain is below the marine vessel and no terrain is ahead of the marine vessel. In FIG. 17, the cut-off boundary 278 begins at a predetermined envelope cut-off offset 280 below the marine vessel and extends in a direction in front of the marine vessel at a predetermined envelope cut-off angle 282. The cut-off angle is equal to the angle of the marine vessel plus a configurable predetermined cut-off angle 282. When the submersible is neither ascending or descending, as shown in FIG. 17, the cut-off boundary 278 extends from the cut-off offset 280 in the direction of the cut-off angle 282 toward the front of the marine vessel to a point 284 where it intersects either a caution or warning envelope boundary 286. Such conditions where γ is zero, the cut-off boundary 278 illustrated in FIG. 17 extends from the cut-off offset 280 along an angle equal to the cut-off angle. The boundary for the caution or warning envelope is selected to be the higher of the boundary 286 or cut-off boundary 278. Thus, as illustrated in FIG. 17, the envelope comprises the cutoff boundary 278 to the point 284, where the cut-off boundary intersects the envelope boundary 286. From the point 284, the boundary is envelope boundary 286. Thus, if either a caution or warning envelope is below the cut-off boundary, cut-off boundary becomes the new boundary for the envelope.

Figure 18:
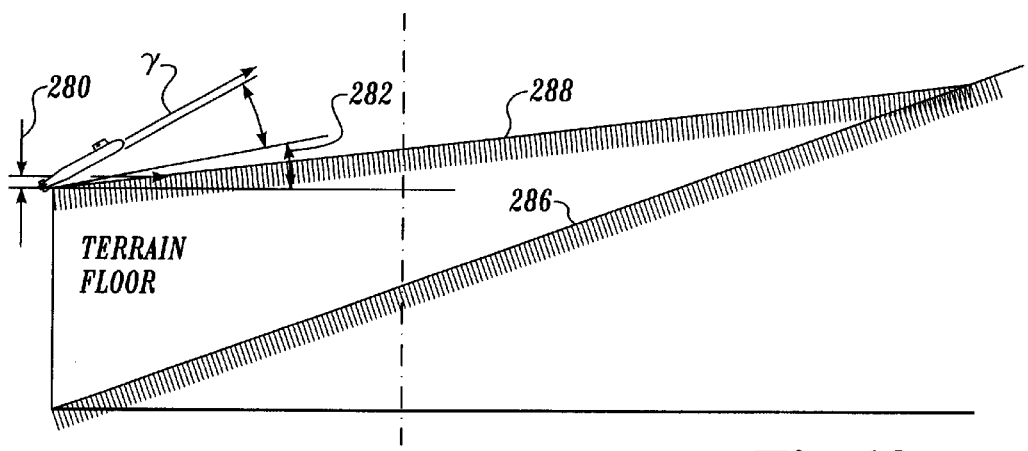
FIG. 18 is similar to FIG. 17 but for a condition when the vessel is ascending.

The cut-off angle 282 is limited such that if the path angle γ is a relatively high ascent angle, the cut-off angle does not exceed a predetermined limit. In particular, in FIG. 18, the path angle γ is shown at a relatively high ascention rate. An unlimited cut-off angle is illustrated by the segment 288. As shown, this segment 288 is 6° below the path angle. To decrease the sensitivity of the system during conditions when the path angle is relatively large, for example 9°, indicative of a fairly steep ascent, the cut-off angle is limited. In the example illustrated FIG. 15, the cut-off angle limit is selected, for example, to be 1.4°. Thus, at path angles γ greater than 7.4, (i.e., 1.4+6), the cut-off angle will result in an envelope cut-off boundary, which is more than 6° below the path angle γ. Thus, for the operation conditions shown in FIG. 18, the segment 288 begins at the cut-off offset and continues along a line inclined 1.4° from level until it intersects the caution or warning boundary 286 at the point 290. The caution or warning envelope will be formed by the limited cut-off boundary 288 up to the point 290 and will continue with the boundary 286.

Figure 19:
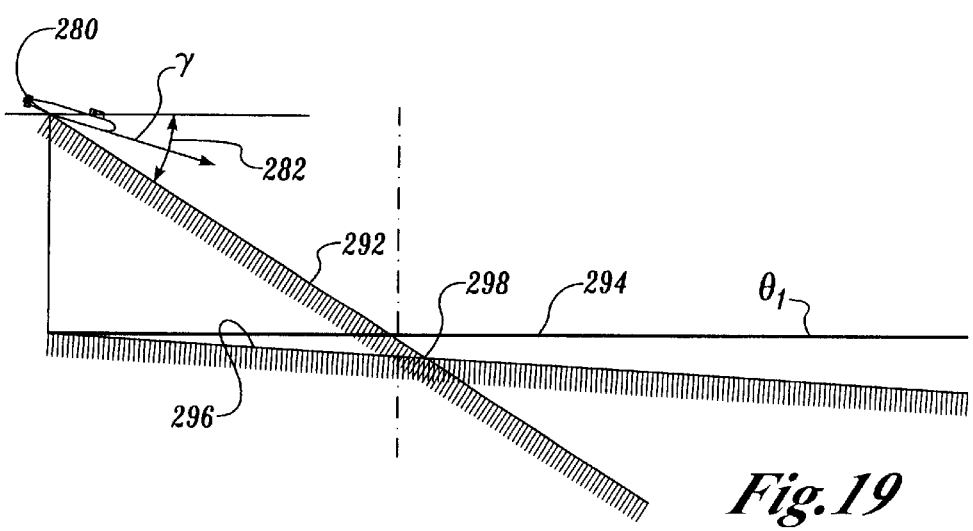
FIG. 19 is similar to FIG. 17 but for a condition when the vessel is diving.

FIG. 19 illustrates an instance where the marine vessel is diving, and thus, the path angle γ is less than 0. During conditions when the path angle γ is less than the normal dive angle, the boundary is lowered past the cut-off boundary for high-sink rate situations in order to prevent nuisance alarms. In particular a sink rate enhancement is provided and is effective anytime the path angle γ is below a predetermined configurable dive bias GBIAS, for example −4°. During this condition an angle β is added to the first datum $\theta_1$. In particular, when the path angle γ is greater than the descent bias angle GBIAS or the path angle γ is less than zero, β is selected as 0. When the path angle γ is greater than 0, β is defined as:

$$\beta = \gamma - \theta_1; \text{ for } \gamma > 0.$$

When the path angle γ is less than GBIAS, β is defined as:

$$\beta = k(\gamma - GBIAS)$$

where k=0.5, for example.

FIG. 19 illustrates an example condition where the path angle γ=−8°. During this condition, the cut-off angle 282 is selected to be 6°, for illustrative purposes, below the path angle and thus defines an envelope cut-off boundary 292 that extends from the cut-off offset 280 along a line, which is −14° from the horizontal axis. Since the path angle γ is less than GBIAS, the angle β is added to the normal boundary according to $\beta = \gamma - \theta_1$. For a path angle of −8°, β=2°. Thus, the warning envelope boundary 294, instead of extending along the angle $\theta_1$, extends along an angle, which is 2° below the $\theta_1$ slope to define an enhanced boundary 296. The cut-off boundary extends to the point 298 where it intersects the enhanced boundary 296. Since the cut-off angle boundary 292 is higher than boundary 296 up to the point 298, the cut-off boundary 292 is used as the warning envelope boundary up to point 298. Beyond point 298, the enhanced warning boundary 296 is used.

Figure 20:
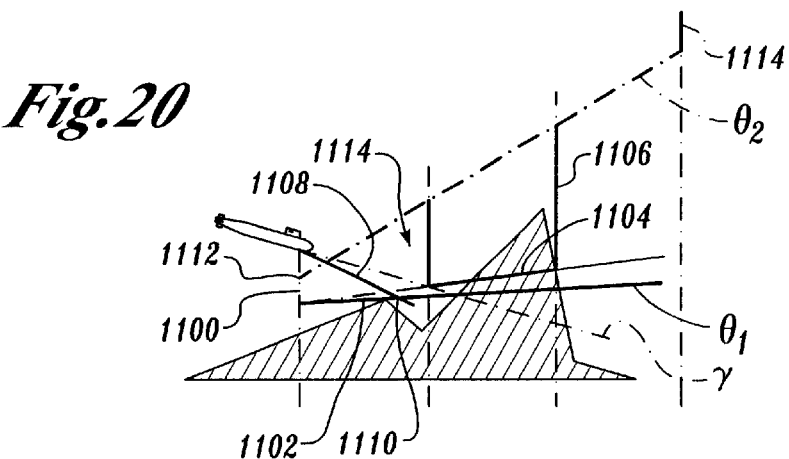
FIG. 20 is a graphical illustration of the terrain advisory and superimposed terrain warning signals for a submersible vessel relative to the terrain for a condition when the vessel path angle is less than a first reference plane or datum.
Figure 21:
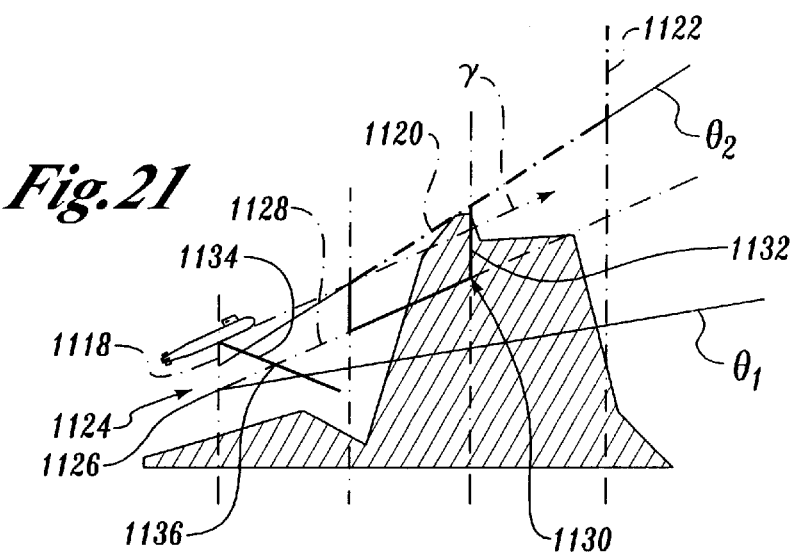
FIG. 21 is similar to FIG. 20 but for a condition when the path angle is between a first datum and a second datum.
Figure 22:
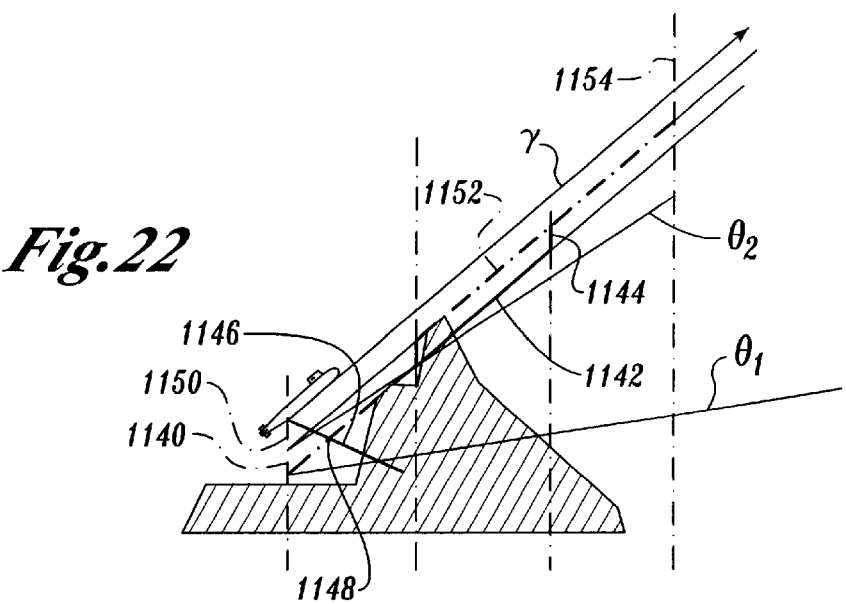
FIG. 22 is similar to FIG. 20 but for a condition when the path angle is less than the second datum.

FIGS. 20–22 illustrate composite caution and warning envelopes for different conditions. The cross-hatched area illustrates terrain or obstacles in close proximity to the marine vessel. FIG. 20 illustrates a condition when the path angle γ of the marine vessel is less than the first datum $\theta_1$. FIG. 21 illustrates a condition when the path angle γ of the marine vessel is between first datum $\theta_1$ and second datum $\theta_2$. FIG. 22 illustrates a condition when the path angle γ of the marine vessel is greater than the first datum $\theta_1$. The caution envelope is indicated by solid lines, and the warning envelope is indicated by dashed lines.

In FIG. 20, the caution envelope includes a boundary 1100, which extends from the marine vessel to the terrain clearance floor. Normally, the lower boundary 1102 would extend from the segment 1100 along an angle equal to the $\theta_1$ slope. However, in this situation, the path angle is illustrated to be greater than the GBIAS angle, therefore, an enhanced boundary 1104 is utilized, which extends along an angle that is equal to the first datum $\theta_1$ angle plus the β angle, up to the look ahead distance for the caution envelope. A vertical boundary 1106 extends from the first datum $\theta_1$ vertically upward along the look ahead distance for a caution envelope. Since the cutoff boundary 1108 is higher than the caution envelope boundary 1102 up to the point 1110, where the two boundaries intersect the cutoff boundary 1108 becomes the caution envelope boundary up to the point 1110. Beyond the point 1110, the boundary 1104 is used as the caution boundary.

The warning envelope boundary includes a boundary 1112 extending to a point equal to one-half of the terrain clearance floor. A boundary 1114 extends from the boundary 1112 at the slope of the second datum $\theta_2$. A vertical boundary 1116 extends from the boundary 1114 along the look ahead distance for a warning envelope.

FIG. 21 illustrates a situation when the path angle γ is greater than the angle $\theta_1$ and less than or equal to the angle $\theta_2$. During this condition, the boundary for the warning envelope extends along a segment 1118, which is at one-half of the terrain clearance floor. A sloping boundary 1120 extends from the segment 1118 to the look ahead distance for a warning envelope. From there, a vertical boundary 1122 extends vertically upward to define the warning envelope.

The caution envelope includes a boundary 1124, which extends downwardly to the terrain clearance floor at point 1126. From the point 1126, the caution envelope extends along a segment 1128 at the path angle γ up to a point 1130, the look ahead distance for a caution envelope. A vertical segment 1132 extends along the look ahead distance from the boundary 1128 at the point 1130.

In this illustration, an envelope cutoff boundary 1134 cuts off a portion of the caution envelope since the path angle γ of the marine vessel is greater than a predetermined limit. Thus, the portions of the envelope below the cutoff angle boundary 1134 are ignored, and the segment 1134 becomes the effective caution envelope up to the point 1136, where the cutoff boundary 1134 intersects the caution envelope indication boundary 1128. After tile point 1136, the boundary will be the effective caution envelope.

FIG. 22 illustrates a situation when the path angle γ is greater than $\theta_2$. In this situation, a caution boundary 1140 extends from the marine vessel to the terrain clearance floor. The lower boundary 1142 extends at the path angle γ from the boundary 1140 up to the look ahead distance for a caution envelope. A vertical caution boundary 1144 extends upwardly along the look ahead distance for the caution envelope. Since the path angle γ is illustrated to be greater than GBIAS, a segment 1146, the cutoff boundary, defines the boundary up to a point 1148 where the caution boundary intersects the cutoff boundary. After that point, segment 1142, which is higher, becomes the caution boundary.

The warning envelope extends along a segment 1150 down to a point one-half of the terrain clearance floor. A lower boundary 1152 extends along an angle between the path angle γ, since it is greater than second datum $\theta_2$. A vertical boundary 1154 extends upwardly from the boundary 1152 along the look ahead distance for a warning envelope.

Figure 23:
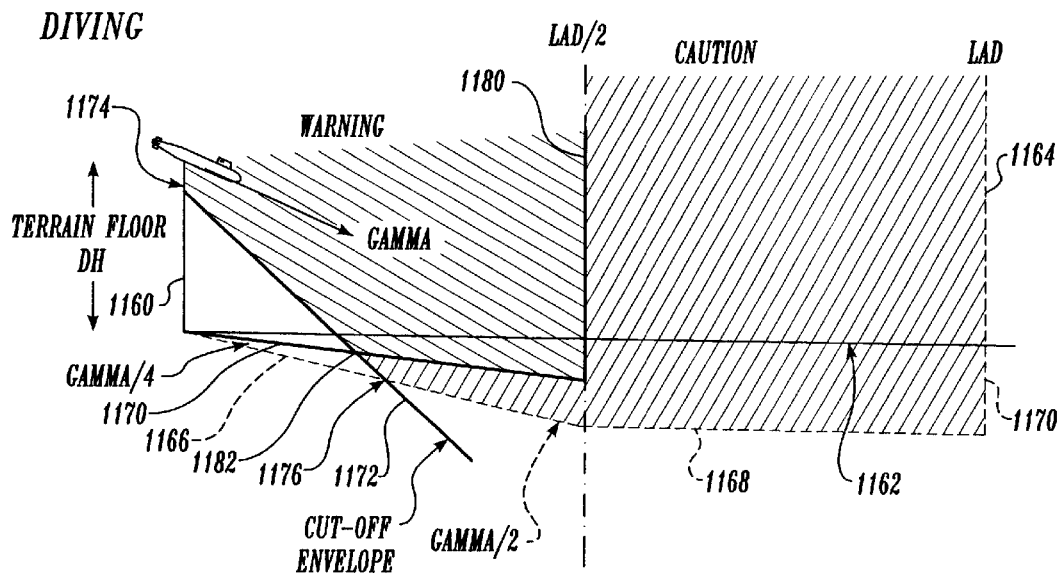
FIG. 23 is a graphical illustration of look ahead/look down terrain advisory and warning boundaries for a condition when the submersible is diving.
Figure 24:
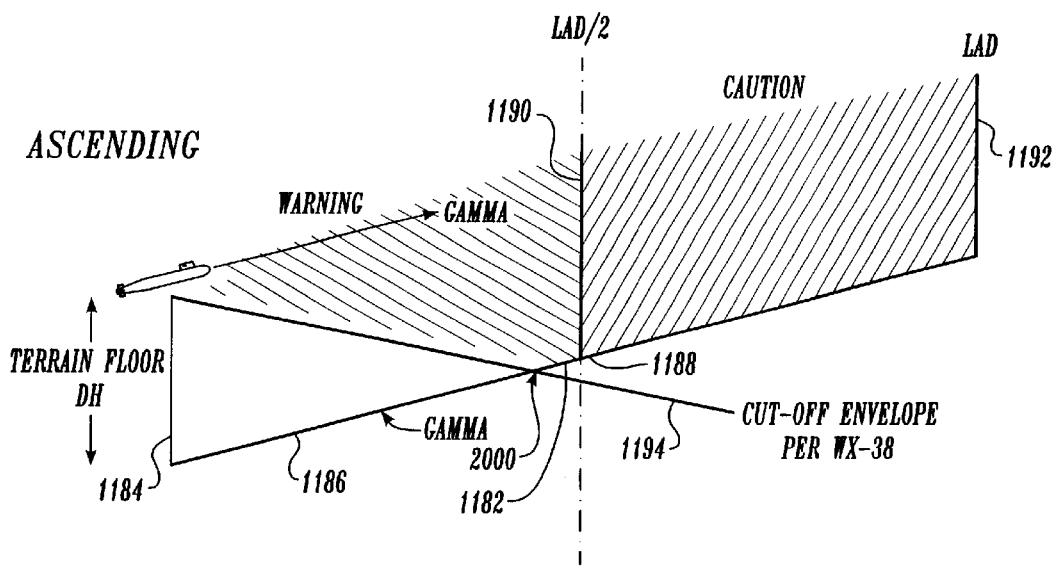
FIG. 24 is similar to FIG. 23 but for a condition when the submersible is ascending.
Figure 25:
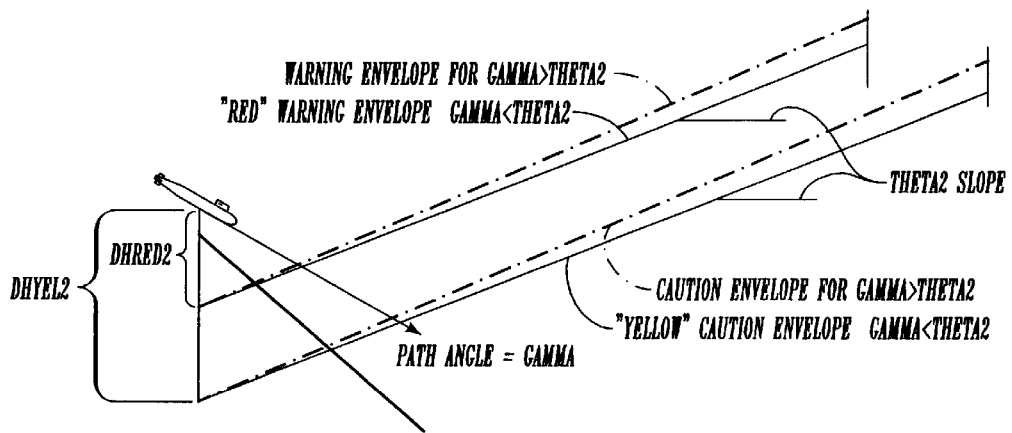
FIG. 25 is a graphical illustration of look up terrain advisory and warning boundaries in accordance with the present invention.

Alternative caution and warning envelopes are illustrated in FIGS. 23–25. Similar to the envelopes discussed above and illustrated in FIGS. 20–22, the alternative envelopes include a terrain clearance floor boundary, caution envelope boundaries and warning envelope boundaries. In the alternative embodiments, caution and warning boundaries are further divided into two parts, a look ahead/look down boundary for detecting terrain ahead or below the marine vessel and a look up boundary for detecting precipitous high terrain ahead of the marine vessel, which may be difficult to clear.

The look head/look down boundaries are illustrated in FIGS. 23 and 24. In FIG. 23, look head/look down caution and warning envelopes are illustrated for a condition when a marine vessel is diving. During such a configuration, the first segment of the look head/look down caution envelope, identified with reference numeral 1160 corresponds to the terrain clearance floor. To determine the bottom segment 1162 of the look head/look down caution envelope, the path angle γ is compared with a configurable datum $\theta_1$, for example, 0°. During dive conditions, the path angle γ will thus be less than $\theta_1$. Thus, the look ahead/look down caution envelope boundary segment will extend from the terrain clearance floor boundary segment 1162 along the angle $\theta_1$ to the look ahead distance for a caution envelope. The final segment 1164 extends vertically upward from the segment 1162 along the look ahead distance.

The look ahead/look down caution envelope boundary may also be modified by the sink rate enhancement, as discussed above. In this embodiment, the dive rate enhancement insures that the caution indication also proceeds a warning indication when the submersible descends into or on top of terrain. The dive rate enhancement is determined as a function of the path angle γ and two configurable constants Kβ and GBIAS. The dive rate enhancement $\theta_1$ for a look ahead/look down caution advisory is provided in the following equation:

$$\beta_1 = K\beta^*(\gamma - GBIAS)$$

where GBIAS is a configurable constant, selected for example, to be zero (0) and Kβ is also a configurable constant selected, for example, to be 0.5.

In FIG. 23, the β dive rate enhancement $\beta_1$ for the look ahead/look down warning envelope boundary provides a warning alert at a distance less than ½ the look ahead distance, unlike the caution envelope boundary described above. More particularly, for the values defined above for the configurable constants Kβ and GBIAS, the β dive rate enhancement $\beta_1$ results in a segment 1166, which extends from the ΔH terrain floor segment 1160 at an angle equal to γ/2 up to ½ of the look ahead distance. Beyond ½ the look ahead distance, a segment 1168 extends at the angle $\theta_1$ to a distance equal to the look ahead distance. A vertical segment 1170 extends along the look ahead distance to connect the segments 1168 to the segment 1164.

As discussed above, a cut-off boundary may be provided to reduce nuisance warnings. In FIG. 23, the cut-off boundary is identified with the reference numeral 1172. The cut-off boundary 1172 extends from a vertical distance 1174 below the hull along a cut-off angle up to the point of intersection 1176 with the warning envelope boundary. For distances less than the intersection 1176, the cut-off boundary 1172 forms the caution envelope boundary. For distances beyond the point of intersection 1176, the boundaries 1166 and 1168 form the caution envelope boundary.

The warning envelope boundary includes the segment 1160 extending from the hull along the ΔH terrain clearance floor. A bottom segment connects to the segment 1160 and extends along a β dive rate enhancement angle $\beta_2$. The β dive rate enhancement angle is determined as a function of the path angle and a configurable constant $K\beta_2$, as well as the constant GBIAS discussed above and provided below:

$$\beta_2 = K\beta_2 * (\gamma - GBIAS),$$

where GBIAS is a configurable constant selected, for example, to be 0 and $K\beta_2$ is also a configurable constant selected, for example, to be 0.25.

For such values of the constants $K\beta_2$ and GBIAS, the β enhancement angle $K\beta_2$ will be ¼*γ. Thus, the segment 1178 extends from the segment 1160 at an angle equal to ¼*γ up to ½ the look ahead distance. A vertical segment 1180 extends along a distance equal to ½ the look ahead distance from the segment 1178 to define the warning envelope boundary.

Similar to the above, the warning envelope boundary is also limited by the cut-off boundary 1172. Thus, the cut-off boundary 1172 forms the warning envelope boundary up to a point 1182, where the cut-off boundary 1172 intersects the lower terrain warning boundary 1178. At distances beyond the point of intersection 1182, the segment 1178 forms the lower terrain warning boundary up to a distance equal to ½ of the look ahead distance.

The caution and warning envelope boundaries for a condition when the submarine is ascending, (i.e. γ>0), is illustrated in FIG. 24. During such a condition, the β dive rate enhancement angles $\beta_1$ and $\beta_2$ are set to a configurable constant, for example, zero (0).

The caution envelope boundary during a rising condition is formed by extending a vertical segment 1184 from the marine vessel for a distance below the marine vessel equal to the ΔH terrain clearance floor. During a rising condition, a segment 1186 extends from the segment 1184 to the look ahead distance at an angle equal to the path angle γ. At a point 1188, where the segment 1186 intersects a position equal to ½ of the look ahead distance, a vertical segment 1190 is extended up from the segment 1186, forming a first vertical boundary for the caution envelope. The line segment 1186 from the point 1188 to the look ahead distance forms the lower caution envelope boundary, while a line segment 1192 extending vertically upward from the line segment 1186, along the look ahead distance, forms a second vertical boundary.

For the condition illustrated, a cut-off boundary 1194 does not intersect the caution envelope boundary. Thus, the caution envelope boundary for the condition illustrated is formed by the segments 1190 and 1192 and that portion of the line segment 1186 between the line segments 1190 and 1192.

The warning envelope boundaries for a condition when the marine vessel is ascending includes the vertical segment 1184, which extends from the marine vessel to a vertical distance equal to the ΔH terrain clearance floor below the marine vessel forming a first vertical boundary. For a condition when the marine vessel is ascending, the line segment 1186 extends from the segment 1184 at the path angle γ to form the lower terrain warning envelope boundary. The vertical segment 1190 at a distance equal to ½ of the look ahead distance forms the second vertical warning envelope boundary.

The cut-off boundary 1194 limits a portion of the warning envelope boundary. In particular, the cut-off boundary 1194 forms the lower warning envelope boundary up to a point 2000, where the cut-off boundary 1194 intersects the line segment 1186. Beyond the point 2000, a portion 2020 of the line segment 1186 forms the balance of the lower warning envelope boundary up to a distance equal to ½ of the look ahead distance.

The look up caution and warning envelope boundaries are illustrated in FIG. 25. As will be discussed in more detail below, the look up caution and warning envelope boundaries start at depths DHYEL2 and DHRED2, respectively, below the marine vessel. These altitudes, DHYEL2 and DHRED2, are modulated by the instantaneous dive rate, (i.e., vertical speed (HDOT) of the marine vessel). The amount of modulation is equal to the estimated increased depth when the submarine transitions from a dive to an ascent, at the present speed. The elevations DHRED2 and DHYEL2 are thus dependent upon the increased depth during this maneuver (ELPU) and the increase in depth due to reaction time (ELRT) as discussed below.

Figure 26:
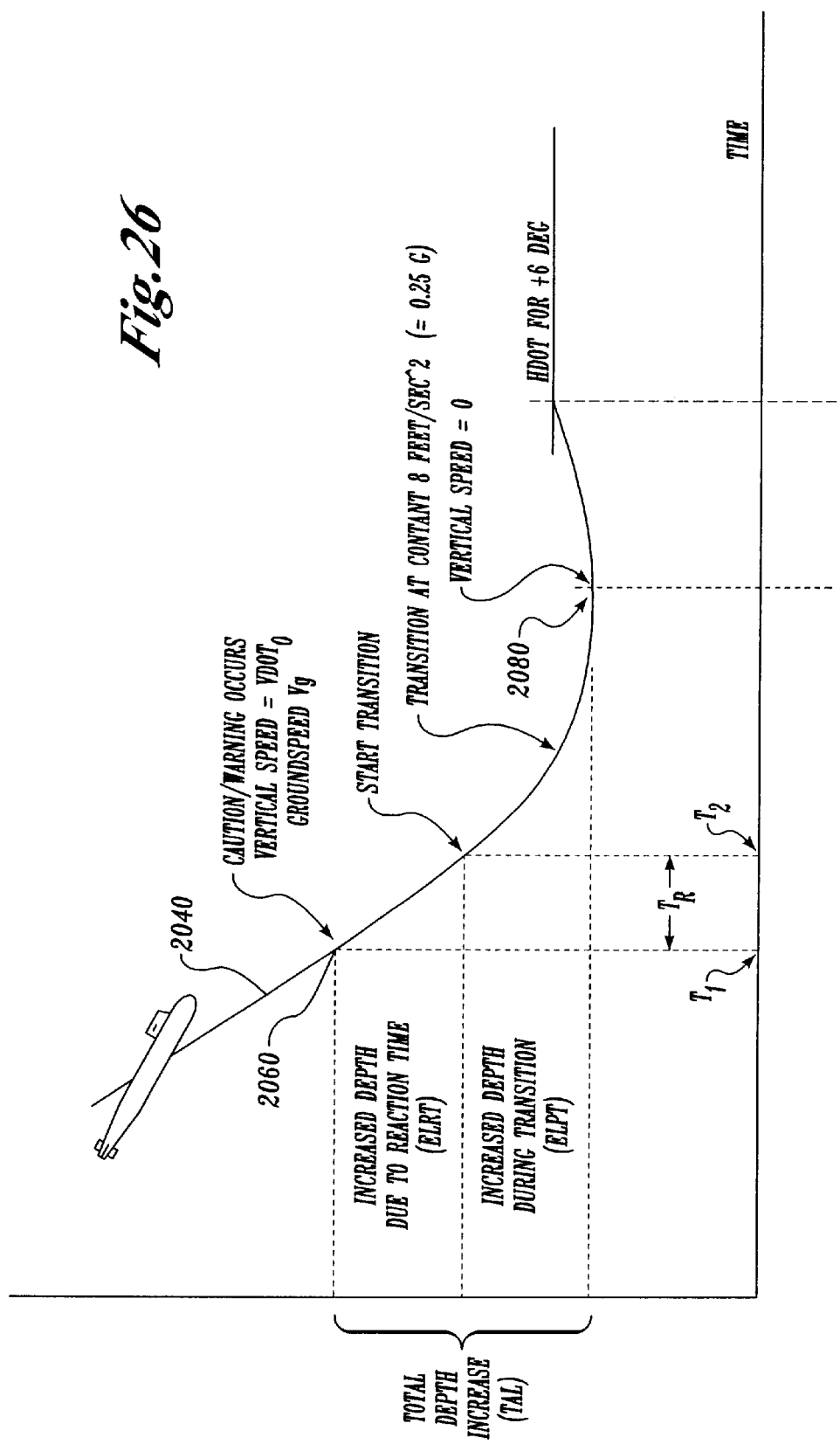
FIG. 26 is a graphical illustration of a submersible during a transition from a dive.

The estimated elevation loss due to a transition maneuver, ELPU, is best understood with reference to FIG. 26, where the vertical axis relates to depth in feet and the horizontal axis relates to time in seconds. The trajectory of the marine vessel from a time shortly before transition is initiated to a time when the marine vessel has recovered is shown and identified with the reference numeral 2040.

Assuming a caution or warning indication is generated at time $T_1$ at a point 2060 along the trajectory 2040, the increased depth due to the reaction time of the crew (ELRT) is given by the equation below.

$$ELRT = HDOT * T_R,$$

where HDOT equals the vertical speed of the marine vessel in ft/sec and $T_R$ equals the total reaction time of the crew in seconds.

Assuming that the maneuver is initiated at time $T_2$, the increased depth due to the maneuver ELPU may be determined by integrating the vertical velocity HDOT with respect to time as set forth below.

$$HDOT(t) = a*t + HDOT_0$$

where "a" equals the vertical acceleration and $HDOT_0$ is a constant.

Integrating both sides of equation yields the increased depth as a function of time H(t) as provided below.

$$H(t) = 1/2 * a * t^2 + HDOT_0 t$$

Assuming a constant acceleration during the maneuver, the time t until vertical speed reaches zero 2080 is given by equation:

$$t = -HDOT_0/a$$

Substituting the above equation into the integrated equation yields equation:

$$ELPU = -(HDOT_0)^2/(2*a)$$

This equation represents the change in depth during the maneuver.

Figure 27:
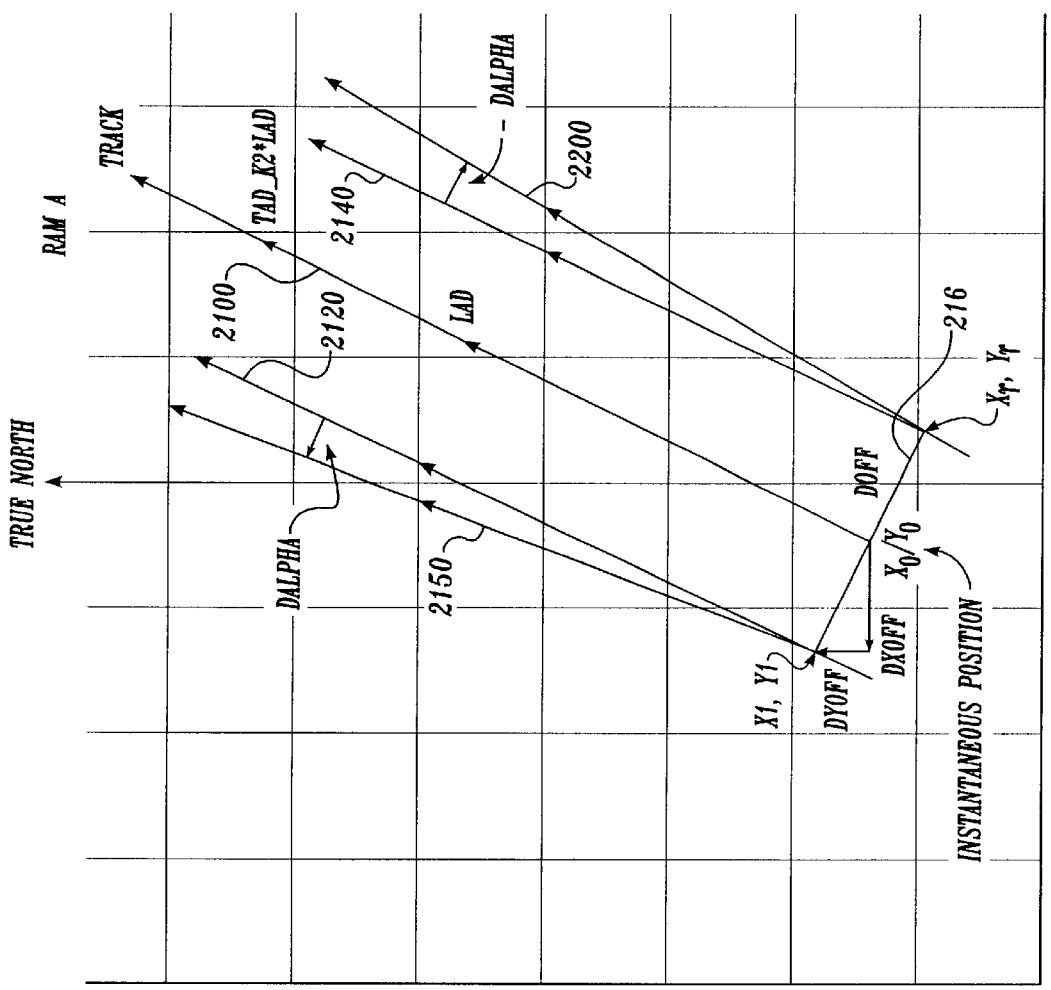
FIG. 27 is a plan view of an array of track vectors useful for defining the internal boundaries of the look ahead/look down/look up alert envelopes according to a preferred embodiment of the invention.

In the discussion above, the caution and warning envelopes are discussed in terms of a single vector along the track of the marine vessel. The single vector provides acceptable results because the relatively crude resolution of the terrain database stored in the first memory device is based upon the shallowest depth per cell and the natural noisiness of the heading angle and position information. However, the single vector approach does not take into account various errors, due to, for example, the terrain database, GPS longitude and latitude errors, as well as the heading accuracy. As such, the single vector along the track of the marine vessel may be substituted with an array of vectors, as generally shown in FIG. 27, which takes such errors into account. In particular, the track vector is identified with the reference numeral 2100 originating at the instantaneous position $X_0$, $Y_0$. A pair of vectors 2120 and 2140 are disposed at a configurable distance $D_{OFF}$, for example 0.2 nm, along a segment 2160, perpendicular to the vector 2100 at points $X_l$, $Y_l$ and $X_r$, $Y_r$. A pair of outside vectors 2150 and 2200, originating at points $X_l$, $Y_l$ and $X_r$, $Y_r$, respectively, are directed at a configurable angle $D_{ALPHA}$, relative to the vectors 2120 and 2140. The configurable angle $D_{ALPHA}$ may be selected as 3°, equivalent to the track accuracy of the GPS.

The coordinates $X_l$, $Y_l$ and $X_r$, $Y_r$ for the vectors 2150 and 2200, respectively, are determined. More particularly, the incremental X and Y vectors, $DX_{OFF}$ and $DY_{OFF}$, are determined as set forth in the equations below:

$$DX_{OFF} = \{D_{OFF}/\cos(\text{Latitude})\} * \cos(\text{Track}),$$

where $D_{OFF}$ is a configurable distance between $X_0$, $Y_0$ and $X_l$, $Y_l$, for example 0.2 nm and the factor 1/cos(Latitude) is used to convert $DX_{OFF}$ to nautical miles when $DX_{OFF}$, $DY_{OFF}$ is in minutes and $D_{OFF}$ is in nautical miles.

$$DY_{OFF} = D_{OFF} * \sin(\text{Track})$$

The coordinates $X_r$, $Y_r$ can be determined in a similar manner. Optionally copending Ser. No. 09/496,297 incorporated herein by reference describes a method of trident width expansion which can be adapted to marine applications to obtain the array of vectors.

4.2.2 Predicted Track Alerts

Another alternate embodiment of the invention utilizes predictions of the vessel's position at future points in time to obtain a projected track of the vessel. This embodiment differs from the previous embodiments described in that it is based on the predicted position vector rather than defining a dynamic protection envelope based on the vessel's current heading and speed. In this embodiment, an unsafe condition is detected when any point along the predicted track intersects the terrain or obstruction.

Figure 28:
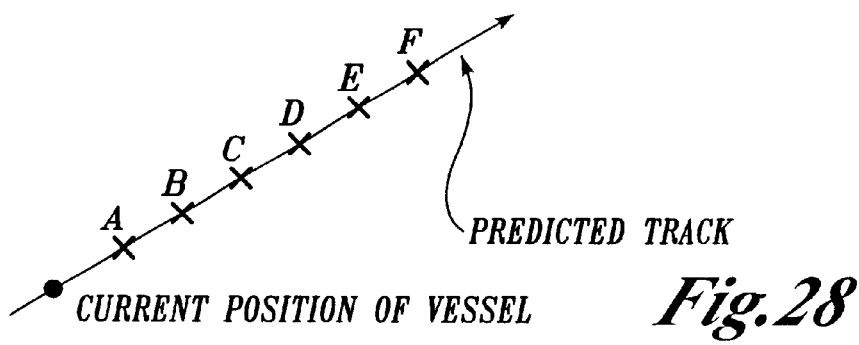
FIG. 28 illustrates a projected track vector according to a preferred embodiment of the present invention.

The projected track of the vessel is defined by a certain number of points A to F starting from its actual position, as illustrated in FIG. 28. This track is established from the current position of the vessel and its velocity and acceleration vectors in the manner previously described in section 2.0.

Uncertainty in position along the projected track may be accounted for by defining a volume around the vessel having the following axes: an uncertainty margin in latitude $LAT_e$, an uncertainty margin in longitude $LONG_e$, and a vertical uncertainty margin $Z_e$ to account for uncertainties in the keel depth. Preferably all uncertainty margins account for errors in the measurement/navigation system.

Figure 29:
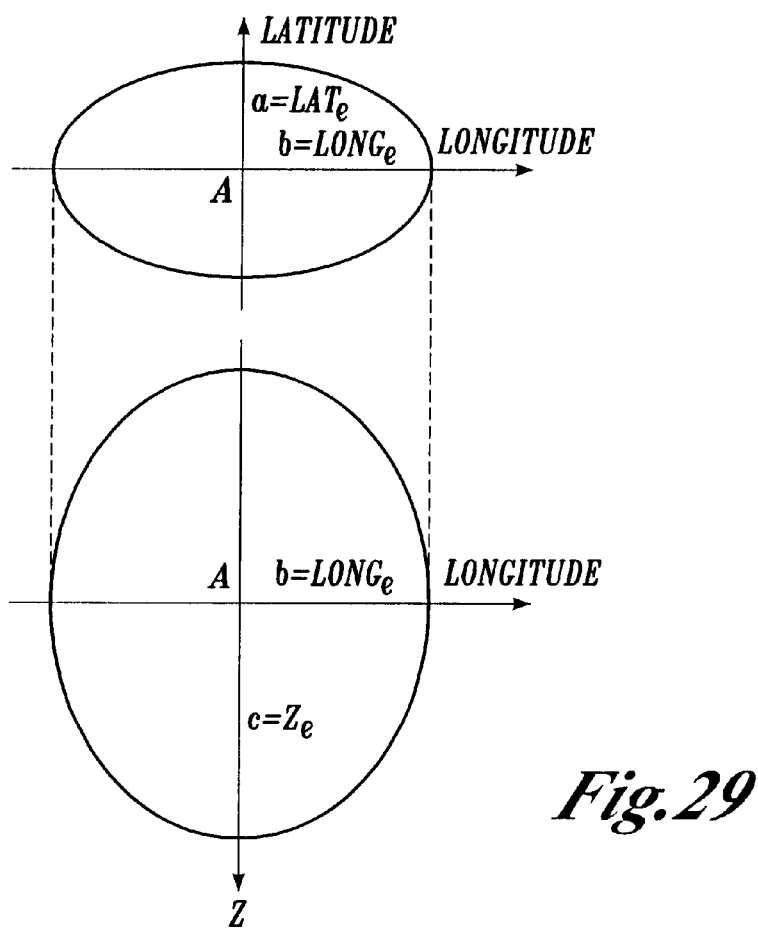
FIG. 29 illustrates an ellipsoid of uncertainty in position according to a preferred embodiment of the present invention.
Figure 30:
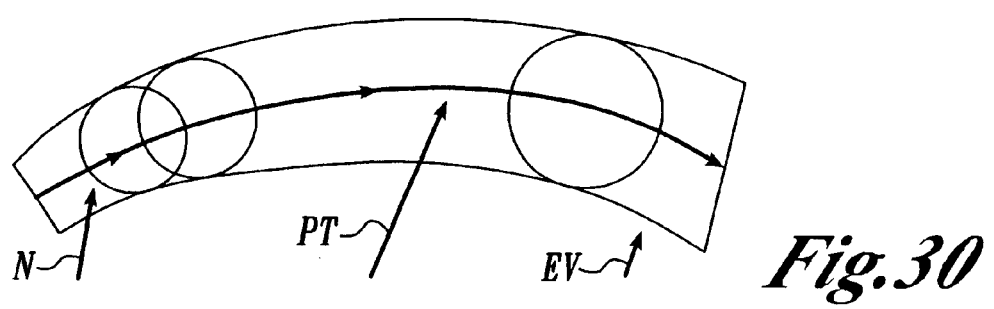
FIG. 30 illustrates use of ellipsoids of uncertainty about the projected track to obtain an envelope of probable position according to an embodiment of the present invention.

The volume of uncertainty resulting therefrom is an ellipsoid as shown in FIG. 29 of revolution whose half axes a, b and c are not necessarily equal. Thus, as illustrated in FIG. 30, an uncertainty range is associated with each point along the projected track of the vessel. In the explanation to follow, the simplifying assumption is made that $LAT_e = LONG_e$. Thus, the vertical projection in the horizontal plane of FIG. 30, results in an uncertainty circle of navigation N (an ellipse in the general case). The envelope of these circles in turn defines a projected track envelope EV round the predicted tack PT.

The length of predicted track PT for purposes of detecting unsafe clearances is configurable, but in a preferred embodiment may be determined using the look ahead distance calculations defined in the previous sections and or by the vessel stopping or turning time.

Figure 31:
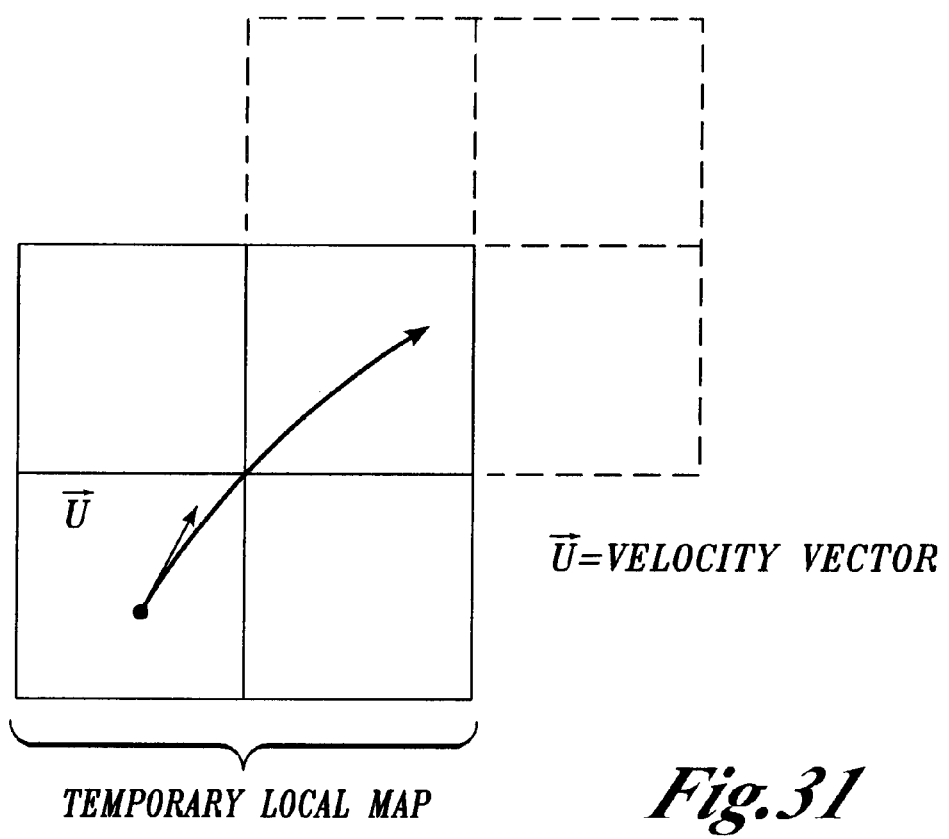
FIG. 31 illustrates the progress of vessel along the projected track in the local terrain map according to an embodiment of the present invention.

FIG. 31 schematically illustrates the progress of the position of the vessel in relation to the grids contained in the local memory. The updating of the local memory may be effected by retaining the region wherein the vessel is situated and by updating the three adjoining regions as illustrated in FIG. 31 by a dashed line.

Figure 32A:
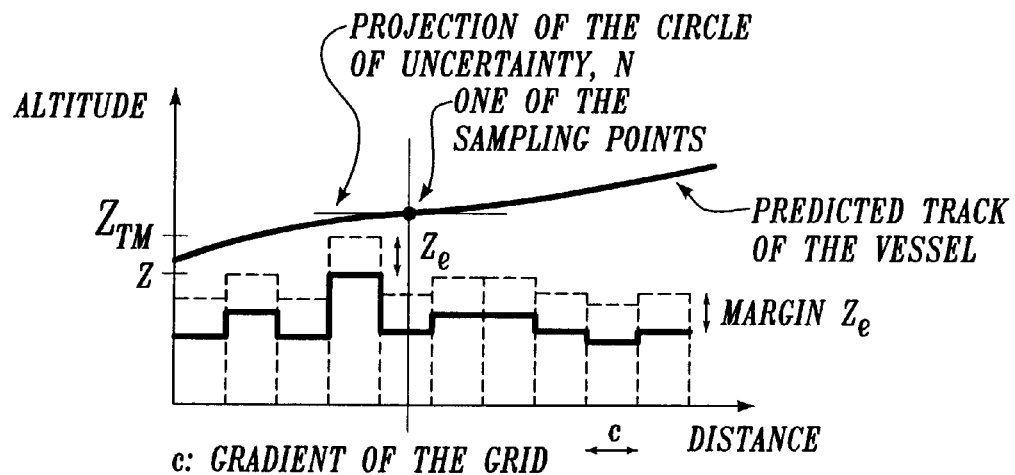
FIG. 32A illustrates an alert logic along a projected track sampling point according to an embodiment of the present invention.
Figure 32B:
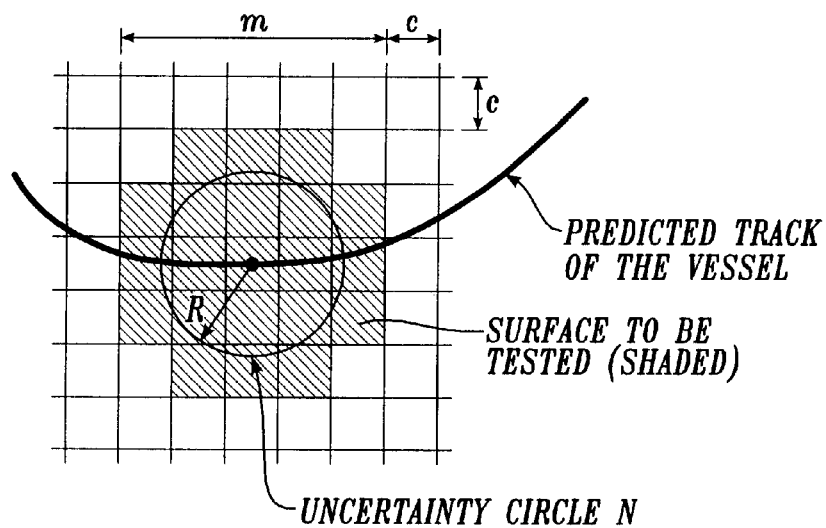
FIG. 32B illustrates a plan view of an alert logic along a projected rack sampling point according to an embodiment of the present invention.

FIGS. 32A and 32B show the square uncertainty surface with maximum dimensions of m×m grids. All the depths are read and only the value of the shallowest depth Z, is retained and added to the uncertainty margin $Z_e$ defined above. The resulting sum, ZTM, is illustrated in dashes. The set of values ZTM on the map will give the theoretical profile beneath the ship, and the alert logic compares this theoretical profile beneath the ship with the anticipated track of the ship. Optionally as described above in Section 2.0, the uncertainty margin $Z_e$ may be added to the keel depth value to save on computation.

In a preferred embodiment of the invention, both a caution and a warning logic are associated with the curves of FIGS. 32A and 32B. A warning is given when a point of the terrain intersects a sampling point in close proximity to the vessel such that the helmsman must intervene to avoid grounding the vessel. The location of this sampling point can be determined by reference to the point at which a turning or stopping maneuver or emergency blow can be executed. A caution is given to forewarn the helmsman that the projected track will encounter an obstacle if it is continued as it is and that he must consider an avoidance maneuver. The look-ahead distances for the caution and warning sampling points can be determined as described in the preceding section.

4.3 AVOIDANCE MANEUVER LOGIC

When a possible collision with underwater terrain is detected then the present invention may optionally be provided with a device and or logic for calculating an avoidance law.

Figure 33A:
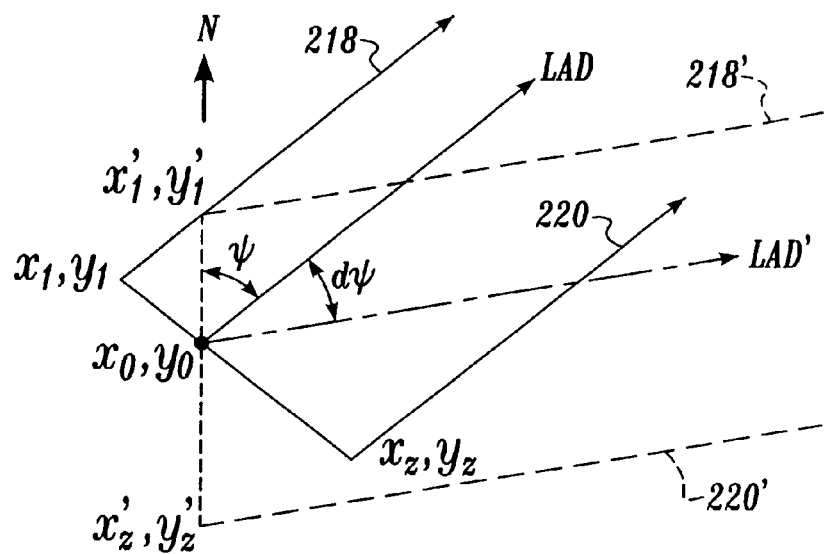
FIG. 33A illustrates calculation of an avoidance maneuver in accordance with an embodiment of the present invention.
Figure 33B:
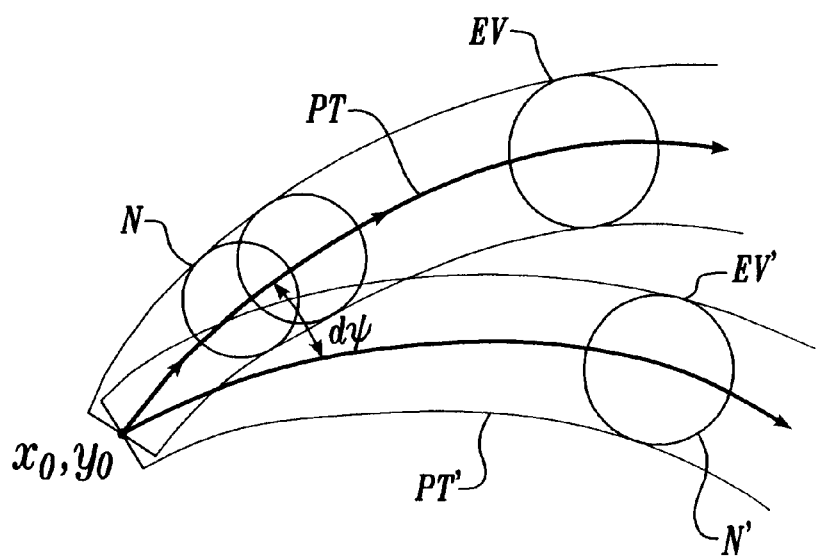
FIG. 33B illustrates calculation of an avoidance maneuver using projected track alert envelopes in accordance with an embodiment of the present invention.

The invention constructed in accordance with this embodiment may optionally further include an avoidance logic which alerts the crew to a new heading to steer or engine setting to avoid collisions. Specifically when a potential conflict is detected using the predictive alerting schemes in the manner described above in section 4.2, the invention next checks for an available collision free pathway having an origin point at the present position of the vessel. FIGS. 33A and 33B illustrate operation of this feature. FIG. 33A illustrates operation of the avoidance logic when one of the envelope based methods of Sections 4.2.1 is used. FIG. 33A shows a plan view, wherein the ship's heading $\psi$ is incremented by a nominal step size $d\psi$. A protective envelope is constructed as indicated by boundaries 2180', 2200', LAD', $X_1'$, $Y_1'$, and $X_2'$, $Y_2'$. This envelope is checked for terrain clearance in accordance with the methods described in the aforesaid sections.

FIG. 33B illustrates operation of the avoidance logic when the alerting scheme of section 4.2.2 is used. In FIG. 33B, alternate track PT' is first generated by incrementing the ship's current heading by nominal step size $d\psi$. Alternate track PT' as surrounded by envelope EV' is then checked for terrain clearance in accordance with the method described in Section 4.2.2.

When selecting alternate track candidates the routine may preferably also consider the performance parameters of the ship. A genetic algorithm or other optimization routine well known to those of skill in the art may then be used to refine the initial heading guess $d\psi$. The optimization routine can be constrained if desired by eliminating non practical or illegal maneuvers. For example, if the data base contains shipping lane information and the avoidance manoeuver places the vessel in the oncoming sea lane, this guess may be eliminated as a valid candidate from the alternate track choices. Such tracks, which represent illegal maneuvers but do not themselves represent an immediate grounding hazard, may be retained, however, when it proves to comprise the entire set of alternative tracks. Candidate tracks that themselves, present a grounding or obstruction hazard are also removed as a candidate track option. In the case of a submarine, the candidate tracks may also include ascending tracks over the terrain as well as lateral track changes. Preferably, the optimization routine selects a track with a constraint of minimizing changes in the ship's current heading. This constraint avoids major course corrections and deviations from the intended course of the vessel. If no safe alternate heading can be found during calculation, Or if the solution heading approaches 90°, the avoidance logic defaults to recommending a stopping maneuver or course reversal or other operational procedure.

Use of the avoidance logic in conjunction with the predictive alerting schemes may be of benefit not only in suggesting evasive maneuvers, but also, in reducing nuisance alarms. For example, if the vessel is operating in confined areas such as a river bend or canyon, the alerting envelope area can be reduced and need not take into account the area of a pre-assumed stopping or turning response to an alert. The alerting envelope lateral area to each side of the ship can therefore be reduced or eliminated. Terrain and obstacles located within the region of the pre-assumed standard evasive maneuver which may have previously generated an erroneous, or nuisance, alert is thereby no longer a factor.

4.4 STRATEGIC ALERTING

The reactive and predictive alerts of Sections 4.1 and 4.2 provides tactical information to the ship's crew useful for avoiding potential grounding hazards or collisions. The predictive logic of Section 4.2 can also be additionally used in a strategic manner for route proving. In such an embodiment, the course or points of intended movement are received as input and any of the logic of Section 4.2 can be used to check for sufficient terrain clearance along the plotted course. The invention can further refine the robustness of this check b including the tide data and any known currents (set and drift data) for the estimated time of arrival at point along the route. In this manner, the crew can be alerted to any errors in navigation plotting and/or to areas along the intended course that may present an increased collision hazard. The crew can then make a course correction or will alternatively maintain heightened vigilance when traversing these high risk areas.

5.0 DISPLAY SYSTEM

A display system, generally identified with the reference numeral 4000, is illustrated in FIGS. 34–48. The display system 4000 is used to provide a visual indication of the terrain advisory and terrain warning indications discussed above as a function of the current position of the vessel. Background terrain information is also provided which provides an indication of significant terrain/obstacles relative to the current position of the vessel.

In order to declutter the display, background information may be displayed in terms of predetermined dot patterns whose density varies as a function of the elevation of the terrain relative to the altitude of the vessel. Terrain advisory and terrain warning indications may be displayed in solid colors, such as yellow and red, relative to the anticipated track of the vessel.

The terrain background information as well as the terrain advisory and warning indications may be displayed on a navigational or weather display, normally existing on the bridge, which reduces the cost of the system and obviates the need for extensive modifications to existing displays, such as a navigational and weather radar type display. The terrain and obstacle display can be toggled from the existing displays or superimposed on the existing weather/radar display. In particular, the terrain data is converted to a weather radar format in accordance with any standard digital bus protocol used aboard commercial shipping vessels. The terrain data, masked as weather data, can then be easily displayed on an existing navigational or a dedicated weather radar display.

As shown in FIG. 34, display system 4000 includes a weather radar display or navigational display 36 connected to a control bus 4040 conforming to a predetermined bus standard and a terrain data bus switch 4060. The terrain data bus switch 4060 enables selection between terrain data and weather radar data for display. More particularly, data bus switch 4060 includes a common pole 4080 connected to the display 36 byway of a serial display bis 4100. One contact 4120 on the data bus switch 4060 is connected to a serial weather data bus 4140 and, in turn, to a weather radar R/T unit 4160, which transmits weather radar data over the weather data bus 4140.

An antenna 4180 provides weather radar data to weather radar R/T unit 4160. Weather radar R/T unit 4160 is also connected to control bus 4040, which is used for range and mode data.

To facilitate compatibility with existing radar displays, which sweep out data over an arc, the terrain advisory and terrain warning indications, as well as the background information discussed above, may be converted to "RHO/THETA" format. The converted terrain data is then applied to a terrain data serial bus 4200 and connected to a contact 4220 on the data bus switch 4060 to enable selective display of either weather radar or terrain data on display 36.

Figure 35:
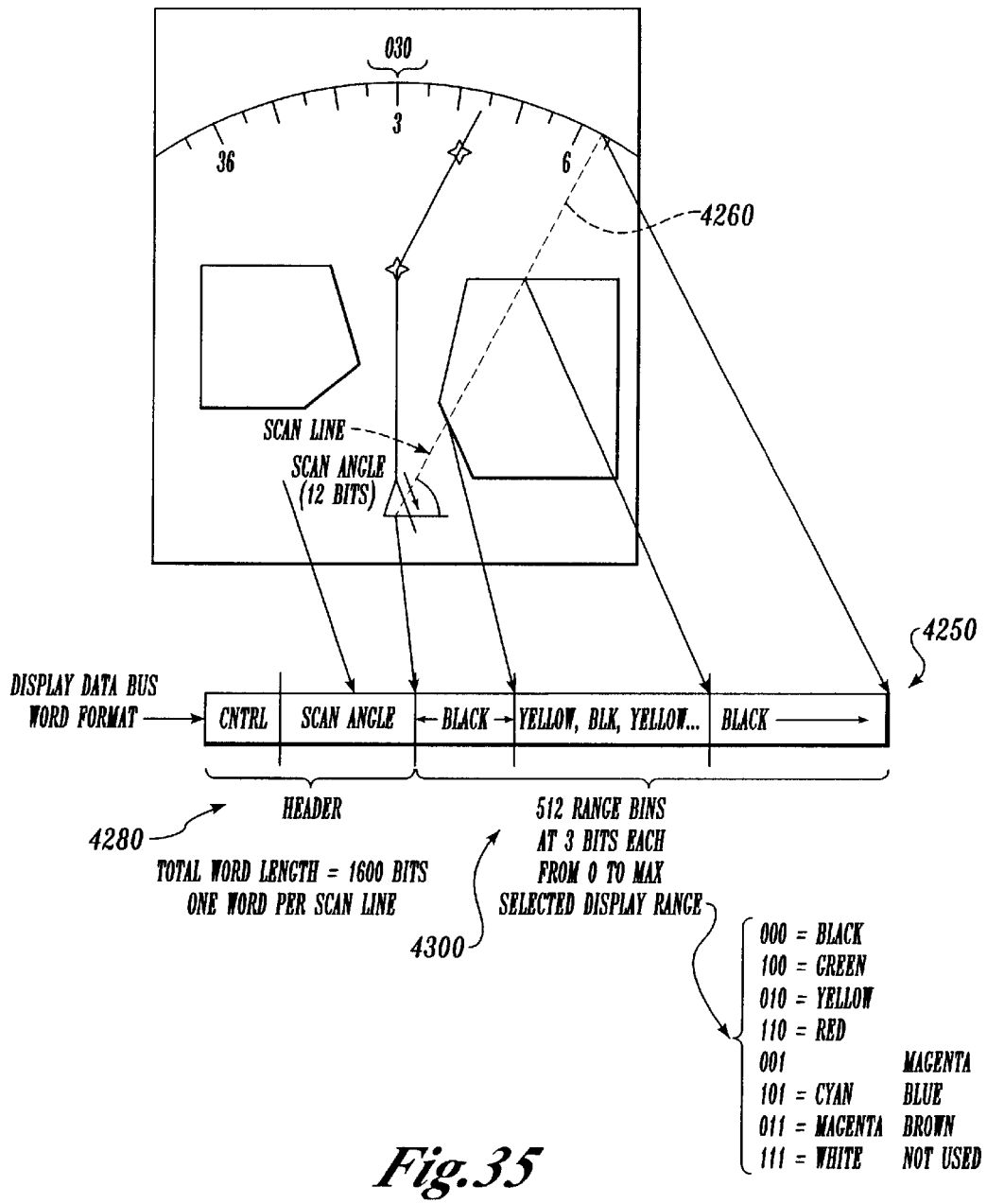
FIG. 35 is a functional diagram of the display data format in accordance with a preferred embodiment of the invention.

FIG. 35, illustrates a preferred embodiment of the invention in which each word 4250 is 1600 bits long and represents one spoke or radial 4260 of the display 36. Normally, 512 spokes or radials 4260 are transmitted for each complete sweep of the display 36. At a transmission rate of, for example, 1 megahertz (MHz), each word 4250 takes about 1.6 milliseconds (msec) to transmit. For 512 spokes, one complete sweep will thus take about 4 seconds.

The 1600-bit words 4250 include a header 4280 and 512 range bins 4300. The header 4208 includes the control data on the control bus 4040 and also includes a 12-bit code representing the antenna scan angle; the angle of the spoke relative to the vessel heading equivalent to an indicator UP direction. The range bins 4300 cover the distance from the antenna 4180 to the maximum selected. Each of the 512 range bins includes three intensity bits, encoded into colors as indicated in Table I below.

TABLE I

| 3-BIT RANGE CODE | COLOR |
| --- | --- |
| 000 | BLACK |
| 100 | GREEN |
| 010 | YELLOW |

TABLE I-continued

| 3-BIT RANGE CODE | COLOR |
|---|---|
| 110 | RED |
| 001 | — |
| 101 | CYAN |
| 011 | MAGENTA |
| 111 | — |

As will be discussed in more detail below, display system 4000 is capable of displaying background terrain information as well as terrain threat indications as a function of the current position of the vessel. For convenience, where a specific example is desirable to illustrate the display of tactical terrain/obstacle alerts according to the invention, the predictive algorithm of 4.2.1 is used as an example. The threat detection algorithm is run along the projected track of the vessel. Thus, terrain threat indications are typically displayed along the projected track while background terrain is displayed relative to the heading of the vessel.

Figure 36:
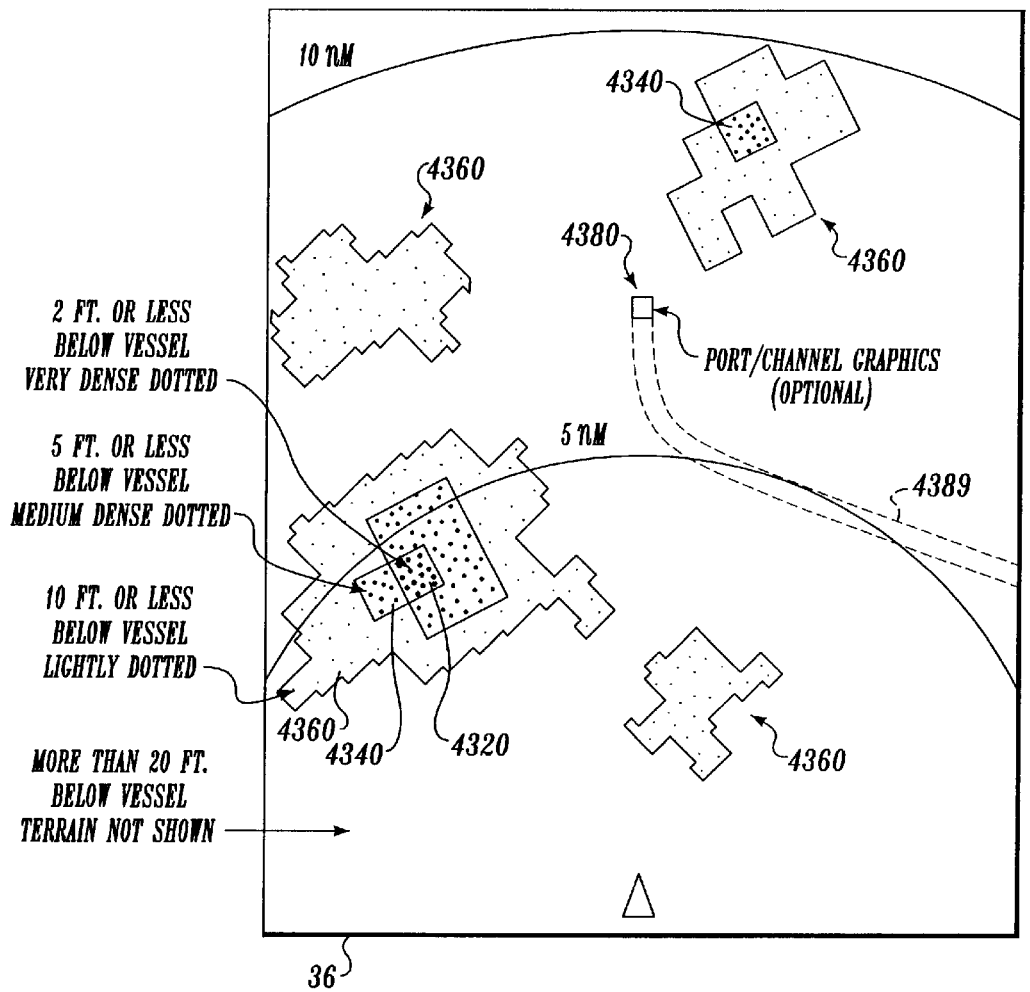
FIG. 36 is a plan view of a background terrain display illustrating the variable density dot pattern.

In FIG. 36, the terrain background information is shown on the display 36 As will be discussed in more detail below, the depth of the terrain most proximate to the ship is shown as a series of dot patterns whose density varies as a function of the distance between the vessel and the terrain. For example, a relatively dense dot pattern 4320 may be used to indicate terrain that is, for example, 2 feet or less below the vessel. A medium dense dot pattern 4340 may be used to represent terrain that is 5 feet or less below the vessel, while a lightly dotted pattern 4360 may be used to indicate terrain 10 feet or less below the vessel. In order to declutter the display 36, terrain more than, for example, 20 feet below the vessel, is not shown the dots may be displayed in one of the colors indicated in Table 1 above, for example, yellow (amber). In addition, in the vicinity of a port or known waterway, port structures 4380 and/or 4 shipping channel pathway 4389, for example, in green, may also be provided. The apparent display resolution may be increased by using more than one color along with the variable density dot patterns, for example, as shown in Table II below.

TABLE II

| DOT DENSITY | HIGH | 3000 | 0 |
|---|---|---|---|
| PATTERN | MEDIUM | 4000 | 1000 |
| | LOW | 5000 | 2000 |
| COLOR | | GREEN | YELLOW |

Figure 37:
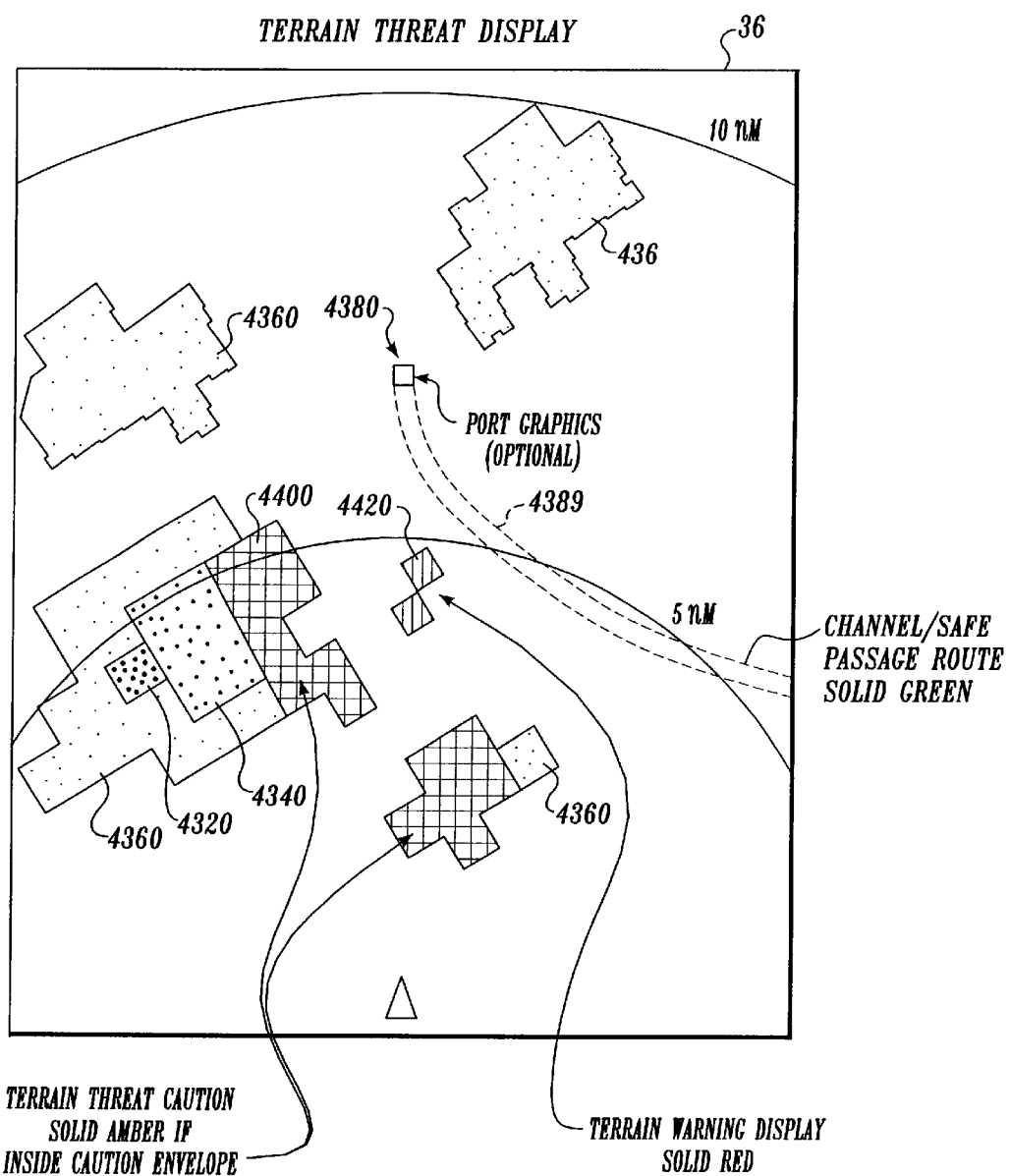
FIG. 37 is similar to FIG. 36 but additionally illustrates the terrain threat indications.

The display of a terrain threat indication is illustrated in FIG. 37. As shown, the terrain threat indication may be displayed contemporaneously with the background terrain information. Terrain advisory and terrain warning indications are displayed in solid shapes 4400 and 4420, respectively, for example, "squares"; the displayed terrain map cells which represent a threat painted solid yellow or red. More particularly, at an aspect ratio for the display of, for example, 3×4 (vertical to horizontal), the terrain cells will appear "square", particularly at relatively low-range settings. Colors are used to distinguish between terrain advisory and terrain warning indications. For example, red may be used to represent a terrain warning indication 4420 while yellow or amber is used to represent a terrain advisory indication 4400. By using colored shapes for terrain threat indications and dot patterns of variable density for the terrain background information, clutter of the display 36 is minimized.

The terrain data from the terrain data base 24, for example, as illustrated in FIG. 5, is used to compute the terrain threat indications as well as background information for the display 36. As discussed above, the terrain data base 24 may be stored in a flash ROM 4440 (FIG. 7) for convenience of updates. In order to facilitate update of the display 36 as a function of the position of the vessel, terrain data from the flash ROM 4440 is transferred to a random access memory (RAM) A, identified with the reference numeral 4460. As will be discussed in more detail below, the RAM A is mapped with terrain data from the flash ROM 4440, centered about the current position of the vessel, as illustrated in FIG. 7.

Figure 38:
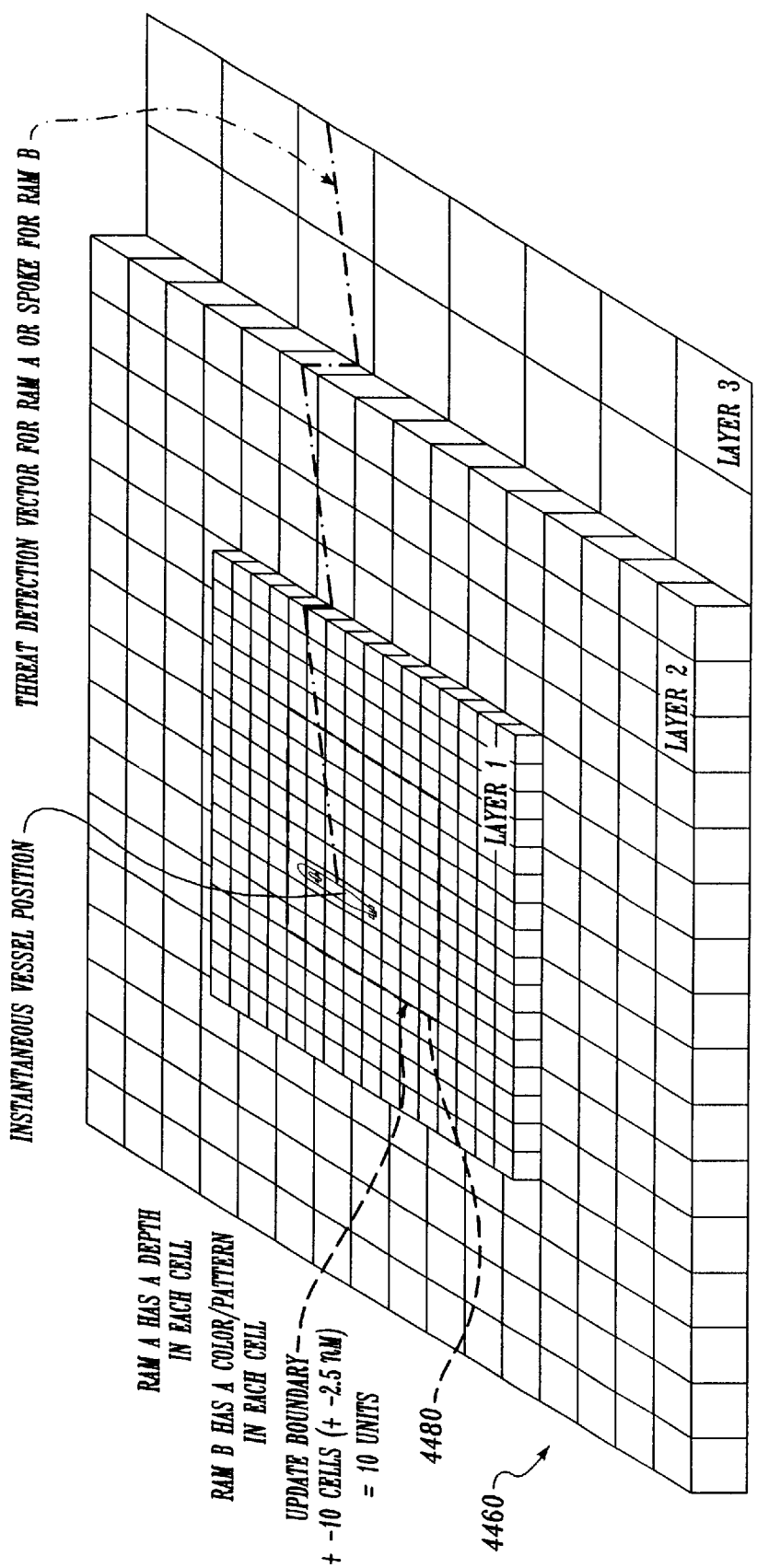
FIG. 38 illustrates a wedding-cake configuration for a RAM utilized in the present invention.

In order to provide a relatively large display range, while minimizing processing time as well as the size of the RAM A, the RAM A is configured as a "wedding cake" as generally illustrated in FIG. 38 and configured such that the finest terrain resolution is near the position of the vessel and the terrain farthest from the vessel position has the lowest resolution. For example, the RAM A may be provided with four (4) layers. As shown, the instantaneous vessel position is shown generally centered in layer 1, having the highest resolution. The resolution of layer 2 lies between the resolution of layer 3 and layer 1. Layer 4 (not shown) is provided with a relatively coarse resolution for use in a cruising mode.

Such a variable resolution display, configured as a layered wedding cake, minimizes the memory size of RAM A as well as the processing time. In order to improve the performance of the system, the flash ROM 4440 may also be configured similar to a "wedding cake", as generally illustrated in FIG. 6.

As discussed above, the terrain data base 24 may be provided with variable resolution. Relatively coarse resolution can be formed by combining finer resolution maps. With such a resolution, the configuration of RAM A maybe selected, for example, in accordance with Table III. Finer resolutions layers may be used if desired, such as near ports.

TABLE III

| LAYER | RESOLUTION (MINUTES) | LAYER SIZE (MINUTES) |
|---|---|---|
| 1 | ½ × ½ | 32 × 32 |
| 2 | 1 × 1 | 64 × 64 |
| 3 | 2 × 2 | 128 × 128 |
| 4 | 5 × 5 | REMAINING AREA |

Each layer is generally centered relative to the vessel position as shown in FIG. 38 at the time of the update of RAM A. Each layer of the "weddings cake" has its own update boundary. For example, layer 1 of the RAM A includes an update boundary 4480. As the vessel passes through the update boundary 4480, the RAM A is updated with new terrain data from the flash ROM 4440 (FIG. 7) as will be discussed in more detail below.

Because of the refresh rates required for the display 36, the terrain data may be stored in files alternative to the format illustrated in FIG. 6A. For example, the file format of the terrain data may include an index file or header 55, stored in one or more 128 K byte storage blocks and a plurality of data files 51, as generally shown in FIG. 6B.

As shown, each index file 55 may include pointers to specific data files 51, the length of the map file, as well as the position of one or more of the corner boundaries of the file 51, for example, northwest and southeast corners of each map file 51, which facilitates updates of the display 36 as a function of the current vessel position. The index file 55 may contain information regarding the length of the map file 51, a start of file or altitude offset, the resolution of the map file 51, and whether and how the file 51 is compressed to enable use of various compression algorithms.

Figure 39:
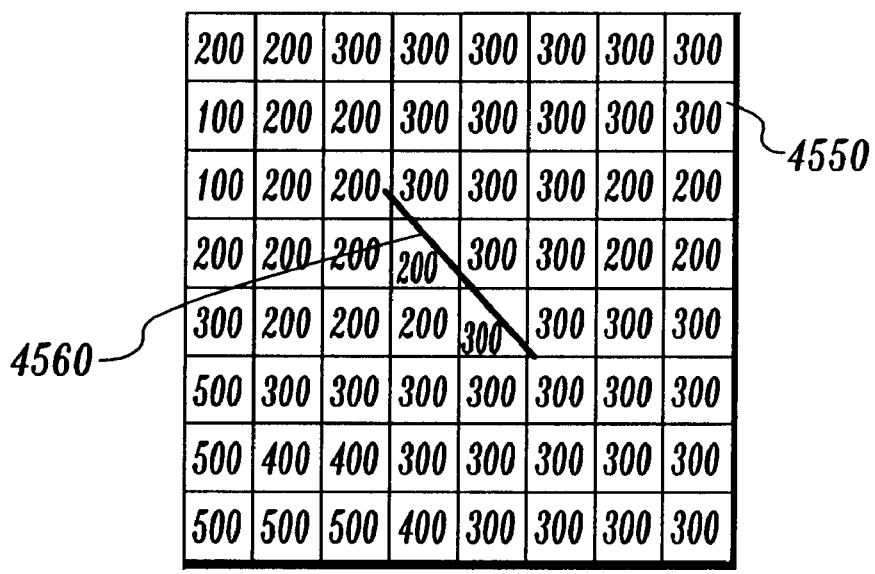
FIG. 39 illustrates data blocks constructed according to a preferred embodiment of the present invention.

The data files 51 may include a file header 4540 as well as data blocks 4560 shown in FIG. 39, which, as shown, can be grouped according to resolution size. The file header 4540 indicates various information about the file. The format of the header 4540 may be structured as follows:

<MAJOR VERSION BYTE><MINOR VERSION BYTE><FILE STATUS BYTE><ATTRIB BYTE>
<FILE NAME (8 CHARACTERS)><EXTENSION (4 CHARACTERS)>
<FILE LENGTH LONGWORD>
<TIME STAMP LONGWORD>
<CRC LONGWORD>
<SPME LONGWORD>

The major and minor version bytes relate to the revision status of the data in the data files 51. The minor version is set as the inverse of the byte value of the major version such that a default erase will indicate a zero version. The file status byte 4570 provides various information regarding the status of the file as discussed below, while the attribute byte is reserved. The file name, extension file lengths and spare data are self-explanatory. The time stamp relates to the operational time of the system (i.e. length of time in use) while the CRC data relates to the data files 51. The status byte may be used to provide the following information regarding the data blocks 4560, for example, as set forth in TABLE IV below:

TABLE IV

| FLAG BYTE VALUE | INFORMATION |
| --- | --- |
| FF | EMPTY |
| FE | DOWNLOADING |
| FO | VALID |
| EO | READY TO ERASE |
| . | RESERVED |
| . | RESERVED |
| 00 | RESERVED |

The EMPTY status (FF) is set by erasing the data blocks 4560, while the DOWNLOADING status (FE) is set as part of the image. The VALID status (FO) is set when the file is loaded. The READY TO ERASE (EO) is set by the file system for obsolete blocks.

As indicated below, various corrections of the data files 51 may be required in areas near ports and shorelines. The depths, as discussed above, are generally selected to be the shallowest depths within the cells, rounded up to the next highest resolution increment, for example 2 or 54 feet. While such a system provides useful and conservative terrain data for use with the terrain data base 24, such a system in the vicinity of a port or shoreline can cause the elevations of critical features to be too high or too low. Such errors in feature depth can degrade system performance, and, in particular, cause improper performance of the terrain advisory and terrain warning cut-off boundaries.

In order to solve this problem, the actual depth below mean sea level of the terrain feature, rounded to the nearest resolution, is used for cells 4550 around a perimeter of the terrain feature.

Figure 40:
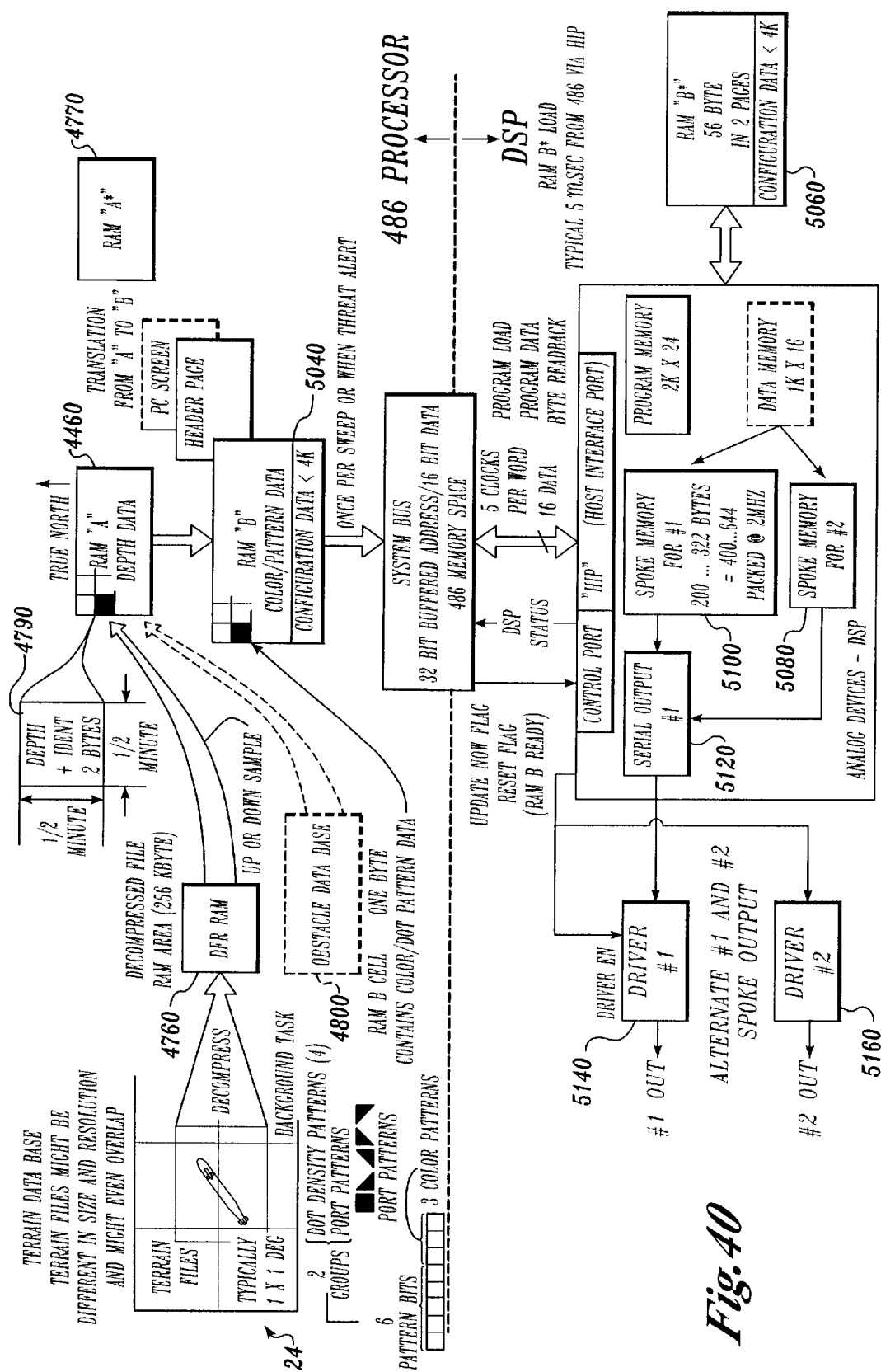
FIG. 40 is a block diagram of the display system in accordance with a preferred embodiment of the present invention illustrating the memory configuration and the data flow.

FIG. 40 represents a simplified block diagram for implementation for the display system 4000 in accordance with the present invention. Display system 4000 may include a microprocessor, for example, an Intel type 80486, 25 MHz type microprocessor ("486") and an Analog Devices type digital signal processor (DSP). The DSP is primarily used for calculating the RHO/THETA conversions to off load the 4860.

Display system 4000 may have a normal mode and a cruise mode. In a normal mode, display system 4000 displays terrain out to, for example, 10 minutes sailing time, while in cruise mode out to about ½ hour of sailing time. In the cruise mode, it is contemplated that the background terrain display levels can be lowered by the crew such that terrain, for example 100 feet or 200 feet below the vessel, can be displayed. Alternatively, the display level could automatically be adjusted to the highest terrain within the selected display range; the value of this level set forth in amber, for example.

The 486 runs a "file picker" routine which searches terrain data base 24 for terrain data covering the area relative to the current position of the vessel. For example, in a normal mode, the file picker routine searches the terrain data base 24 for terrain data covering a given area relative to the current position of the vessel. As indicated above, the terrain data base 24 includes index files 55 (FIGS. 6B and 8) which may include the northwest and southeast corners of each map file 51 in order to facilitate the search. A list of files covering the area is assembled and maintained.

Index file 55 also includes information as to whether and how data files 51 are compressed. The files may be compressed/decompressed by a modified Huffman code, or techniques known to those of ordinary skill in the art.

If data files 51 are compressed, the files are decompressed in the background because of the relatively long decompression time and stored in a decompressed file RAM (DFR) 4760, for example 256 words. The decompressed files are then transferred to RAM A, identified with the reference number 4460. On power-up, one or two files around the vessel are decompressed and displayed to allow immediate display of a limited range, relative to the position of the vessel. As more terrain data files are decompressed, the additional range is displayed.

The RAM A may be configured in a plurality of cells 4790, as shown in FIG. 40, representative of a terrain area 15 arc seconds×15 arc seconds, with true north appearing at the top of RAM A as shown. Each cell 4790 is two bytes wide and includes data regarding the shallowest depth in the cell as well as the identity of each cell 4790. As such, the RAM A is addressable by X and Y coordinates and thus represents a map with a depth in each cell 4790. The identity of the cell may be used to distinguish between terrain data, for example, from terrain data base 24 and obstacle data. In some applications, an obstacle data base indicating underwater obstructions may be utilized.

As indicated above, the RAM A may be configured as a wedding cake with various layers, as generally shown in FIG. 38 with the top layer (i.e. layer 1) having the highest resolution. Terrain data is loaded into the RAM A such that the vessel is roughly centered in the top layer, where the terrain advisory and warning detection algorithms are run. Once the vessel moves outside the update boundary 4480 of FIG. 38, the top layer of the RAM A is reloaded with terrain data with the vessel centered. The lower layers may also be provided with update boundaries, which enable the lower layers to be updated independently and less frequently than the top layer.

Figure 41:
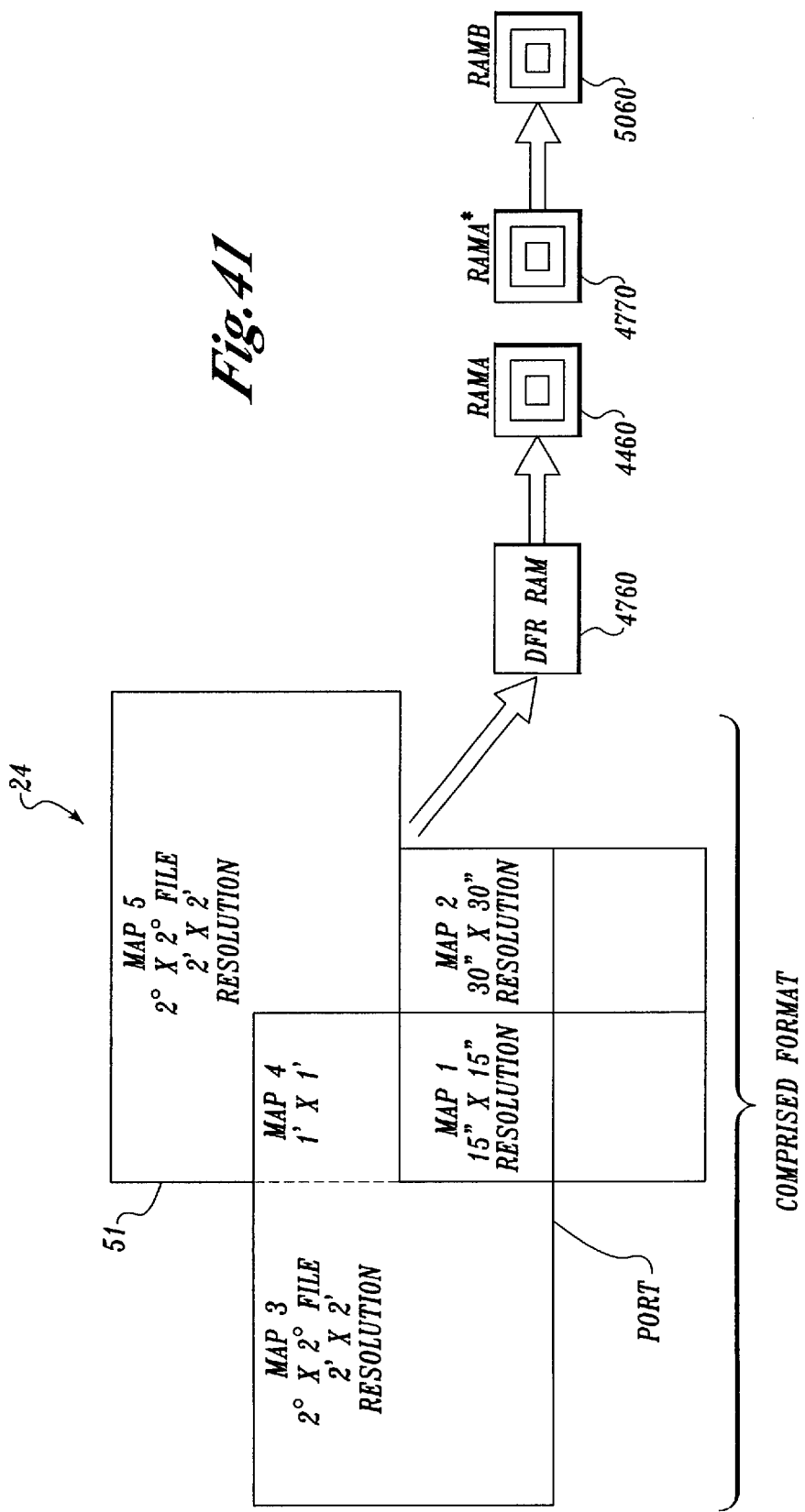
FIG. 41 is a block diagram of a configuration alternative to that shown in FIG. 40.

As discussed above and illustrated in FIG. 6, the flash ROM 4440 for terrain data base 24 may also be configured as a wedding cake as illustrated in FIG. 38. In such an implementation, the highest resolution is provided near ports and shorelines while coarser resolutions are provided elsewhere. For example, as illustrated in FIG. 41, the terrain data base 24 may be configured with 1°×1°, 2°×2° or 10°×10° map files. Some of the map files may overlap, similar to a "wedding cake." Maps further away from the port may be provided with resolutions of, for example, 1×1 minute or 2×2 minutes while a coarse resolution (i.e. 5N×5N or 10N×10N) may be provided even further from the port.

An upload routine may be used to upsample or downsample terrain or obstacle data into the RAM A from the DFR RAM 4760 as shown in FIG. 40. Such a routine is well within the ordinary skill in the art. The top three layers (i.e. layers 1, 2 and 3) of the RAM A of FIG. 38 are updated from the map file source from the flash ROM 4440 for terrain data base 24 having the highest resolution, except for the 5×5 minute layer, which is updated only from a 5×5 minute file source to reduce processing time.

Alternatively, as shown in FIG. 41, an additional RAM A*, identified with the reference numeral 4770, may be provided and structured similar to the RAM A 4460, forming a "ping-pong" memory arrangement. In this embodiment, one terrain data file 51 is decompressed one file at a time and loaded into the DFR RAM 4760 and then upsampled to either the RAM A or RAM A*. For example, while the RAM A is being loaded with additional decompressed files, the terrain threat and display algorithms are executed from the RAM A*. Once the RAM A is updated, the RAM A is then used for the computations while the other RAM A* is updated with new data from the DFR RAM 4760 to account for changes in the vessel position.

The 5×5 minute resolution layer is primarily intended for use in a cruise mode to provide a look-ahead range of about a half hour. As was illustrated in FIG. 8, each file includes an index file 55 which contains data relative to the resolution of the terrain data in a particular sap file 51. Such information can be used to vary the resolution of the map files as a function of longitude and latitude position. For example, the latitude resolutions of the map files can be decreased at higher latitudes in a northward direction. Moreover, longitude resolution in the RAM A can be varied and provided with, for example, a one degree latitude hysteresis to prevent flipping back and forth as a vessel cruises northwardly. Once the terrain data from terrain data base 24 is loaded into the RAM A, the terrain advisory and warning algorithms ("detection algorithms") are run, for example, at once per second.

Figure 42:
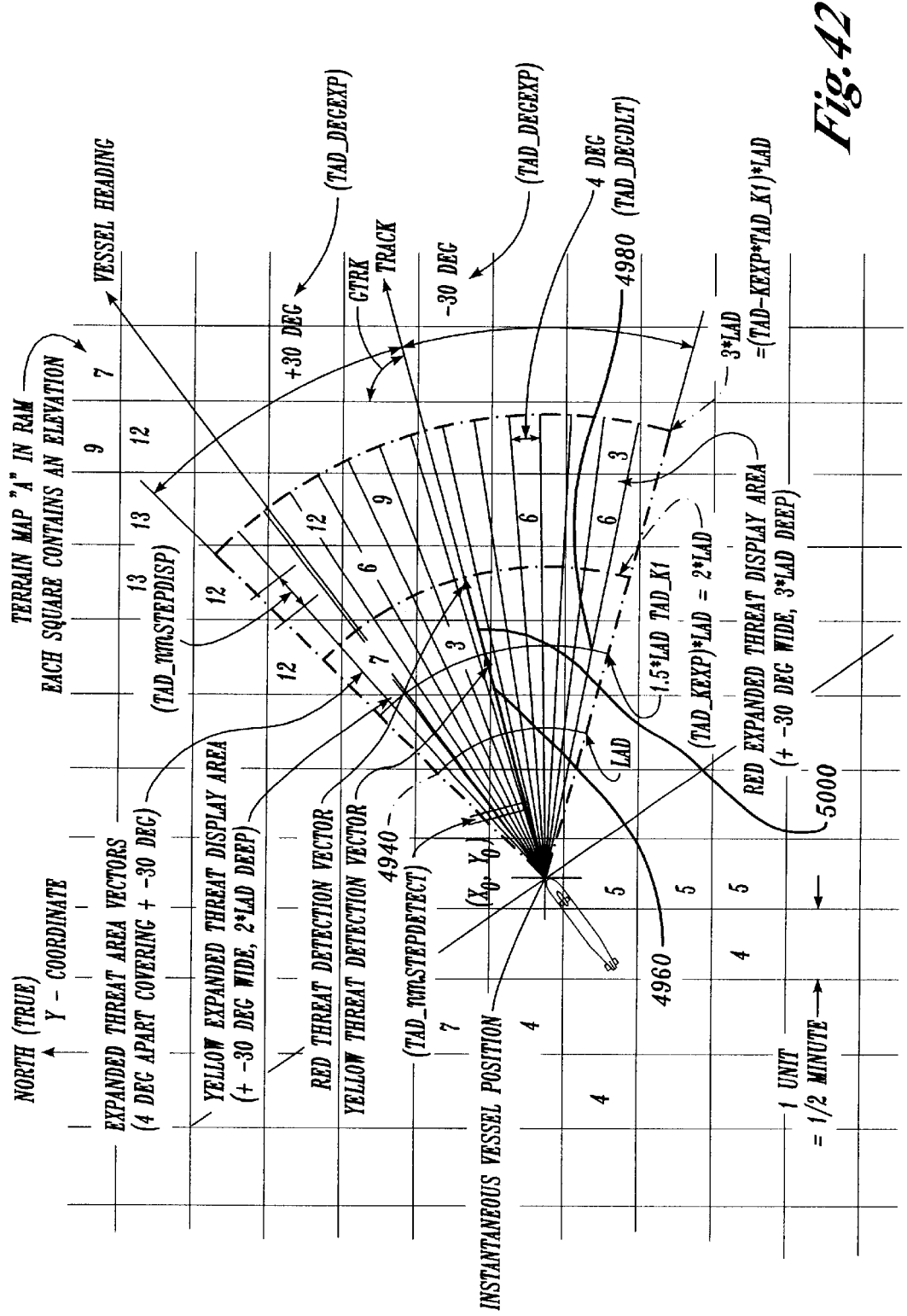
FIG. 42 is a terrain map illustrating the computation of the hazardous terrain.

Whenever the threat detection algorithm detects terrain along, for example, the look-ahead vector arrays 4900 and 4920 (FIG. 27), the offending terrain is painted in an expanded cone around the groundtrack as shown in FIG. 42. In particular, the expanded cone includes a plurality of vectors, spaced, for example, 4° apart (configurable value), for 90° (configurable value) on each side of the groundtrack. For an expanded terrain warning, the cone may be expanded out distances, for example as set forth in Table V below.

TABLE V (For an expansion factor of 2)

| | NORMAL | | EXPANDED | |
|---|---|---|---|---|
| TYPE OF THREAT | LOOK-AHEAD/ LOOK-DOWN | LOOK-UP | LOOK-AHEAD/ LOOK-DOWN | LOOK-UP |
| ADVISORY | 1.0* LAD | 2.0* LAD | 2.0* LAD | 4.0* LAD |

TABLE V-continued (For an expansion factor of 2)

| | NORMAL | | EXPANDED | |
|---|---|---|---|---|
| TYPE OF THREAT | LOOK-AHEAD/ LOOK-DOWN | LOOK-UP | LOOK-AHEAD/ LOOK-DOWN | LOOK-UP |
| WARNING | 0.5* LAD | 1.5* LAD | 1.0* LAD | 3.0* LAD |

The terrain threat is painted on the display 36 by calculating the starting vector angle DISPA as set forth in equation (29) when a terrain threat along the track has been detected.

$$DISPA = ANTICIPATED\ TRACK + 30\ degrees \tag{29}$$

The range increments are then determined as set forth in equations (30) and (31).

$$DELTA\ X_{NS} = DISPLAY\ STEP\ SIZE * SIN\ (DISPA) * 1/COS\ (LATITUDE) \tag{30}$$

$$DELTA\ Y_{NS} = DISPLAY\ STEP\ SIZE * COS\ (DISPA), \tag{31}$$

where the display step size is a configurable constant, for example ½ unit.

After the range increments DELTA $X_{NS}$ and DELTA $Y_{NS}$ are determined, the instantaneous position of the vessel $X_0$, $Y_0$ is incremented by the same and the range is incremented by the step size. The DEPTH is then determined for the current position on the terrain map. Subsequently, the threat detection algorithms are run for the distances as discussed above. Should a threat be detected, a color is loaded into a RAM B, identified with the reference numeral 5040 as shown in FIG. 40. At the end of the yellow and red threat vectors 4960 and 5000, the vector angle DISPA is incremented by 4 degrees with the above steps being repeated until all vectors are done.

In addition to the terrain detection and display algorithms a background terrain algorithm is also executed relative to the terrain data in RAM A of FIG. 40 once every screen update, about 4 seconds. The background terrain algorithm simply compares the current altitude of she vessel with the various terrain altitude data in the RAM A. Any of the dot patterns 4320, 4340 and 4360 shown in FIG. 36 resulting from the computation are stored in the RAM β organized in a wedding-cake configuration according to FIG. 38, similar to the RAM A. In addition, the RAM β is organized in single byte cells containing the color/dot pattern as discussed above.

The color/dot pattern in the RAM B is transferred to the DSP memory RAM B*, identified with the reference numeral 5060, once per screen update (i.e. 4 sec) and synchronized to the DSP screen painting period. If a threat is detected as discussed above, a new RAM B image is transferred to the DSP RAM B* 5060 immediately. The image transfer time typically fits between two spokes. If not, the DSP will send an old spoke stored in its spoke memory 5080, 5100 twice.

The DSP then performs the RHO/THETA conversion on the data in RAM B* 5060 using the updated position, selected range and heading data from the 486, as discussed below. Changes in the selected range are implemented on the fly (i.e. the next spoke) without restarting the sweep.

One possible weather radar format includes 512 spokes covering a configurable scan range of typically 90 degrees and a range selected, for example, on a weather data control panel. In a preferred embodiment, each spoke is calculated twice, once for the left selected range and once for the right selected range. The spokes are then transmitted by way of a serial port 5120, interleaved left spoke and right spoke to bus switch 4060 by way of a pair of drivers 5140 and 5160.

The resolution of the scan conversion is 256 range bins; each range bin actually being a double range bin per the ARFNC 708/453 standard format. Such a resolution is sufficient for the dot patterns illustrated in FIGS. 35 and 36.

Figure 43:
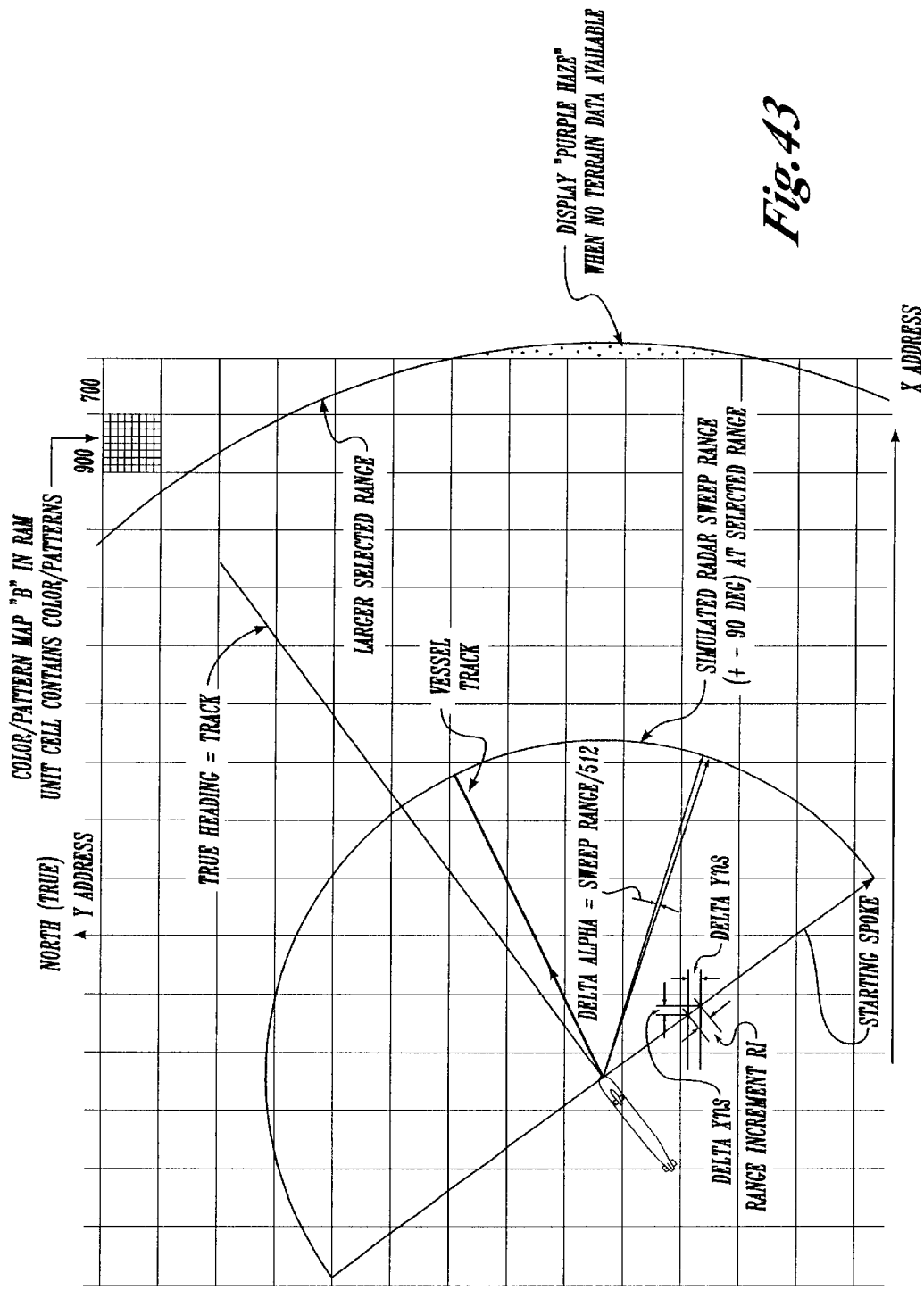
FIG. 43 is a diagram of a terrain map superimposed on a display screen illustrating the sweep range and the determination of the incremental range increments.

The RHO/THETA conversion is best understood with reference to FIG. 43. In particular, once per sweep (i.e. every 4 seconds) the range increment R1 is determined. The range increment is the selected range divided by 256. After the range increment is determined, the starting spoke angle is determined (e.g, the vessel true heading plus 90 degrees). The incremental spoke angle DELTA ALPHA is determined. The incremental spoke angle DELTA ALPHA is the sweep range divided by 512; the total number of spokes per sweep.

Once per spoke (i.e. 512 times per 4 second sweep), the incremental range coordinates DELTA $X_{ns}$, DELTA $Y_{ns}$ are computed and the spoke angle is incremented by DELTA ALPHA, as discussed above. The incremental range increment coordinates $X_{ns}$ and $Y_{ns}$ are computed in accordance with equations (32) and (33), respectively.

DELTA $X_{ns}$=RI*SIN (SPOKE ANGLE)*1/COS (LATITUDE)  (32)

DELTA $Y_{ns}$=RI*COS (SPOKE ANGLE)  (33)

Once per range increment (i.e. 512×256 times per 4 second sweep), the instantaneous position $X_0$, $Y_0$ is incremented by DELTA $X_{ns}$ and DELTA $Y_{ns}$. The color/pattern for the new position is looked up and output to the display 36. These steps are repeated for the rest of the spoke.

With the use of the DSP, two computations can be done in parallel. In particular, the color/pattern of each range bin including the conversion of the longitude to nautical miles (i.e. multiplication by 1/COS (LAT)). With reference to FIG. 43, this computation is performed relative to the true north map coordinate system with the vessel true heading pointing up and the spoke angles referenced to it. The second computation addresses each display indicator pixel in order to paint the required dot pattern, relative to the display screen coordinate system.

The generation of dot pattern is illustrated in FIGS. 44–47. In general, the scan conversion is simulated by overlaying each RHO/THETA range bin over a calculated indicator pixel map which includes corrections for display aspect ratio using fractal 8×8 dot patterns.

The fractal patterns corresponding to the variable density dot patterns 4320, 4340 and 4360 of FIG. 36 are illustrated in FIG. 45. The fractal pattern size is selected to be 8×8 pixels. The densest pattern 4320 includes ½, or 32, of the 64 pixels are filled. In the medium density pattern 4340, 16, or ¼, of the pixels are filled. In the least dense pattern 4360, 4 or ¹⁄₁₆, of the pixels are filled.

Figure 44:
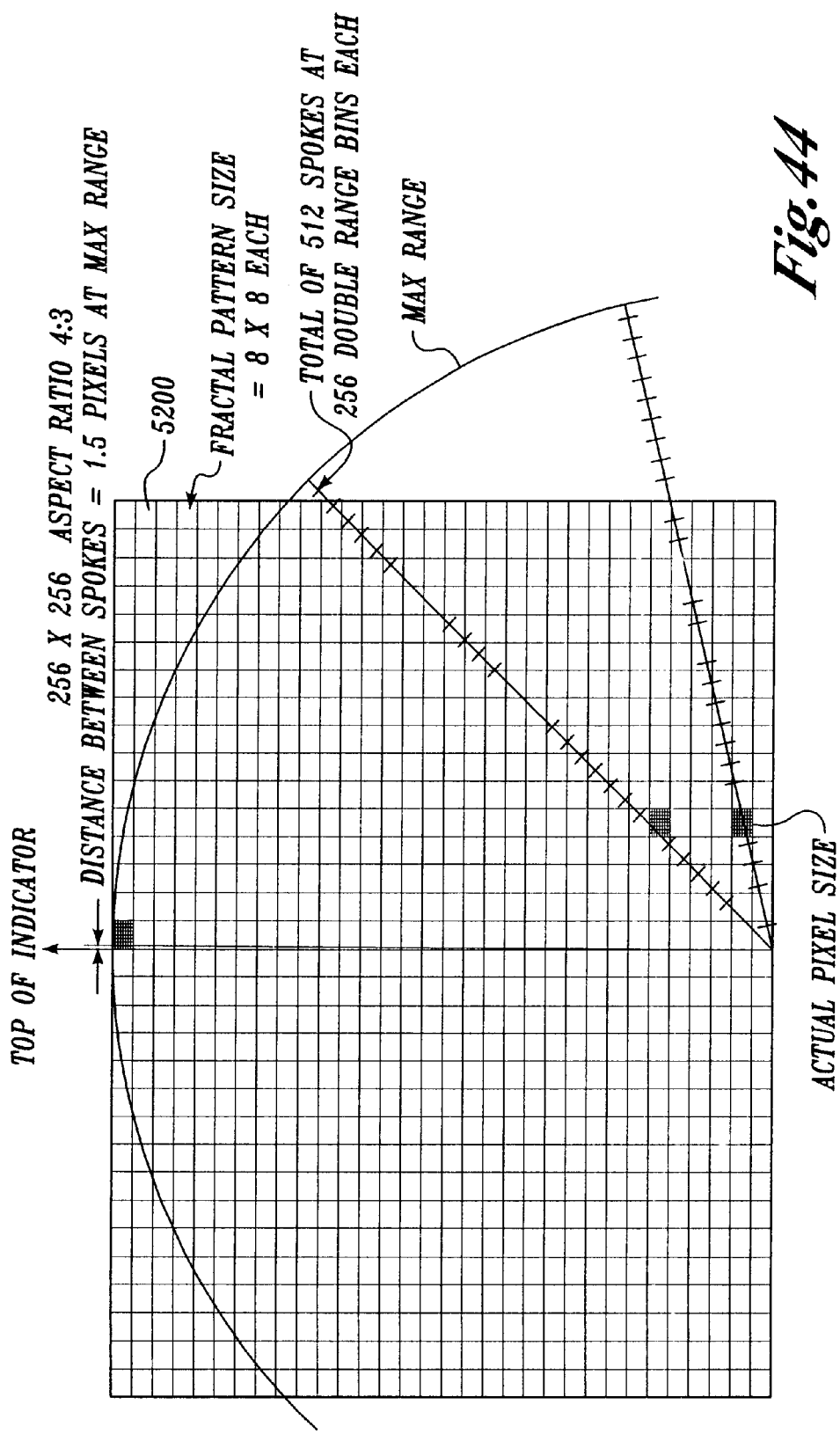
FIG. 44 is a diagram of a pixel map of the display.

As illustrated in FIG. 44, the display screen is divided into a pixel map, having for example, 256×256 pixels 5200. As mentioned above, the 8×8 fractal patterns are overlaid onto the pixel map to provide the variable density dot patterns 4320, 4340 and 4360 illustrated in FIG. 36.

Figure 46:
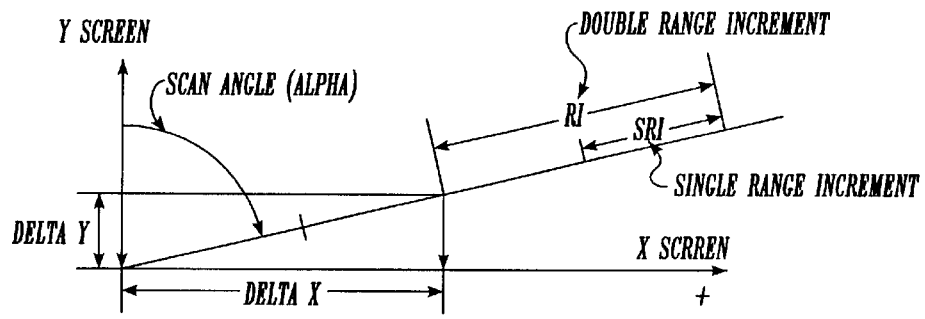
FIG. 46 is a diagram illustrating the determination of the X and Y increments of the display screen.
Figure 47:
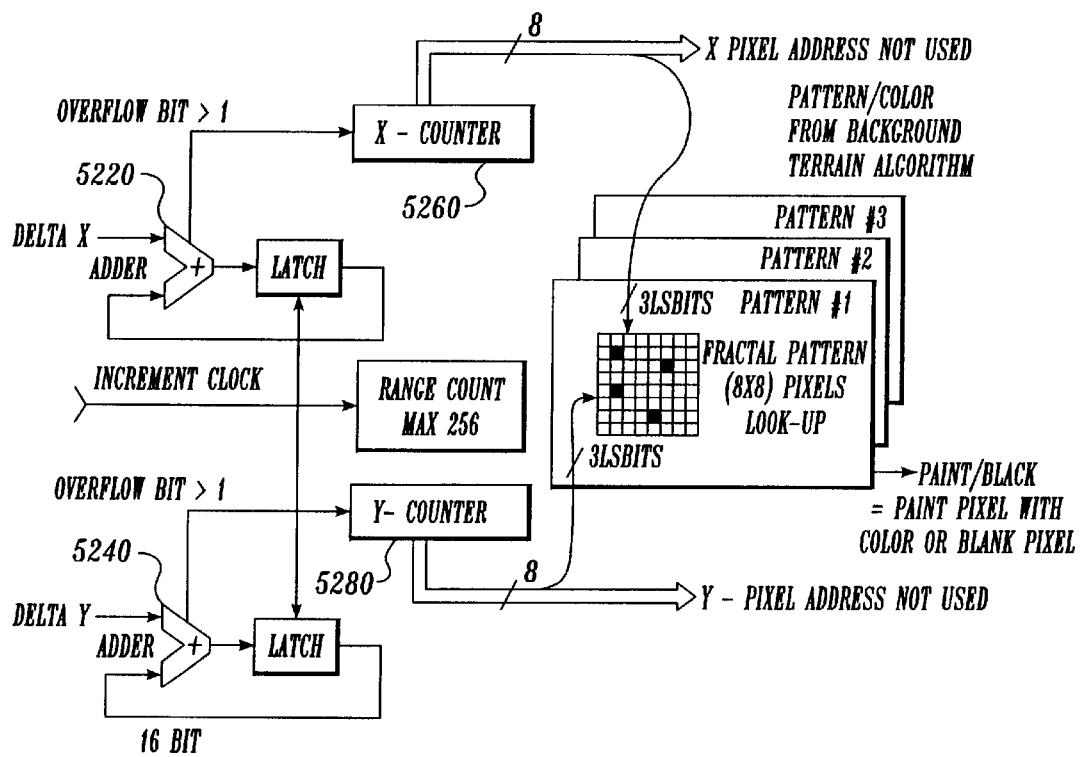
FIG. 47 is a diagram of the method for superimposing the fractal patterns on the displayed pixel map.

The computation of the dot patterns is best understood with reference to FIGS. 44, 46 and 47. Using an X-Y coordinate system, each spoke is determined at the bottom center of the display 36. For a 256×256 pixel display, the starting point corresponds to 120,0. Next, the incremental X and Y coordinates relative to the scan angle ALPHA are determined according to equations (34) and (35).

DELTA $X$=RI*SIN (ALPHA)  (34)

DELTA $Y$=RI*COS (ALPHA),  (35)

where RI=a double range increment and ALPHA=the scan angle. These increments are added to the starting point 128,0. After each increment, the selected fractal pattern is looked up in the RAM B* to determine whether to send the last range increment as either block or colored.

In FIG. 47, the increments DELTA X and DELTA Y are applied to a pair of adders 5220 and 5240, which, in turn, are applied to an X-counter 5260 and a Y-counter 5280. The X counter 5260 starts at 128 and counts up if DELTA X>0. If DELTA X<0, the X-counter counts down, indicating a pixel on the left (FIG. 44) of the starting position. Since the starting pixel is at the bottom of the display, the Y-counter 5280 starts at zero and always counts up. A range counter 5280 counts up to 256; the maximum number of double range bins. The range counter 5280 is driven by an increment clock such that the pattern/color is painted once per range increment. The output indicates whether the pixel is to be painted or left blank.

The background terrain algorithm determines the particular fractal pattern to be used. This data is applied to the DSP to enable the pixels on the pixel map (FIG. 7) to be painted or left blank. In particular, the three least significant bits from the X counter 5260 and Y counter 5280 are used to select the fractal pattern as shown.

The scan conversion simulation is performed in parallel with the RHO/THETA conversion which determines the color/dot pattern of the range bin to be transmitted. The color/dot pattern provided by the RHO/THETA conversion is then overlaid with the fractal dot pattern to determine whether the range bin color should be black or painted to provide the proper dot pattern on the display.

Figure 48:
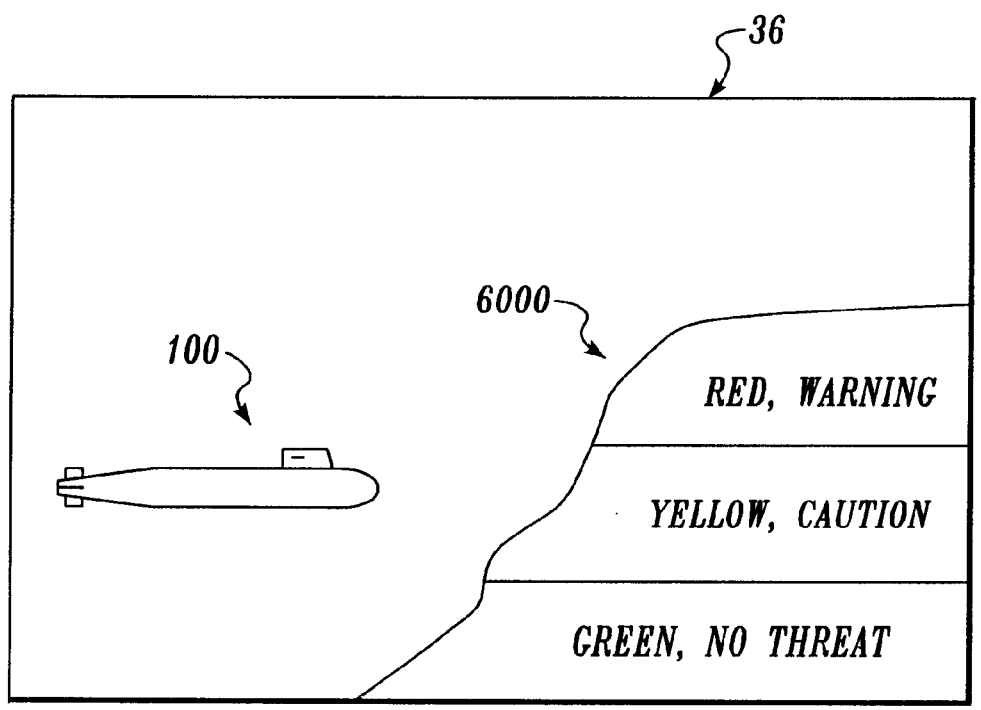
FIG. 48 is a diagram of a three dimensional terrain display according to an embodiment of the present invention.

In an alternate embodiment of the invention, display 36 may also show the terrain in a three dimensional view in the in lieu of, or in addition to the plan view described above. FIG. 48 shows one embodiment of display 36 on which terrain 6000 are shown in profile view, color coded to show degree of threat and depicted relative to the position of submarine 100, indicated by a submarine or other suitable symbol.

APPENDIX 1

Terrain Data Structure

The terrain data format is made up of four distinct parts, the file indirection table, the group index, the data index, and the compressed elevation data itself.

Notes: All multi-byte numbers are stored Little Endian (LSB . . . MSB)

File Indirection Table

A file indirection table is provided at the top of the index file block the file index field in each data index is used to index into this table to get the ASCII filename for file system usage. This filename is then mapped by the file system to the correct 128 kbyte physical memory block. A time stamp is provided for each file, this can be used to match to the time stamp in the file header for each file. This helps check for consistency between the index files and the data files.

| | |
|---|---|
| SIZE: | 16-bits - unsigned<br>Number of filenames defined:<br>Repeated for each filename |
| FILENAME: | 16-bytes - ASCII<br>ASCII filename with the extension included<br><Drive>:<File 8>.<Ext 3> |
| TIME STAMP: | 32 bits - unsigned<br>The number of seconds since January 1, 1980<br>(DOS's time base). |

Group Index

The group index is used to reduce the number of data indexes which must be searched to find the area of interest. The group indexes are built by dividing the earth into TBD bands or geographic areas of 5° latitude by 10° longitude. These bands need not be of equal size.

The group index points to the corresponding data index block to use for this area. The area covered by the group is preferably a rectangle.

Note: the group index and data index occupy the same file.

Definitions:

| | |
|---|---|
| SIZE: | 16-bits - unsigned |
| Number of groups | |
| The following is repeated for each group defined: | |
| INDEX: | 32-bits - unsigned<br>\|------------\|--------------\|<br>\| 12 - bits \| 20 - bits \|<br>\| File Index \| offset \|<br>File Index: Always 0 for group index<br>offset: offset in bytes to start of index file for this group |
| LAT MAX: | 24-bits - signed<br>NW corner latitude<br>Scaling: LSB = 180/2^23<br>Sign: (+) = North, (−) = South |
| LAT MIN: | 24-bits - signed<br>SE corner latitude<br>Scaling: LSB = 180/2^23<br>Sign: (+) = North, (−) = South |
| LON MIN: | 24-bits - signed<br>NW corner longitude<br>Scaling: LSB = 180/2^23<br>Sign: (+) = East, (−) = West |
| LON MAX: | 24-bits - signed<br>SE corner longitude<br>Scaling: LSB = 180/2^23<br>Sign: (+) = East, (−) = West |
| Memory Usage: | 16 bytes per group<br>Assume 648 groups worst case = 10,368 bytes |

Data Index

The data index contains information defining the coverage, resolution and storage location of each individual terrain data file. The data indexes are grouped together per the group index defined above (i.e. group 2's data indexes immediately follow group 1's data indexes).

Definitions:

| | |
|---|---|
| SIZE: | 16-bits - unsigned |
| Number of indexes | |
| The following is repeated for each index defined: | |
| INDEX: | 32-bits - unsigned<br>\|------------\|--------------\|<br>\| 12-bits \| 20-bits \| |

| | |
|---|---|
| | \| File Index \| offset \|<br>File Index: Filename index for data<br>offset: offset in bytes to start of index file for this group |
| LAT MAX: | 24-bits - signed<br>NW corner latitude<br>Scaling: LSB = 180/2^23<br>Sign: (+) = North, (−) = South |
| LAT RES: | 8-bits - unsigned<br>Number of rows per 1 degree |
| LAT MIN: | 24-bits - signed<br>SB corner latitude<br>Scaling: LSB = 180/2^23 |
| LON MIN: | 24-bits - unsigned<br>New corner longitude<br>Scaling: LSB = 180/2^23<br>Sign: (+) = East, (−) = West |
| LON RES: | 8-bits - unsigned<br>Number of rows per 1 degree |
| LON MAX: | 24-bits - signed<br>SE corner latitude<br>Scaling: LSB = 180/2^23 |
| Memory Usage: | 18 bytes index (terrain file)<br>Assume 8000 files = 144k-bytes |

Data

The following defines the format for the actual depth (aka elevation) data. The index files above are used to locate the desired elevation file, and also contain information on the location, resolution etc.

Note: for all data types below, the return depth values at 16 bit singed values.

First value is always compression type as defined below:

COMPRESSION TYPE:8 bits—unsigned

Compression:

0=no compression

1=HUFFCODE—type 1

2=RLE—BYTE

3=Run length word

4=constant elevation (RLE-single)

5=RLE—DYNAMIC

For type 0, no compression, the uncompressed depth/elevation values are stored directly.

The following definition is for the HUFFCODE compressed data format: The top of the data contains the decode tables needed to uncompress the terrain data.

Note: Decompression needs the Number of X and Y values of decoded file (from index file).

| Decode tables: | |
|---|---|
| FIRSTCODE SIZE: | 1 byte - unsigned<br>Size in bytes of firstcode and<br>symbol pointer tables<br>(max 32 bytes) |
| FIRSTCODE TAB: | n bytes - unsigned<br>Firstcode table |
| SYMBOL POINTER TABLE: | n words - unsigned<br>Used with Firstcode table to index into symbol table. |
| SYMBOL SIZE: | 1 word - unsigned<br>Size in bytes of symbol table (max 256 words) |
| SYMBOL TAB: | n words - signed<br>Symbol table. Contains decoded symbol |

-continued

Decode tables:

| | |
|---|---|
| FIRSTVALUE: | 1 word - signed<br>First elevation value. Used by linear predictor<br>Note: typical words decode table size is less than 150 bytes. |
| ELEVATIONS: | Compressed elevation values in binary<br>Note: padded to align on byte boundary currently. |

For Compression type 4, (water/same elevation value), only 3 bytes are needed. The compression type byte defined above, and the 16 bit elevation value. This is used for files that contain only one elevation value. This will typically be used for "no-elevation" areas.

Build System

FIGS. 44 and 45 show a preliminary look at the steps to build the Terrain database from the original source data.

1. Currently basic input file is 1 degree at 30 arc-seconds. This matches NOAA data. System should be built to handle any file size.
2. Build system uses a control file automatically generated from a port database and a NOAA provided worldwide terrain file. Control file contains a list of every 1 degree quad, and what the desired resolution of that 1 degree file should be. Resolution is determined by proximity to a port or shoreline and the minimum depth value of that file. 1 of 3 resolutions are currently output, 30, 60, and 120 arc-seconds. In addition, the control file will indicate which 1 degree quads can be combined into one file. This is done for lower resolution quads in an attempt to keep the file sizes even and reduce the number of files.
3. Some files will need a special extrusion run on them. This will be defined in a separate control file.

Grouping and packaging control files are needed to ensure that the build system groups the files into the correct structure.

Notes on "Terrain Data Embedded Format"

Maps are read from the file system, decompressed, and then used to update "RAM A" as the vessel moves across it. Due to the slow speed of the decompression, two RAM As are used. The detection and display algorithm uses one RAM A while the file picker updates the other RAM A with the latest maps. After the file picker has updated its RAM A, the RAMs are swapped and the process starts over.

The file picker process starts by the TAD asking the file system to open a file with a known, fixed name ("TERRAIN.BMI"). This file contains the file indirection table, the group index table, and the data index tables. The TAD then periodically scans the group index table to find map groups that cover the general vicinity of the aircraft. This step quickly reduces the number of maps that need to be considered for decompression from several thousand down to a few hundred. It identifies candidate groups by comparing the group bounding box stored in the group index table entry against the vessel's current position. The number of group index table entries is stored at the top of the table, and all the entries immediately follow.

When a candidate group is found, the TAD uses the <fileindex> in the group index table entry to locate the file containing the data index tables. If the number is zero (the usual case), it indicates that the data is in the main index file (the one we are already reading). A future option would be to make the number non-zero. It would then identify a secondary index file named in the file indirection table. Once the file containing the data index table is opened, the TAD seeks to the <offset> in the group index table entry and starts reading the data index table for that group.

Each data index table begins with its number of entries. The TAD scans each of the data index table entries looking for any of the maps needed for the current vessel position.

If a data index table entry is found to describe one of the maps we need, the TAD uses the <fileindex> to get the name of the map package file from the file indirection table. A map package file is a concatenation of a couple hundred compressed maps. From there it reads the compression type and calls the correct decompression algorithm to decompress the file. The decompressed data is then up-sampled or down-sampled into the appropriate tiers of RAM A. When up-sampling (filing higher resolution tiers with lower resolution data), the highest resolution data is used. To support this TAD must keep track of the current resolution used to fill each cell of RAM A. For down-sampling the shallowest elevation is always used. The enroute tier of RAM A is always filled with only enroute data. When all map files within the vessel's area have been processed RAM A is released.

That which is claimed:

1. An apparatus for alerting the crew of a submerged vessel of proximity to terrain, said apparatus comprising:
    an input for receiving signals representative of a position, speed, and a path angle of the vessel, and coupled to a data base of stored terrain information;
    an output; and
    an signal processing device coupled to said input and said output, for
        defining a look ahead distance as a function of the speed of the vessel;
        defining a first alert envelope indicative of a first level of terrain proximity alert, wherein boundaries of the first alert envelope are determined as a first function of the position path angle, and look ahead distance;
        defining a second alert envelope indicative of a second level of terrain proximity alert, wherein boundaries of the second alert envelope are determined as a second function of the position path angle, and look ahead distance; and
        outputting an alert signal when a subset of the stored terrain information is located within the boundaries of at least one of the first and second alert envelopes.

2. An apparatus according to claim 1, wherein said signal processing device defines at least one of the first and second envelopes to be bounded by a cutoff envelope.

3. An apparatus according to claim 1, wherein said signal processing device further defines at least one of the first and second envelopes as a function of a configurable datum.

4. An apparatus according to claim 1, wherein said signal processing device further defines at least one of the first and second envelopes to include a subset of alert envelopes representing various severities of hazard to the vessel.

5. An apparatus according to claim 1, wherein said signal processing device comprises a microprocessor.

6. An apparatus according to claim 1, wherein said signal processing device device comprises a means for outputting the alert signal as a video control signal, wherein the video control signal is useful for controlling representations of terrain on a video display in various colors according to a degree of terrain threat.

7. An apparatus according to claim 1 further comprising a aural warning generator coupled to said signal processing device, and wherein the alert signal output from said signal processing device comprises an audio control signal to command said aural warning generator to output an aural alert.

8. A method for alerting the crew of a submerged vessel of proximity to terrain comprising the steps of:
- accessing a database of terrain information;
- receiving signals representative of a position, speed, and a path angle of the vessel;
- defining a look ahead distance as a function of the speed of the vessel;
- defining a first alert envelope indicative of a first level of terrain proximity alert, wherein boundaries of the first alert envelope are determined as a first function of the position path angle, and look ahead distance;
- defining a second alert envelope indicative of a second level of terrain proximity alert, wherein boundaries of the second alert envelope are determined as a second function of the path angle, look ahead distance, and the terrain floor boundary; and
- outputting an alert signal when a subset of the stored terrain information is located within the boundaries of at least one of the first and second alert envelopes.

9. A method according of claim 8, wherein said step of outputting an alert signal further comprises the step of outputting a video control signal to control display of terrain on a display device.

10. A method according to claim 8 further comprising the step of defining a cut off envelope to form a boundary of at least one of the first and second alert envelopes.

11. A method according to claim 8, wherein said outputting step comprises outputting an audio control signal to generate an aural alarm.

12. A method according to claim 8, wherein at least one of said defining an alert envelope steps comprises defining at least one of the first and second envelopes as a function of a configurable datum.

13. A method according to claim 8, wherein at least one of said defining an alert envelope steps comprises defining at least one of the first and second envelopes to include a subset of alert envelopes representing various severities of hazard to the marine vessel.

14. A computer program product for alerting the crew of a submerged vessel of proximity to terrain, wherein the computer program product comprises:
- a computer readable storage medium having computer readable program code means embodied in said medium, said computer-readable program code means comprising:
  - first computer instruction means for accessing a database of terrain information;
  - second computer instruction means for receiving signals representative of a position, speed, and a path angle of the vessel;
  - third computer instruction means for defining a look ahead distance as a function of the speed of the vessel;
  - fourth computer instruction means for defining a first alert envelope indicative of a first level of terrain proximity alert, wherein boundaries of the first alert envelope are determined as a first function of the position path angle, and look ahead distance;
  - fifth computer instruction means for defining a second alert envelope indicative of a second level of terrain proximity alert, wherein boundaries of the second alert envelope are determined as a second function of the position path angle, and look ahead distance; and
  - sixth computer instruction means for outputting an alert signal when a subset of the stored terrain information is located within the boundaries of at least one of the first and second alert envelopes.

15. A computer program product according to claim 14, wherein said sixth computer instruction means further outputs a video control signal to control display of terrain on a display device.

16. A computer program product according to claim 14, further comprising seventh computer instruction means for defining a cut off envelope to form a boundary of at least one of the first and second alert envelopes.

17. A computer program product according to claim 14, wherein said sixth computer instruction means further outputs an audio control signal to generate an aural alarm.

18. A computer program product according to claim 14, wherein said at least one of said fourth and fifth computer instruction means defines at least one of the first and second envelopes as a function of a configurable datum.

19. A computer program product according to claim 14, wherein said at least one of said fourth and fifth computer instruction means defines at least one of the first and second envelopes to include a subset of alert envelopes representing various severities of hazard to the vessel.

20. An apparatus for generating terrain proximity alerts for use in a submerged vessel, said apparatus comprising an alert generator that generates an envelope with respect to the vessel and having a lower boundary based on a depth of said vessel and extending outwardly along a path vector of the vessel, wherein said alert generator compares the envelope to terrain proximate to the vessel and generates alerts if the proximate terrain penetrates the envelope.

21. An apparatus according to claim 20, wherein said alert generator compares prestored elevations of terrain proximate to the vessel to the elevation of the lower boundary of the envelope and generates an alert if the elevation of the terrain is at least as great as the elevation of the lower boundary of the envelope.

22. An apparatus according to claim 20, wherein said alert generator generates an envelope relative to the vessel having a lower boundary with a depth greater than the vessel and an outer boundary positioned at an outward distance from the marine vessel.

23. An apparatus according to claim 22, wherein said alert generator generates the outer distance of the outward boundary based on at least the speed of the vessel.

24. An apparatus according to claim 22, wherein said alert generator generates the outer boundary as a function of the performance characteristics of the vessel.

25. An apparatus according to claim 22, wherein said alert generator determines the outer boundary as a function of a distance required for the vessel to stop based on a current speed of the marine vessel.

26. An apparatus according to claim 22, wherein said alert generator determines the outer distance as a function of a distance required for the vessel to perform an evasive maneuver.

27. An apparatus according to claim 22, wherein said alert generator determines a first distance equal to a distance required for the vessel to stop based on a current speed of the vessel, wherein said alert generator further determines a second distance equal to the distance required for the vessel to perform an evasive maneuver at a selected turning radius based on at least a current speed of the vessel, and wherein said alert generator generates an envelope having an outer boundary positioned at an outward that is the smaller of the first and second distances.

28. An apparatus according to claim 20, wherein the vessel is traveling in a direction defining a track, and wherein said alert generator generates an envelope relative to the vessel in the direction of the track of the vessel.

29. An apparatus according to claim 28, wherein said alert generator generates an envelope relative to the vessel in the direction of the track of the vessel and having side boundaries extending along the track of the vessel and spaced apart by a width perpendicular to the track.

30. An apparatus according to claim 28, wherein said alert generator generates an envelope relative to the vessel in the direction of the track of the marine having side boundaries extending along the track of the vessel and spaced apart by a width perpendicular to the track that increases for distances further away from the vessel.

31. An apparatus according to claim 20, wherein said alert generator generates a caution envelope relative to the vessel indicating a first level of terrain proximity alert and a warning envelope relative to the vessel indicating a second level of terrain proximity alert.

32. An apparatus according to claim 31, wherein said alert generator generates the caution and warning envelopes such that they each have a lower boundary having a lower elevation than the vessel and an outward boundary positioned at an outward distance from the vessel, such that if the proximate terrain penetrates the boundaries of the caution envelope, said alert generator generates a first level of terrain proximity alert, and if the proximate terrain penetrates the boundaries of the warning envelope, said alert generator generates a second level of terrain proximity alert.

33. An apparatus according to claim 20 further comprising a display in electrical communication with said alert generator, wherein said display displays visual representations of the proximate terrain and colors portions of the proximate terrain according to a degree of hazard to the vessel.

34. An apparatus according to claim 20, wherein said alert generator generates at least one of a visual and aural alert if the proximate terrain penetrates the envelope.

35. A method for generating terrain proximity alerts for use in a submerged vessel, said method comprising the steps of:
generating an envelope with respect to the vessel wherein said envelope has a volume and has a lower boundary based on a depth of said vessel and extends outwardly along a path vector of said vessel;
comparing the envelope to terrain proximate to the vessel; and
providing alerts if the proximate terrain penetrates the envelope.

36. A method according to claim 35, wherein said comparing step compares prestored elevations of terrain proximate to the vessel to the elevation of the lower boundary of the envelope and said providing step provides an alert if the elevation of the terrain is at least as great as the elevation of the lower boundary of the envelope.

37. A method according to claim 35, wherein said generating step generates an envelope relative to the vessel having a lower boundary with a lower depth greater than the vessel and an outer boundary positioned at an outward distance from the vessel.

38. A method according to claim 37, wherein said generating step generates the outward distance of the outward boundary based on at least the speed of the vessel.

39. A method according to claim 37, wherein said generating step generates the outer distance of the outward boundary based on the performance characteristics of the vessel.

40. A method according to claim 37, wherein said generating step determines the outward distance as a distance required for the vessel to stop based on a current speed of the vessel.

41. A method according to claim 37, wherein said generating step determines the outer distance as a distance required for the vessel to perform an evasive maneuver.

42. A method according to claim 37, wherein said generating step determines a first distance equal to a distance required for the vessel to stop based on a current speed of the vessel, wherein said generating step further determines a second distance equal to the distance required for the vessel to perform an evasive maneuver at a selected turning radius based on at least a current speed of the vessel, and wherein said generating step generates an envelope having an outer boundary positioned at the smaller of the first and second distances.

43. A method according to claim 35, wherein the vessel is traveling in a direction defining a track, and wherein said generating step generates an envelope relative to the vessel in the direction of the track of the vessel.

44. A method according to claim 43, wherein said generating step generates an envelope relative to the vessel in the direction of the track of the vessel having side boundaries extending along the track of the vessel and spaced apart by a width perpendicular to the track.

45. A method according to claim 43, wherein said generating step generates an envelope relative to the vessel in the direction of the track of the vessel and having side boundaries extending along the track of the vessel and spaced apart by a width perpendicular to the track that increases for distances further away from the vessel.

46. A method according to claim 35, wherein said generating step generates a caution envelope relative to the vessel indicating a first level of terrain proximity alert and a warning envelope relative to the vessel indicating a second level of terrain proximity alert.

47. A method according to claim 46, wherein said generating step generates the caution and warning envelopes such that they each have a lower boundary having a lower elevation than the vessel and an outward boundary positioned at an outward distance from the vessel, such that if the proximate terrain penetrates the boundaries of the caution envelope, said providing step provides a first level of terrain proximity alert, and if the proximate terrain penetrates the boundaries of the warning envelope, said providing step provides a second level of terrain proximity alert.

48. A method according to claim 35 further comprising the step of displaying visual representations of the proximate terrain and colors portions of the proximate terrain if the proximate terrain penetrates the envelope.

49. A method according to claim 35, wherein said providing step provides at least one of a visual and aural alert if the proximate terrain penetrates the envelope.

50. A computer program product for generating terrain proximity alerts for use in a submerged vessel, wherein the computer program product comprises:
a computer readable storage medium having computer readable program code means embodied in said medium, said computer-readable program code means comprising:
first computer instruction means for generating an envelope with respect to the vessel having a lower boundary extending outwardly along a path vector of the vessel;
second computer instruction means for comparing the envelope to terrain proximate to the vessel; and
third computer instruction means for providing alerts if the proximate terrain penetrates the envelope.

51. A computer program product according to claim 50, wherein said second computer instruction means compares prestored depths of terrain proximate to the vessel to a depth of the lower boundary of the envelope and said third computer instruction means provides an alert if the depth of the terrain is less than or equal to the depth of the lower boundary of the envelope.

52. A computer program product according to claim 50, wherein said first computer instruction means generates an envelope relative to the vessel having a lower boundary with a lower depth greater than the vessel and an outer boundary positioned at an outward distance from the vessel.

53. A computer program product according to claim 52, wherein said first computer instruction means generates the outer distance of the outward boundary based on at least the speed of the vessel.

54. A computer program product according to claim 52, wherein said first computer instruction means generates the outer distance of the outward boundary based on performance characteristics of the vessel.

55. A computer program product according to claim 52, wherein said first computer instruction means determines the outer distance as a function of distance required for the vessel to stop.

56. A computer program product according to claim 52, wherein said first computer instruction means determines the outer distance as a distance required for the vessel to perform an evasive maneuver.

57. A computer program product according to claim 52, wherein said first computer instruction means determines a first distance equal to a distance required for the vessel to stop based on a current speed of the vessel, wherein said first computer instruction means further determines a second distance equal to the distance required for the vessel to perform an evasive maneuver at a selected turning radius based on at least a current speed of the vessel, and wherein said first computer instruction means generates an envelope having an outward boundary positioned at the smaller of the first and second distances.

58. A computer program product according to claim 50, wherein the vessel is traveling in a direction defining a track, and wherein said first computer instruction means generates an envelope relative to the vessel in the direction of the track of the vessel.

59. A computer program product according to claim 58, wherein said first computer instruction means generates an envelope relative to the vessel in the direction of the track of the vessel having side boundaries extending along the track of the vessel and spaced apart by a width perpendicular to the track.

60. A computer program product according to claim 58, wherein said first computer instruction means generates an envelope relative to the vessel in the direction of the track of the vessel having side boundaries extending along the track of the vessel and spaced apart by a width perpendicular to the track that increases for distances further away from the vessel.

61. A computer program product according to claim 50, wherein said first computer instruction means generates a caution envelope relative to the vessel indicating a first level of terrain proximity alert and a warning envelope relative to the vessel indicating a second level of terrain proximity alert.

62. A computer program product according to claim 61, wherein said first computer instruction means generates the caution and warning envelopes such that they each have a lower boundary having a depth less than or equal to the vessel and an outer boundary positioned at an outward distance from the vessel, such that if the proximate terrain penetrates the boundaries of the caution envelope, said third computer instruction means provides a first level of terrain proximity alert, and if the proximate terrain penetrates the boundaries of the warning envelope, said third computer instruction means provides a second level of terrain proximity alert.

63. A computer program product according to claim 50 further comprising the fourth computer instruction means for displaying visual representations of the proximate terrain and colors portions of the proximate terrain if the proximate terrain penetrates the envelope.

64. A computer program product according to claim 50, wherein said third computer instruction means provides at least one of a visual and aural alert if the proximate terrain penetrates the envelope.

65. An apparatus for alerting the crew of a submerged vessel of proximity to terrain comprising:
   an input adapted to receive signals indicative of a depth below keel;
   an output; and
   a signal processing device, coupled to said input and said output, for comparing a rate of change of said depth below keel with a predetermined rate and outputting an alert signal when said predetermined rate is exceeded.

66. The apparatus of claim 65 wherein said signal processing device comprises a microprocessor.

67. The apparatus of claim 65 wherein said alert signal comprises an audio alert control signal.

68. The apparatus of claim 65 wherein said alert signal comprises a video control signal useful for controlling a display.

69. The apparatus of claim 65 wherein said predetermined rate is a function of a speed of the vessel.

70. A method for alerting the crew of a submerged vessel of proximity to terrain comprising the steps of:
   (a) sensing a depth below keel;
   (b) determining a rate of change of said depth below keel; and
   (c) asserting an alert when said rate of change of said depth below keel exceeds a predetermined value.

71. The method of claim 70 wherein said step of asserting an alert further comprises the step of determining said predetermined value as a function of a speed of said vessel.

72. The method of claim 70 wherein said step of asserting an alert comprises the step of asserting an audible alert.

73. The method of claim 70 wherein said step of asserting an alert comprises asserting a video control signal to control a display.

74. A computer program product for alerting the crew of a submerged vessel of proximity to terrain comprising:
   a computer readable storage medium having computer readable program code means embodied in said medium, said computer readable program code means having:
   a first computer instruction means for generating a signal indicative of a rate of change of a depth below keel of the vessel;
   a second computer instruction means for comparing said rate of change to a predetermined value; and
   a third computer instruction means for providing alerts if said rate of change exceeds said predetermined value.

75. A system for alerting the crew of a submersed vessel of a potentially hazardous condition comprising:
   a terrain database;
   a signal processing device coupled to said terrain database and having;

(a) an input adapted to receive signals indicative of a depth of said vessel and a position of said vessel;
(b) an output;
(c) wherein said signal processing device compares said depth of said vessel to terrain information stored in said terrain data base at least in a region proximate said vessel and according so a predetermined criterion, and outputs an alert when a potentially hazardous condition is detected; and
(d) wherein said signal processing device outputs an alert when a rate of change of said depth exceeds a predetermined rate.

76. The system of claim 75 further comprising a display for displaying terrain proximate the vessel.

77. The system of claim 76 wherein said terrain proximate said vessel is colored in a plurality of colors according to a degree of hazard.

78. The system of claim 76 wherein a dot pattern used to represent said terrain proximate the vessel is varied in density according to a degree of hazard.

79. The system of claim 76 wherein said display displays terrain proximate the vessel in profile view.

80. The system of claim 75 wherein said signal processing device comprises a microprocessor.

81. The system of claim 75 wherein said signal processing device determines an avoidance maneuver and outputs an avoidance guidance signal when said potentially hazardous condition is detected.

82. The system of claim 75 further comprising:
a data base of vessel performance data; and
wherein said signal processing device compares said position, depth and terrain data according to said predetermined criterion and said vessel performance data.

83. The system of claim 75 wherein said predetermined rate is a function of the speed of the vessel.

84. The system of claim 75 wherein said terrain data comprises both geographic features and man-made structures.

85. A method for alerting the crew of a submerged vessel to a potentially hazardous condition, the method comprising the steps of:
(a) defining a protection envelope having a finite volume;
(b) retrieving terrain data from a terrain data base; and
(c) comparing said terrain data to said protection envelope and outputting an alert when said terrain data penetrates said protection envelope.

86. The apparatus of claim 1 where said signal processing device determines an avoidance maneuver and outputs an avoidance guidance signal when said subset of terrain information is located within the boundaries of said first or said second alert envelopes.

87. The method of claim 8 further comprising the step of outputting an avoidance guidance signal when said terrain information is located within the boundaries of said first or said second alert envelopes.

88. The computer program product of claim 14 further comprising a seventh computer instruction means for defining an avoidance maneuver and outputting an avoidance guidance signal when said stored terrain information is located within the boundaries of at least one of said first or said second alert envelopes.

89. The computer program product of claim 88 further comprising an eighth computer instruction means for preventing output of said alert signal when said avoidance guidance signal is output.

90. The apparatus of claim 20 wherein said alert generator further includes an avoidance maneuver generator that outputs an avoidance guidance signal when the proximate terrain penetrates the envelope.

91. The apparatus of claim 90 wherein said avoidance maneuver generator prevents generation of said alerts when said avoidance guidance signal is asserted.

92. The method of claim 35 further comprising the step of outputting an avoidance guidance signal when the terrain penetrates the envelope.

93. The method of claim 92 further comprising the step of suppressing said alerts when said avoidance guidance signal is asserted.

94. The computer program product of claim 50 further comprising a fourth computer instruction means for defining and avoidance maneuver and outputting an avoidance guidance signal when the proximate terrain penetrates the envelope.

95. The computer program product of claim 94 further comprising a fifth computer instruction means for suppressing said alerts when said avoidance guidance signal is asserted.

96. The apparatus of claim 6 wherein said video control signal is useful for controlling said representations of terrain in profile view.

97. The method of claim 8 wherein said step of outputting a video control signal includes a signal to display terrain in profile view.

98. The computer program product of claim 15 wherein said video control signal includes a signal to display said terrain in profile view.

99. The apparatus of claim 33 wherein said display displays terrain in profile view.

100. The computer program product of claim 63 wherein said fourth computer instruction means further includes means for displaying said visual representations in profile view.

101. The system of claim 76 wherein said display displays said terrain in profile view.

102. A method to verify points of intended movement of a submerged vessel are free of potential collision hazardous comprising the steps of:
(a) identifying the points of intended movement;
(b) comparing a depth of said vessel along said points of intended movement to terrain information stored in a terrain database at least in a region proximate said points of intended movement and according to a predefined criterion;
(c) providing an alert signal when a collision hazard is identified according to said predefined criterion along said points of intended movement.

103. The method of claim 102 wherein said step of providing an alert signal further comprises the step of displaying said collision hazard along said points of intended movement on a display.

104. The method of claim 102 wherein said step of comparing further comprises the step of defining a look/ahead and look/down alert envelope extending in a direction of travel from said vessel along said points of intended movement, and wherein a collision hazard exists when said terrain information is located within the boundaries of said alert envelope.

105. The method of claim 102 wherein said step of comparing further comprises the step of defining a three dimensional uncertainty envelope about said points of intended movement and wherein a collision hazard exists when said terrain information is located within the boundaries of said uncertainty envelope.

106. The method of claim 102 further comprising the step of outputting an alternative track when said collision hazard is identified.

107. An apparatus for strategically identifying potential collision hazards along points of intended movement on a submerged vessel comprising:
   an input for receiving signals representative of said points of intended movement, and coupled to a data base of stored terrain information;
   an output; and
   a signal processing device coupled to said input and said output, for
      comparing a depth of said vessel along said points of intended movement to terrain information stored in said terrain database at least in a region proximate to said points of intended movement;
      determining, according to a predetermined criterion, whether a collision hazard exists along said points of intended movement; and
      asserting an alert signal when said collision hazard is determined to exist.

108. The apparatus of claim 107 wherein said signal processing device comprises a microprocessor.

109. The apparatus of claim 107 wherein said signal processing device further includes means for asserting a video control signal useful for controlling display of said collision hazard along said points of intended movement on a display.

110. The apparatus of claim 107 wherein said signal processing device further comprises an avoidance logic device for determining an alternate course when said collision hazard is detected.

111. A computer program product for identifying potential collision hazards along points of intended movement of a submerged vessel comprising:
   a computer readable storage medium having computer readable program code means embodied in said medium, said computer-readable program code means comprising:
      first computer instruction means for receiving signals representative of points of intended movement of the vessel;
      second computer instruction means for accessing a database of terrain information; and
      third computer instruction means for determining, according to a predetermined criterion, whether a collision hazard exists along said points of intended movement and for asserting an alert signal when said collision hazard is determined to exist.

112. The computer program product of claim 111 further comprising a fourth computer instruction means for controlling a video display to display said collision hazard along said points of intended movement.

113. The computer program product of claim 111 further comprising a fourth computer instruction means for determining an alternate course when said collision hazard is detected.

114. A method for assisting the crew of a submerged vessel in avoiding a grounding incident comprising the steps of:
   accessing a database of terrain information;
   receiving signals representative of a position, speed, and one of a projected track or path angle of the vessel;
   defining a protection envelope with respect to the vessel;
   comparing said protection envelope to terrain proximate said vessel;
   determining an avoidance maneuver when said terrain penetrates said protection envelope; and
   outputting an avoidance guidance signal based an said avoidance maneuver.

115. The method of claim 114 wherein said step of defining a protection envelope further comprises the step of defining a look/ahead and look/down alert envelope extending in a direction of travel from said vessel and wherein a collision hazard exists when said terrain information is located within the boundaries of said alert envelope.

116. The method of claim 114 wherein said step of comparing further comprises the step of defining a three dimensional uncertainty envelope along a projected track of the vessel and wherein a collision hazard exists when said terrain information is located within the boundaries of said uncertainty envelope.

117. The method of claim 114 wherein said step of determining an avoidance manouevre further comprises the steps of:
   (a) incrementing a current vessel heading to obtain a candidate heading;
   (b) comparing said protection envelope to terrain proximate said vessel along said candidate heading;
   (c) repeating steps (a) and (b) when said terrain penetrates said protection envelope along said candidate heading until an avoidance heading is found wherein said terrain remains clear of said protection envelope.

118. The method of claim 117 wherein said step of determining an avoidance maneuver further comprises the step of evaluating a vessel performance maneuver.

119. The method of claim 117 wherein said step of outputting an avoidance guidance signal comprises the step of displaying an alternate course on a display.

120. The method of claim 117 wherein said step of outputting an avoidance guidance signal comprises the step of providing an audible guidance command.

121. The method of claim 117 wherein said step of outputting an avoidance guidance signal comprises the step of displaying a performance manouevre guidance command on a display.

122. An apparatus for assisting the crew of a submerged vessel in avoiding a grounding incident comprising:
   an input for receiving signals representative of a speed and one of a projected track or path angle of the vessel, and coupled to a data base of stored terrain information;
   an output; and
   a signal processing device coupled to said input and said output, for
      defining a protection envelope with respect to the vessel;
      comparing said protection envelope to terrain proximate said vessel;
      determining an avoidance maneuver when said terrain penetrates said protection envelope; and
      outputting an avoidance guidance signal based on said avoidance maneuver.

123. The apparatus of claim 122 wherein said avoidance guidance signal comprises a signal useful for controlling display of an alternate course on a display.

124. The apparatus of claim 122 wherein said avoidance guidance signal comprises a signal useful for providing an audible guidance command.

125. The apparatus of claim 122 wherein said avoidance guidance signal comprises a signal useful for controlling display of a performance maneuver guidance command on a display.

126. A computer program product for assisting the crew of a submerged vessel to avoid a grounding incident comprising:
   a computer readable storage medium having computer readable program code means embodied in said medium, said computer-readable program code means comprising:

first computer instruction means for accessing a database of terrain information;

a second computer instruction means for defining a protection envelope with respect to the vessel;

a third computer instruction means for comparing said protection envelope to terrain proximate said vessel;

a fourth computer instruction means for determining an avoidance maneuver when said terrain penetrates said protection envelope, and a fifth computer instruction means for outputting an avoidance guidance signal based on said avoidance maneuver.

127. The computer program product of claim 126 wherein said third computer instruction means further comprises a sixth computer instruction means defining a protection envelope further comprises the step of defining a look/ahead and look/down alert envelope extending in a direction of travel from said vessel and wherein a collision hazard exists when said terrain information is located within the boundaries of said alert envelope.

128. The computer program product of claim 126 wherein said third computer instruction means further comprises a sixth computer instruction means defining a three dimensional uncertainty envelope along a projected track of the vessel and wherein a collision hazard exists when said terrain information is located within the boundaries of said uncertainty envelope.

129. The computer program product of claim 126 wherein said fourth computer instruction means further comprises:

(a) a sixth computer instruction means for incrementing a current vessel heading to obtain a candidate heading;

(b) a seventh computer instruction means for comparing said protection envelope to terrain proximate said vessel along said candidate heading;

(c) an eighth computer instruction means for repeating steps (a) and (b) when said terrain penetrates said protection envelope along said candidate heading until an avoidance heading is found wherein said terrain remains clear of said protection envelope.

130. The computer program product of claim 126 wherein said fourth computer instruction means further comprises a sixth computer instruction means for evaluating a vessel performance maneuver.

131. The computer program product of claim 126 wherein said fifth computer instruction means further comprises a sixth computer instruction means for displaying an alternate course on a display.

132. The computer program product of claim 126 wherein said fifth computer instruction means further comprises a sixth computer instruction means for providing an audible guidance command.

133. The computer program product of claim 126 wherein said fifth computer instruction means further comprises a sixth computer instruction means for displaying a performance maneuver guidance command on a display.

* * * * *